US008698969B2

(12) United States Patent
Tsubata

(10) Patent No.: US 8,698,969 B2
(45) Date of Patent: Apr. 15, 2014

(54) ACTIVE MATRIX SUBSTRATE, METHOD FOR PRODUCING ACTIVE MATRIX SUBSTRATE, LIQUID CRYSTAL PANEL, METHOD FOR PRODUCING LIQUID CRYSTAL PANEL, LIQUID CRYSTAL DISPLAY DEVICE, LIQUID CRYSTAL DISPLAY UNIT, AND TELEVISION RECEIVER

(75) Inventor: Toshihide Tsubata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 424 days.

(21) Appl. No.: 13/254,789

(22) PCT Filed: Oct. 30, 2009

(86) PCT No.: PCT/JP2009/068716
§ 371 (c)(1),
(2), (4) Date: Sep. 2, 2011

(87) PCT Pub. No.: WO2010/100790
PCT Pub. Date: Sep. 10, 2010

(65) Prior Publication Data
US 2012/0026415 A1 Feb. 2, 2012

(30) Foreign Application Priority Data

Mar. 5, 2009 (JP) ................................ 2009-052594

(51) Int. Cl.
*G02F 1/1343* (2006.01)
*G02F 1/1362* (2006.01)

(52) U.S. Cl.
CPC .... *G02F 1/136213* (2013.01); *G02F 1/136259* (2013.01); *G02F 2001/134354* (2013.01)
USPC ................ 349/39; 349/54; 349/144

(58) Field of Classification Search
None
See application file for complete search history.

(56) References Cited

U.S. PATENT DOCUMENTS 5,042,916 A * 8/1991 Ukai et al. ...................... 349/55
5,132,819 A * 7/1992 Noriyama et al. ............. 349/55
(Continued)

FOREIGN PATENT DOCUMENTS

JP 2-79026 A 3/1990
JP 2-275927 A 11/1990
(Continued)

OTHER PUBLICATIONS

English translation of written opinion for PCT/JP2009/068716, mailing date Dec. 22, 2009.*

(Continued)

*Primary Examiner* — Mike Stahl
(74) *Attorney, Agent, or Firm* — Chen Yoshimura LLP

(57) ABSTRACT

Disclosed is a liquid crystal panel comprising a scan signal line (16x), a data signal line (15x), and a transistor (12a) that is connected to the scan signal line (16x) and the data signal line (15x), wherein a pixel (101) is provided with pixel electrodes (17a, 17b). The pixel electrode (17a) is connected to the data signal line (15x) through the transistor (12a). The liquid crystal panel also includes a capacitance electrode (37a) which is electrically connected to the pixel electrode (17a). The capacitance electrode (37a) and the pixel electrode (17a) overlap with each other through an insulating film interposed therebetween; the capacitance electrode (37a) and the pixel electrode (17b) overlap with each other through an insulating film interposed therebetween; and the areas of the overlapping portions are equal to each other. Consequently, the yield can be improved in a capacitive coupling type pixel division system active matrix substrate or in a liquid crystal panel comprising the active matrix substrate.

29 Claims, 48 Drawing Sheets

(56) References Cited

U.S. PATENT DOCUMENTS

| | | | |
|---|---|---|---|
| 5,245,450 A * | 9/1993 | Ukai et al. | 349/144 |
| 5,319,480 A * | 6/1994 | McCartney | 349/85 |
| 5,337,173 A * | 8/1994 | Atsumi et al. | 349/39 |
| 5,777,700 A | 7/1998 | Kaneko et al. | |
| 6,091,464 A | 7/2000 | Song | |
| 7,710,523 B2 * | 5/2010 | Nakanishi et al. | 349/129 |
| 8,441,590 B2 * | 5/2013 | Tsubata | 349/39 |
| 2005/0219186 A1 | 10/2005 | Kamada et al. | |
| 2005/0253979 A1 | 11/2005 | Hong et al. | |
| 2006/0023137 A1 | 2/2006 | Kamada et al. | |
| 2006/0028590 A1 | 2/2006 | Shin et al. | |
| 2006/0055852 A1 | 3/2006 | Yoshida et al. | |
| 2006/0087598 A1 | 4/2006 | Lee et al. | |
| 2009/0268116 A1 * | 10/2009 | Yagi et al. | 349/39 |
| 2010/0025689 A1 | 2/2010 | Lee et al. | |
| 2010/0097359 A1 | 4/2010 | Yamada et al. | |

FOREIGN PATENT DOCUMENTS

| | | |
|---|---|---|
| JP | 7-28091 A | 1/1995 |
| JP | 9-54341 A | 2/1997 |
| JP | 9-269509 A | 10/1997 |
| JP | 10-123572 A | 5/1998 |
| JP | 10-339885 A | 12/1998 |
| JP | 2005-292397 A | 10/2005 |
| JP | 2005-301226 A | 10/2005 |
| JP | 2006-39290 A | 2/2006 |
| JP | 2006-39567 A | 2/2006 |
| JP | 2006-78890 A | 3/2006 |
| JP | 2006-126837 A | 5/2006 |
| JP | 2006-276582 A | 10/2006 |
| WO | 2008/146512 A1 | 12/2008 |

OTHER PUBLICATIONS

Applicant brings the attention of the Examiner to the following pending U.S. Appl. No. 13/254,788, filed Sep. 2, 2011, which is a national stage of PCT application No. PCT/JP2009/068713 published as WO2010/100788, and U.S. Appl. No. 13/254,791, filed Sep. 2, 2011, which is a national stage of PCT application No. PCT/JP2009/068714 published as WO2010/100789.

International Search Report (ISR) issued in PCT/JP2009/068714 mailed in Dec. 2009.

* cited by examiner

Display section

ACTIVE MATRIX SUBSTRATE, METHOD FOR PRODUCING ACTIVE MATRIX SUBSTRATE, LIQUID CRYSTAL PANEL, METHOD FOR PRODUCING LIQUID CRYSTAL PANEL, LIQUID CRYSTAL DISPLAY DEVICE, LIQUID CRYSTAL DISPLAY UNIT, AND TELEVISION RECEIVER

TECHNICAL FIELD

The present invention relates to an active matrix substrate including a plurality of pixel electrodes in one pixel region, and to a liquid crystal display device (pixel division system) using such active matrix substrate.

BACKGROUND ART

In order to improve the dependence of view angle of γ (gamma) characteristics of a liquid crystal display device (to suppress the display whitening problem or the like, for example), a liquid crystal display device in which a plurality of sub-pixels provided in a single pixel are controlled for different luminance levels to display halftones by area gradation of the sub-pixels (pixel division system; see Patent Document 1, for example) is being proposed.

In the active matrix substrate according to Patent Document 1, as shown in FIG. 50, three pixel electrodes 121*a* to 121*c* are aligned within one pixel region along a data signal line 115, and a source electrode 116*s* of a transistor 116 is connected to a contact electrode 117*a*, the contact electrode 117*a* is connected to a controlling electrode 118 through a lead-out wiring 119, the controlling electrode 118 is connected to a contact electrode 117*b* through a lead-out wiring 126, the contact electrode 117*a* is connected to an pixel electrode 121*a* through a contact hole 120*a*, the contact electrode 117*b* is connected to the pixel electrode 121*c* through a contact hole 120*b*, the pixel electrode 121*b* that is electrically floating overlaps the controlling electrode 118 through an insulating layer, and the pixel electrode 121*b* is capacitively-coupled to the pixel electrodes 121*a* and 121*c*, respectively (capacitance coupling type pixel division system). Moreover, a storage capacitance is formed at a location where the controlling electrode 118 overlaps the capacitance wiring 113. In a liquid crystal display device using this active matrix substrate, sub-pixels corresponding to the pixel electrodes 121*a* and 121*c* can respectively become a bright sub-pixel, and a sub-pixel corresponding to the pixel electrode 121*b* can become a dark sub-pixel, and halftones can be displayed by area gradation of these bright sub-pixels (two pixels) and a dark sub-pixel (one pixel).

RELATED ART DOCUMENTS

Patent Documents

Patent Document 1: Japanese Patent Application Laid-Open Publication No. 2006-39290 (publication date: Feb. 9, 2006)

SUMMARY OF THE INVENTION

Problems to be Solved by the Invention

However, in the active matrix substrate of FIG. 50, if a short-circuiting occurs between the controlling electrode 118 and the pixel electrode 121*b*, for example, by cutting the lead-out wiring 119, it is possible to avoid signal potentials being written in the pixel electrode 121*b* from the data signal line, but the pixel electrode 121*b* becomes no longer capacitively-coupled to the pixel electrode 121*a*.

As just described, in the conventional active matrix substrate, a sub-pixel (dark sub-pixel) corresponding to the pixel electrode 121*b* is likely to become defective, and the yield can possibly be lowered.

In light of the above-mentioned problem, the present invention provides a configuration in which the yield can be improved in an active matrix substrate of the capacitance coupling type pixel division system.

Means for Solving the Problems

The present active matrix substrate includes: a scan signal line, a data signal line, and a transistor that is connected to the scan signal line and the data signal line; and first and second pixel electrodes provided in a single pixel region, wherein the first pixel electrode is connected to the data signal line through the transistor, wherein a first capacitance electrode that is electrically connected to either one of the first and second pixel electrodes is included, and wherein the first capacitance electrode and the first pixel electrode overlap with each other through an insulating film, the first capacitance electrode and the second pixel electrode overlap with each other through an insulating film, and the respective overlapped areas are equal to each other.

Effects of the Invention

The active matrix substrate of the present invention has a configuration in which an active matrix substrate of the capacitance coupling type pixel division system is equipped with a capacitance electrode that overlaps each of the first and second pixel electrodes, which are provided in one pixel region, and the respective overlapped areas are equal to each other.

According to the above-mentioned configuration, in the active matrix substrate of the capacitance coupling type pixel division system, the first and second pixel electrodes provided in one pixel region respectively overlap the first capacitance electrode. This way, in a configuration in which the first capacitance electrode is electrically connected to the first pixel electrode, even if a short-circuiting occurs between the first capacitance electrode and the second pixel electrode, for example, by electrically disconnecting the first capacitance electrode from the first pixel electrode, a capacitance coupling of the first and second pixel electrodes can be maintained by a capacitance (coupling capacitance) formed at a location where the first capacitance electrode and the first pixel electrode overlap with each other. Consequently, it is possible to improve the manufacturing yield of the present active matrix substrate and a liquid crystal panel equipped with this active matrix substrate.

Further, in the above-mentioned configuration, the area where the first capacitance electrode and the first pixel electrode overlap is equal to the area where the first capacitance electrode and the second pixel electrode overlap, and therefore, a value of the coupling capacitance before and after a short-circuit, that is, a capacitance value formed in the area where the first capacitance electrode and the second pixel electrode overlap (before the short-circuit) and the capacitance value formed in an area where the first capacitance electrode and the first pixel electrode overlap (after the short-circuit), is unlikely to change. Accordingly, the potential of the first and second pixel electrodes can be controlled normally.

DETAILED DESCRIPTION OF EMBODIMENTS

Examples of embodiments of the present invention are described below with reference to FIGS. 1 to 49. In the description below, it is assumed that the direction in which the scan signal line extends is the row direction, for convenience. Needless to say, however, when a liquid crystal display device equipped with the present liquid crystal panel (or the active matrix substrate used in the liquid crystal panel) is in use (when viewed), the scan signal line can extend in either a horizontal or vertical direction. Alignment control structures formed on the liquid crystal panel are omitted as appropriate.

Embodiment 1

Figure 1:
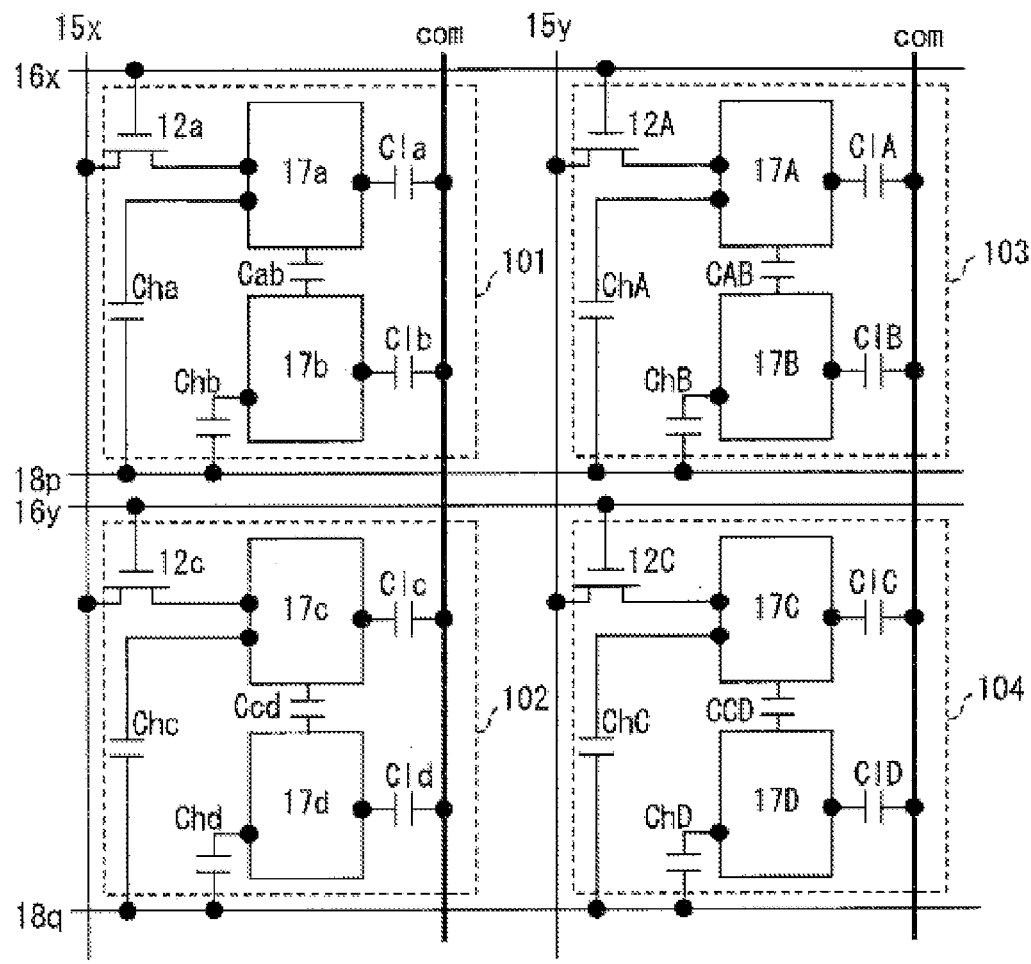
FIG. 1 is a circuit diagram showing the configuration of a liquid crystal panel according to Embodiment 1.

FIG. 1 is an equivalent circuit diagram showing a part of the liquid crystal panel according to Embodiment 1. As shown in FIG. 1, the present liquid crystal panel includes data signal lines (15*x* and 15*y*) extending in the column direction (up/down direction in the figure), scan signal lines (16*x* and 16*y*) extending in the row direction (right/left direction in the figure), pixels (101 to 104) arranged in the row and column directions, storage capacitance wirings (18p and 18q), and a common electrode (opposite electrode) com. All pixels have the same structure. The pixel column that includes pixels 101 and 102 and the pixel column that includes pixels 103 and 104 are adjacent to each other, and the pixel row that includes pixels 101 and 103 and the pixel row that includes pixels 102 and 104 are adjacent to each other.

In the present liquid crystal panel, one data signal line and one scan signal line are provided for each of the pixels. Two pixel electrodes are aligned in the column direction within a single pixel, and two pixel electrodes 17a and 17b provided in a pixel 101 as well as two pixel electrodes 17c and 17d provided in a pixel 102 are arranged in one column, two pixel electrodes 17A and 17B provided in a pixel 103 as well as two pixel electrodes 17C and 17D provided in a pixel 104 are arranged in one column. The pixel electrodes 17a and 17A, the pixel electrodes 17b and 17B, the pixel electrodes 17c and 17C, and the pixel electrodes 17d and 17D are adjacent to each other, respectively, in the row direction.

In the pixel 101, the pixel electrodes 17a and 17b are connected through a coupling capacitance Cab, the pixel electrode 17a is connected to a data signal line 15x through a transistor 12a that is connected to a scan signal line 16x, a storage capacitance Cha is formed between the pixel electrode 17a and a storage capacitance wiring 18p, a storage capacitance Chb is formed between the pixel electrode 17b and the storage capacitance wiring 18p, a liquid crystal capacitance Cla is formed between the pixel electrode 17a and the common electrode com, and a liquid crystal capacitance Clb is formed between the pixel electrode 17b and the common electrode com.

In the pixel 102, which is adjacent to the pixel 101 in the column direction, the pixel electrodes 17c and 17d are connected to each other through a coupling capacitance Ccd; the pixel electrode 17c is connected to the data signal line 15x through a transistor 12c that is connected to a scan signal line 16y; a storage capacitance Chc is formed between the pixel electrode 17c and a storage capacitance wiring 18q; a storage capacitance Chd is formed between the pixel electrode 17d and the storage capacitance wiring 18q; a liquid crystal capacitance Clc is formed between the pixel electrode 17c and the common electrode com; and a liquid crystal capacitance Cld is formed between the pixel electrode 17d and the common electrode com.

In the pixel 103, which is adjacent to the pixel 101 in the row direction, the pixel electrodes 17A and 17B are connected together through a coupling capacitance CAB; the pixel electrode 17A is connected to a data signal line 15y through a transistor 12A that is connected to the scan signal line 16x; a storage capacitance ChA is formed between the pixel electrode 17A and the storage capacitance wiring 18p; a storage capacitance ChB is formed between the pixel electrode 17B and the storage capacitance wiring 18p; a liquid crystal capacitance ClA is formed between the pixel electrode 17A and the common electrode com; and a liquid crystal capacitance ClB is formed between the pixel electrode 17B and the common electrode com.

In a liquid crystal display device equipped with the present liquid crystal panel, scan is performed sequentially, and the scan signal lines 16x and 16y are selected sequentially. For example, when the scan signal line 16x is selected, because the pixel electrode 17a is connected to the data signal line 15x (through the transistor 12a), and the pixel electrode 17a and the pixel electrode 17b are capacitively-coupled through the coupling capacitance Cab, when the capacitance value of Cla equals the capacitance value of Clb equals Cl, the capacitance value of Cha equals the capacitance value of Chb, the capacitance value of Cab equals Cl, the potential of the pixel electrode 17a after the transistor 12a is turned off is Va, and the potential of the pixel electrode 17b after the transistor 12a is turned off is Vb, Vb becomes equal to Va times [Cl/(Cl+Ch+Cl)]]. In other words, |Va|≥|Vb| (here, |Va| means a difference in potential between Va and com potential=Vcom, for example), and therefore, sub-pixels including the pixel electrode 17a becomes bright sub-pixels, and sub-pixels including the pixel electrode 17b becomes dark sub-pixels when displaying halftones, and an image can be displayed by area gradation of these bright and dark sub-pixels. With this configuration, the view angle characteristics of the above-mentioned liquid crystal display device can be improved.

Figure 2:
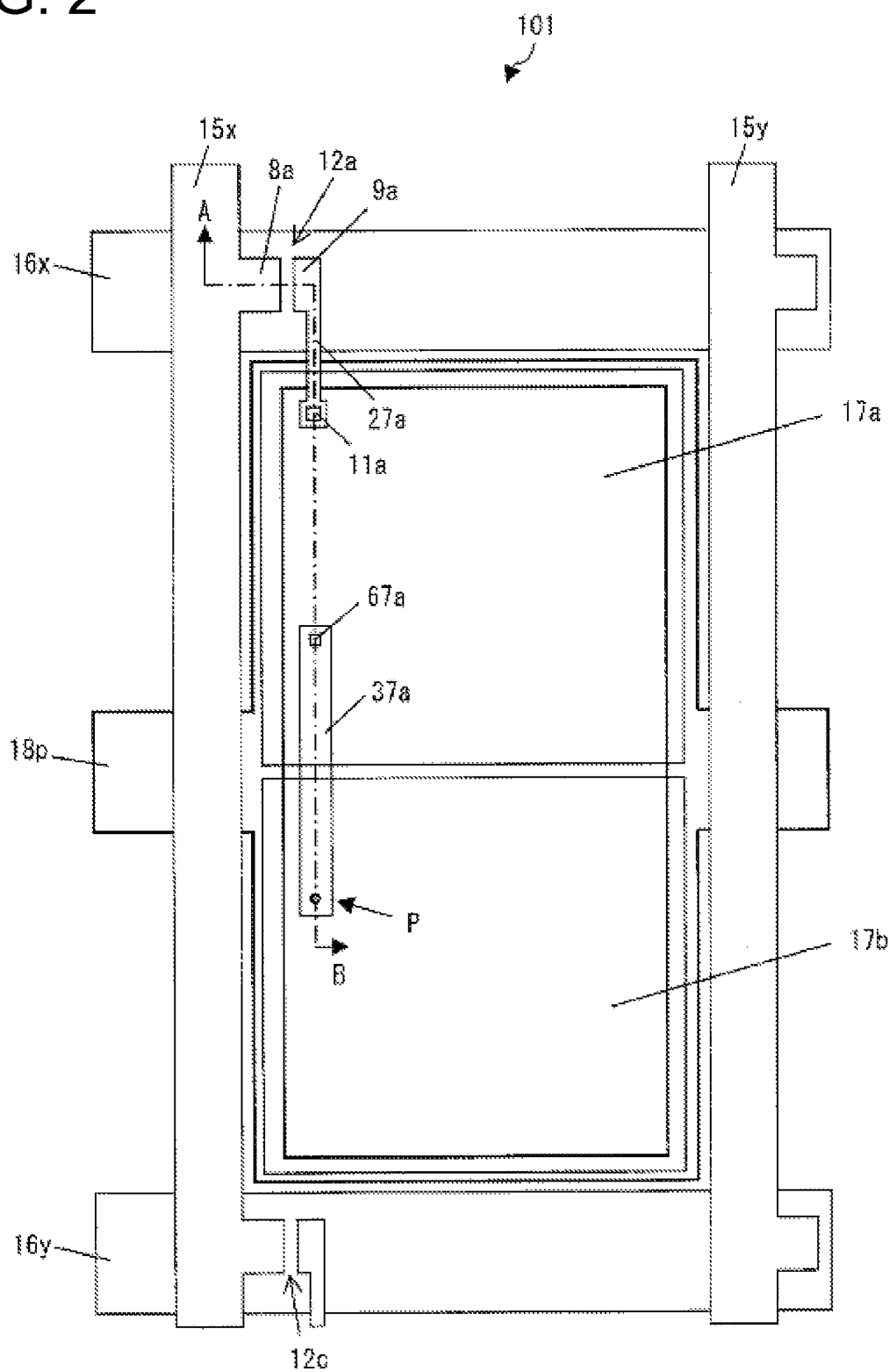
FIG. 2 is a plan view showing a specific example of the liquid crystal panel of FIG. 1.

A specific example of the pixel 101 of FIG. 1 is shown in FIG. 2. As shown in the figure, the transistor 12a is disposed in the proximity of the intersection of the data signal line 15x and the scan signal line 16x, and in the pixel region defined by the signal lines (15x and 16x), a rectangular-shaped pixel electrode 17a and a rectangular-shaped pixel electrode 17b are arranged in the column direction, and one of four sides constituting the perimeter of the first pixel electrode and one of four sides constituting the perimeter of the second pixel electrode are disposed adjacent to each other. The capacitance electrode 37a (the first capacitance electrode) is disposed such that it crosses a space between these two adjacent sides (a space between the pixel electrodes 17a and 17b) and extends in the column direction so as to overlap each of the pixel electrodes 17a and 17b. The storage capacitance wiring 18p has a storage capacitance wiring extended portion that is branched off from the storage capacitance wiring 18p, and is disposed such that it extends to overlap a part of the edges of the pixel electrodes 17a and 17b when observed in a plan view. The storage capacitance wiring extended portion of the storage capacitance wiring 18p extends along the data signal lines 15x and 15y as well as the scan signal lines 16x and 16y so as to surround the pixel regions, and extends so as to overlap each of three sides excluding two sides that form the space between the pixel electrodes 17a and 17b. Due to the shape of this storage capacitance wiring 18p, it is possible to suppress a jumping of electric charge from the data signal lines 15x and 15y and from the scan signal lines 16x and 16y, and therefore, improvement effects of a burn-in of a floating pixel can be obtained. Moreover, because the storage capacitance wiring 18p can have redundancy due to the branching structure, the yield can be improved. Such a structure of the storage capacitance wiring 18p can be applied to the respective embodiments of a liquid crystal panel, which will be described later, and similar effects can be achieved.

Over the scan signal line 16x, a source electrode 8a and a drain electrode 9a of the transistor 12a are formed, and the source electrode 8a is connected to the data signal line 15x. The drain electrode 9a is connected to a drain lead-out wiring 27a, and the drain lead-out wiring 27a is connected to the pixel electrode 17a through the contact hole 11a. The capacitance electrode 37a is connected to the pixel electrode 17a through a contact hole 67a, and overlaps the pixel electrode 17b through an interlayer insulating film, and the coupling capacitance Cab (see FIG. 1) between the pixel electrodes 17a and 17b is formed at the location of the overlap. Further, the capacitance electrode 37a is formed such that it overlaps the pixel electrode 17a through the interlayer insulating film, and that the area of the overlapped portion is substantially equal to the area of the overlapped portion between the capacitance electrode 37a and the pixel electrode 17b.

The pixel electrode 17a and the storage capacitance wiring 18p overlap each other through an interlayer insulating film and a gate insulating film, and the storage capacitance Cha (see FIG. 1) is formed at the location of the overlap, the pixel electrode 17b and the storage capacitance wiring 18p overlap through the interlayer insulating film and the gate insulating film, and the storage capacitance Chb (see FIG. 1) is formed at the location of the overlap. Furthermore, the configuration (the shapes and locations of the respective members, and the relation of connection among them) of other pixels is same as that of the pixel 101.

According to this configuration, the sub-pixel that includes the pixel electrode 17a becomes a bright sub-pixel (hereinafter "BR"), and the sub-pixel that includes the pixel electrode 17b becomes a dark sub-pixel (hereinafter "DA").

Figure 3:
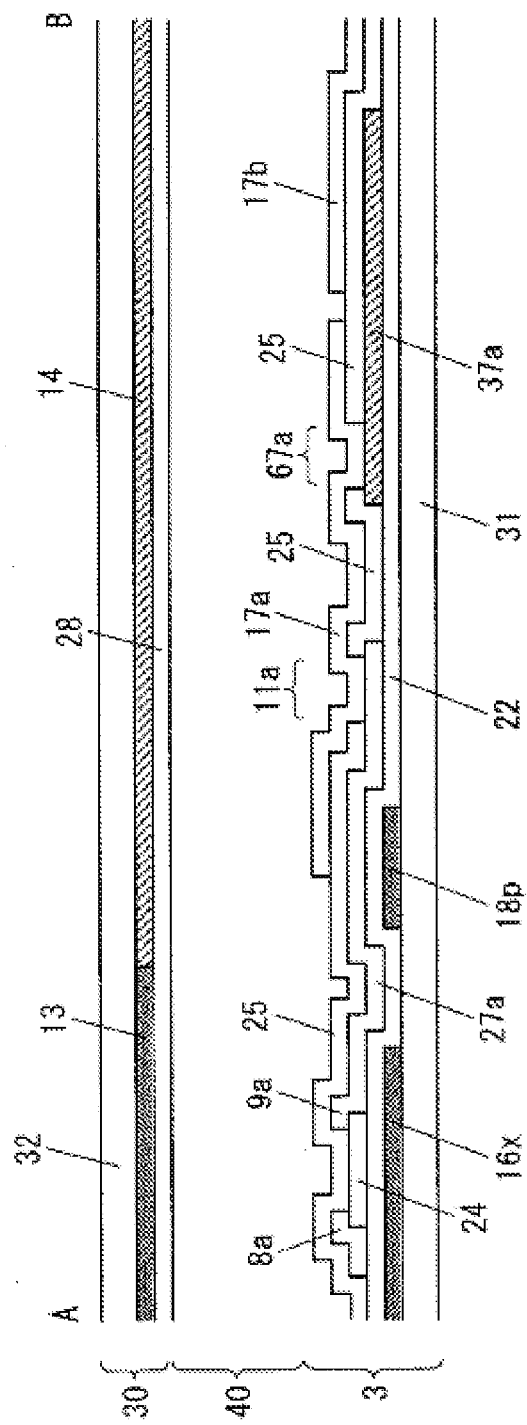
FIG. 3 is a cross-sectional arrow view taken along the line A-B of FIG. 2.

FIG. 3 is a cross-sectional arrow view taken along the line A-B of FIG. 2. As shown in the figure, the present liquid crystal panel includes an active matrix substrate 3, a color filter substrate 30 facing the active matrix substrate, and a liquid crystal layer 40 interposed between the substrates (3 and 30).

In the active matrix substrate 3, the scan signal line 16x and the storage capacitance wiring 18p are formed over a glass substrate 31, and an inorganic gate insulating film 22 is formed so as to cover them. Over the inorganic gate insulating film 22, a semiconductor layer 24 (i layer and n+ layer), a source electrode 8a and a drain electrode 9a that are in contact with the n+ layer, a drain lead-out wiring 27a, and the capacitance electrode 37a are formed, and an inorganic interlayer insulating film 25 is formed so as to cover them. Over the inorganic interlayer insulating film 25, the pixel electrodes 17a and 17b are formed, and an alignment film (not shown) is further formed to cover the pixel electrodes 17a and 17b. Here, in the contact hole 11a, the inorganic interlayer insulating film 25 is removed, and therefore, the pixel electrode 17a and the drain lead-out wiring 27a are connected to each other. Similarly, in the contact hole 67a, the inorganic interlayer insulating film 25 is removed, and therefore, the pixel electrode 17a and the capacitance electrode 37a are connected to each other. The capacitance electrode 37a, which is formed in the same layer with the drain lead-out wiring 27a, overlaps the pixel electrode 17b through the inorganic interlayer insulating film 25, and consequently, the coupling capacitance Cab (see FIG. 1) is formed.

Meanwhile, in the color filter substrate 30, a colored layer 14 is formed over a glass substrate 32, and a common electrode (com) 28 is formed over the color layer 14, and an alignment film (not shown) is further formed so as to cover the common electrode (com) 28.

Figure 5:
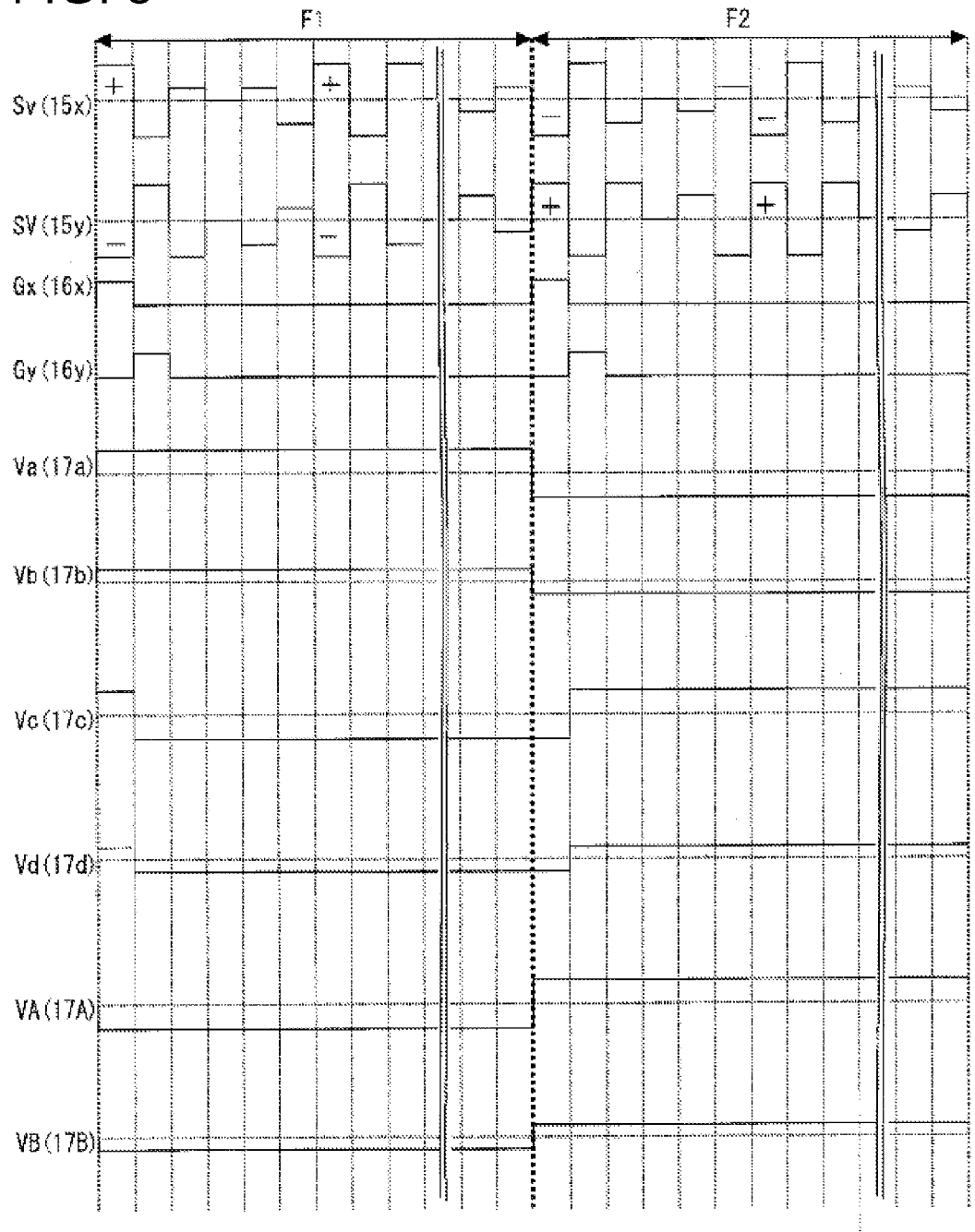
FIG. 5 is a timing chart showing a driving method of the liquid crystal display device equipped with the liquid crystal panel of FIG. 1.
Figure 6:
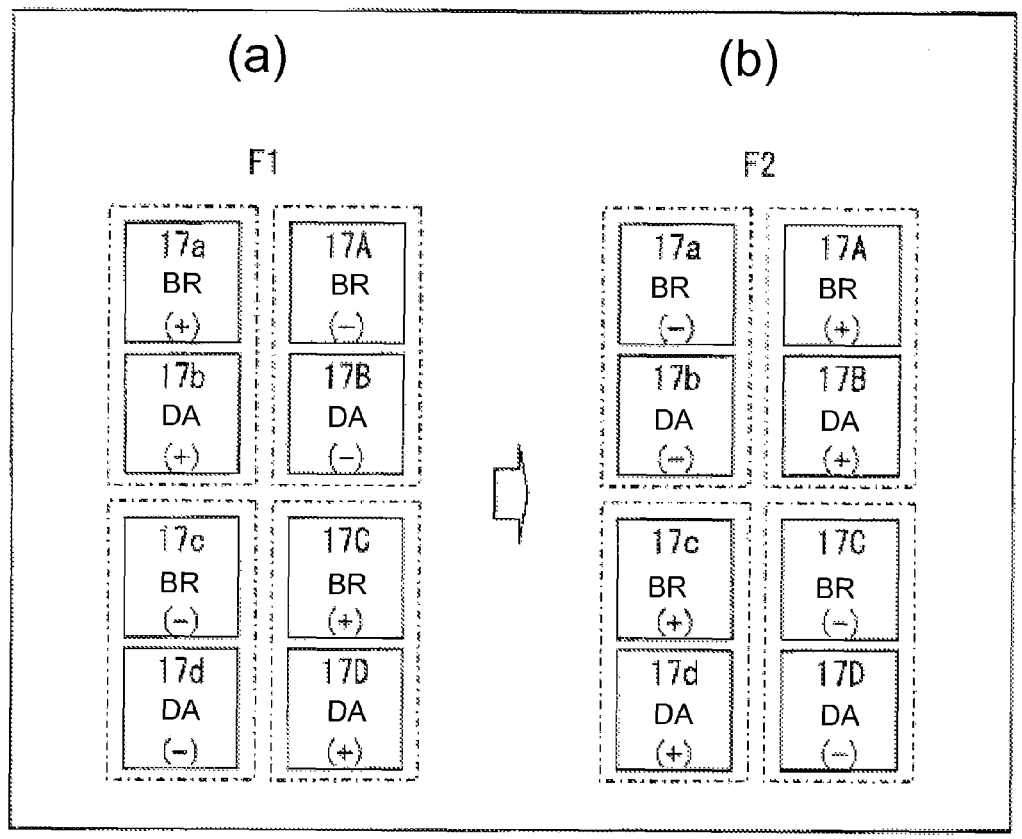
FIG. 6 is a schematic view showing the display state of respective frames when the driving method of FIG. 5 is used.

FIG. 5 is a timing chart showing the driving method of the present liquid crystal display device (liquid crystal display device operating in the normally black mode) equipped with the liquid crystal panel shown in FIG. 1 and FIG. 2. Here, Sv and SV show a signal potential supplied to the respective two data signal lines (15x and 15y, for example) adjacent to each other, Gx and Gy show a gate-on pulse signal supplied to the scan signal lines 16x and 16y, Va and Vb, VA and VB, Vc and Vd respectively show potential of the pixel electrodes 17a and 17b, 17A and 17B, 17c and 17d.

In this driving method, as shown in FIG. 5, scan signal lines are selected sequentially, the polarity of the signal potential supplied to the data signal lines is reversed in every one horizontal scan period (1H), the polarity of the signal potential supplied during the same horizontal scan period in each frame is reversed for each frame, and during the same horizontal scan period, signal potentials of opposite polarities are supplied to two adjacent data signal lines.

More specifically, in F1 of consecutive frames F1 and F2, scan signal lines are sequentially selected (the scan signal lines 16x and 16y are selected in this order, for example), and to one of the two neighboring data signal lines (the data signal line 15x, for example), a signal potential of positive polarity is supplied during the first horizontal scan period (including the writing period of the pixel electrode 17a, for example), and a signal potential of negative polarity is supplied during the second horizontal scan period (including the writing period of the pixel electrode 17c, for example). To the other of the neighboring data signal lines (data signal line 15y, for example), a signal potential of negative polarity is supplied during the first horizontal scan period (including the writing period of the pixel electrode 17A, for example), and a signal potential of positive polarity is supplied to the second horizontal scan period (including the writing period of the pixel electrode 17C, for example). As a result, as shown in FIG. 5, relations of |Va|≥|Vb|, |Vc|≥|Vd|, and |VA|≥|VB| are satisfied. The sub-pixel that includes the pixel electrode 17a (positive polarity) becomes "BR", and the sub-pixel that includes the pixel electrode 17b (positive electrode) becomes "DA", the sub-pixel that includes the pixel electrode 17c (negative polarity) becomes "BR", the sub-pixel that includes the pixel electrode 17d (negative polarity) becomes "DA", the sub-pixel that includes the pixel electrode 17A (negative polarity) becomes "BR", the sub-pixel that includes the pixel electrode 17B (negative polarity) becomes "DA". FIG. 6(a) shows the overall picture.

In F2, the scan signal lines are sequentially selected (the scan signal lines 16x and 16y are selected in this order, for example), and to one of the two neighboring data signal lines (the data signal line 15x, for example), a signal potential of negative polarity is supplied during the first horizontal scan period (including the writing period of the pixel electrode 17a, for example), and a signal potential of positive polarity is supplied during the second horizontal scan period (including the writing period of the pixel electrode 17c, for example). To the other of the two data signal lines (the data signal line 15y, for example), a signal potential of positive polarity is supplied during the first horizontal scan period (including the writing period of the pixel electrode 17A, for example), and a signal potential of negative polarity is supplied to the second horizontal scan period (including the writing period of the pixel electrode 17C, for example). With this configuration, as shown in FIG. 5, relations of |Va|≥|Vb|, |Vc|≥|Vd|, and |VA|≥|VB| are satisfied, and the sub-pixel that includes the pixel electrode 17a (negative) becomes "BR", the sub-pixel that includes the pixel electrode 17b (negative) becomes "DA", the sub-pixel that includes the pixel electrode 17c (positive polarity) becomes "BR", the sub-pixel that includes the pixel electrode 17d (positive polarity) becomes "DA", the sub-pixel that includes the pixel electrode 17A (positive polarity) is "BR", and the sub-pixel that includes the pixel electrode 17B (positive polarity) becomes "DA". FIG. 6(b) shows the overall picture.

Figure 7:
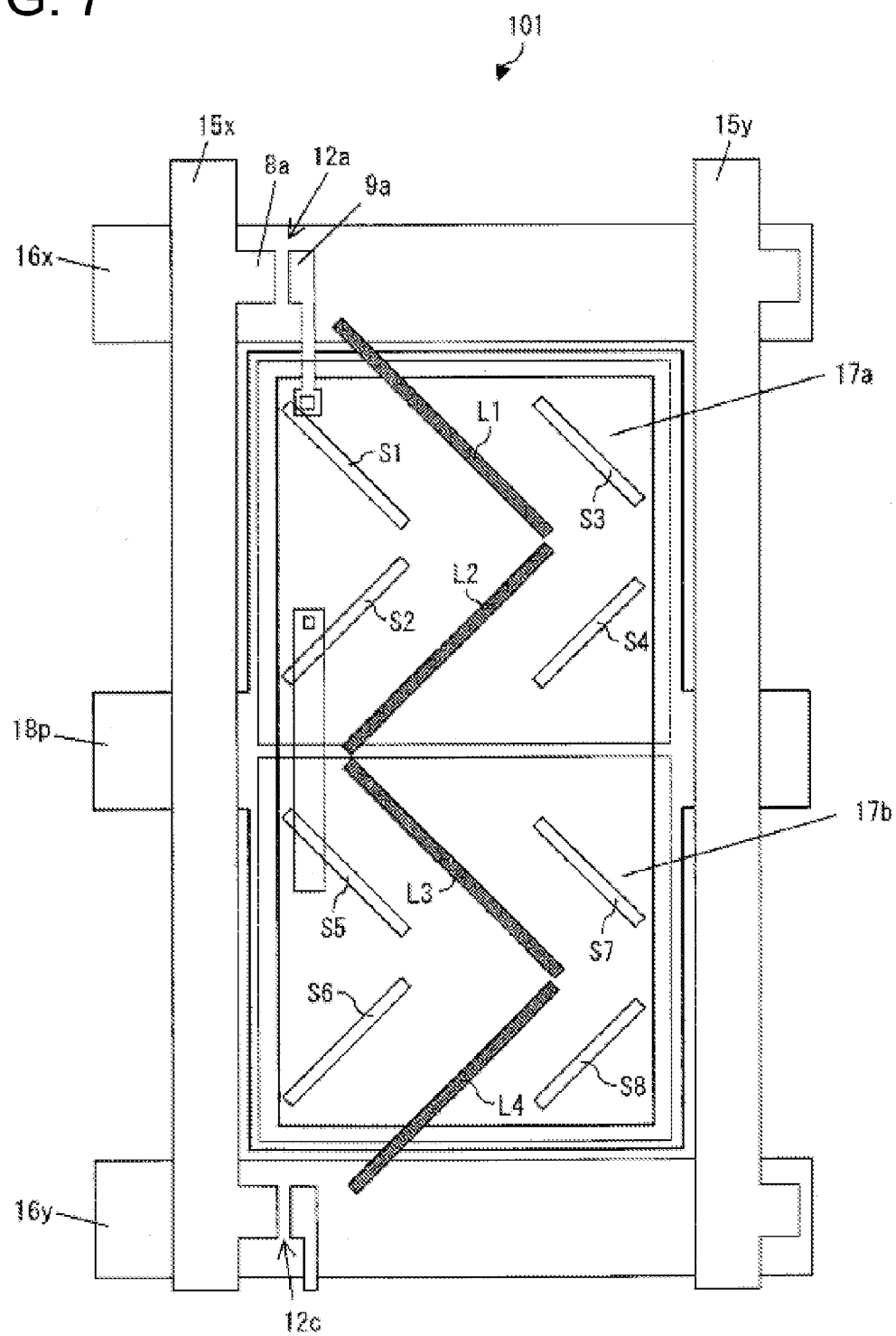
FIG. 7 is a plan view showing another specific example of the liquid crystal panel shown in FIG. 1.

The alignment control structure is omitted in FIG. 2. However, for a liquid crystal panel of MVA (Multi-domain Vertical Alignment) system, for example, as shown in FIG. 7, for example, alignment control slits S1 to S4 are provided for the pixel electrode 17a, and alignment control ribs L1 and L2 are provided on the color filter substrate at locations corresponding to the pixel electrode 17a. Alignment control slits S5 to S8 are provided for the pixel electrode 17b, and alignment control ribs L3 and L4 are provided on the color filter substrate at locations corresponding to the pixel electrode 17b. Here, instead of providing the aforementioned alignment control ribs, alignment control slits may be provided in the common electrode of the color filter substrate.

Figure 8:
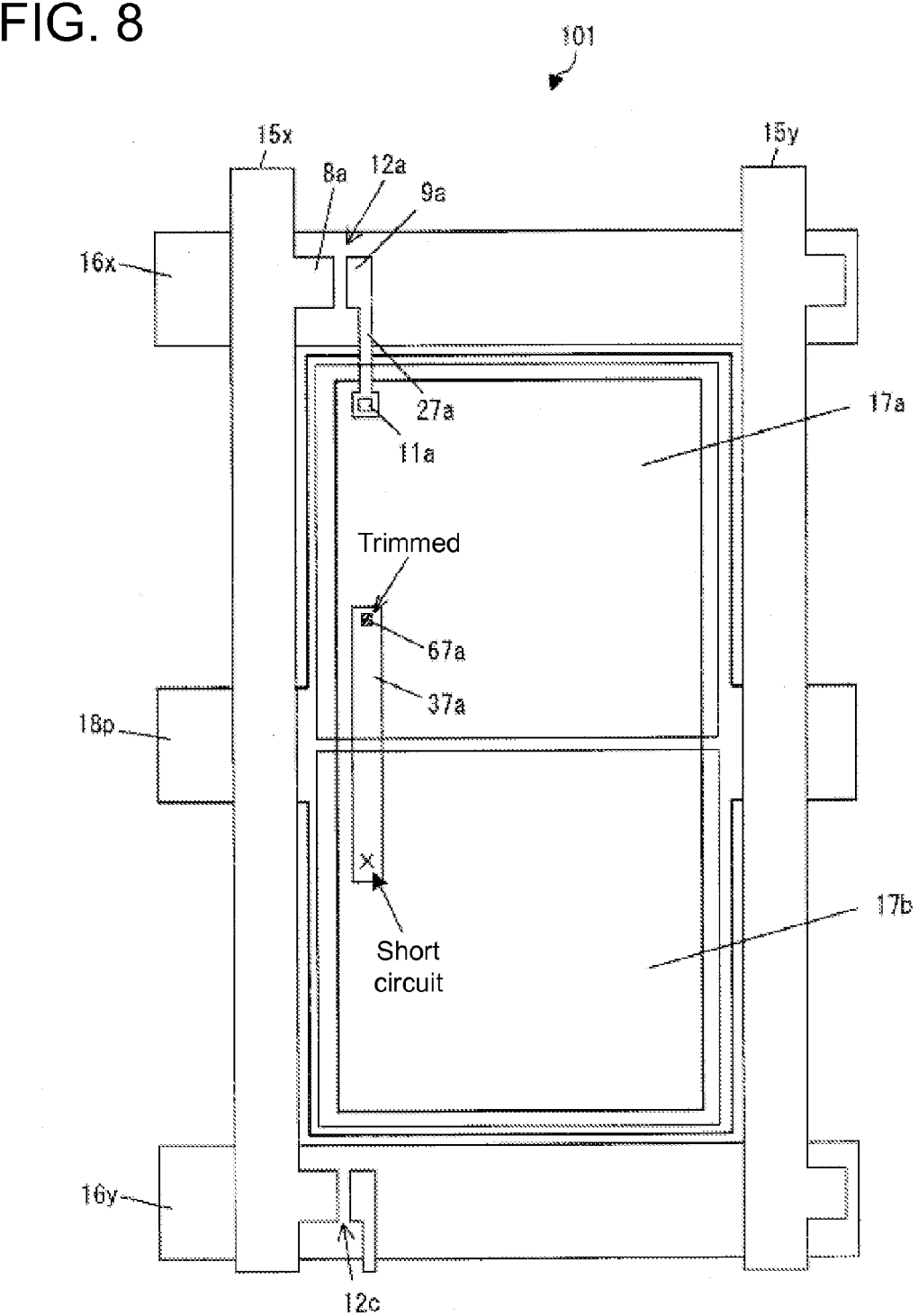
FIG. 8 is a plan view showing a repair method of the liquid crystal panel of FIG. 2.

Here, in the liquid crystal panel of FIG. 2, because the pixel electrode 17a and the pixel electrode 17b are connected (capacitively-coupled) by the coupling capacitance (Cab), if the capacitance electrode 37a is short-circuited to the pixel electrode 17b at "P" in FIG. 2, for example, as shown in FIG. 8, by removing (trimming) a portion of the pixel electrode 17a inside the contact hole 67a by a laser or the like to electrically disconnect the pixel electrode 17a from the capacitance electrode 37a, the capacitance coupling of the pixel electrodes 17a and 17b can be maintained through a coupling capacitance that is formed in the location where the pixel electrode 17a and the capacitance electrode 37a overlap. This way, according to the present embodiment, a higher production yield of the liquid crystal panel and the active matrix substrate for use in the liquid crystal panel can be achieved.

Further, in the present liquid crystal panel, the capacitance electrode 37a is disposed such that an area it overlaps the pixel electrode 17a and an area it overlaps the pixel electrode 17b are substantially equal to each other, and therefore, a value of the coupling capacitance before and after the short-circuit (that is, a capacitance value formed in a portion where the capacitance electrode 37a and the pixel electrode 17b overlap (before the short-circuit) and a capacitance value formed in a portion where the capacitance electrode 37a and the pixel electrode 17a overlap (after the short-circuit)) is unlikely to change. Accordingly, the potential of the pixel electrodes 17a and 17b can be controlled normally.

Next, a method for manufacturing the present liquid crystal panel is described. The method for manufacturing the liquid crystal panel includes the steps of: manufacturing the active matrix substrate; manufacturing the color filter substrate; and assembling the substrates in which the substrates are bonded together and the liquid crystal is filled. Also, if any defective pixel (sub-pixel) is found in the inspection conducted at least during or after the manufacturing process or the assembly process of the active matrix substrate, a repair process to correct the defect is added to the entire process.

Below, the process of manufacturing the active matrix substrate is described.

First, over a substrate made of glass, plastic, or the like, a metal film of titanium, chrome, aluminum, molybdenum, tantalum, tungsten, copper, or the like, an alloy film of such metals, or a layered film (thickness: 1000 Å to 3000 Å) of such metals is deposited by sputtering. Then, patterning is conducted by a photolithographic technology (Photo Engraving Process; hereinafter referred to as the "PEP technique") to form scan signal lines, gate electrodes of transistors (in some cases, the scan signal line also functions as the gate electrode), and storage capacitance wirings.

Next, over the entire substrate with the scan signal lines and the like formed thereon, an inorganic insulating film (thickness: approx. 3000 Å to 5000 Å) made of silicon nitride, silicon oxide, or the like is deposited by CVD (Chemical Vapor Deposition) to form a gate insulating film.

Subsequently, an intrinsic amorphous silicon film (thickness: 1000 Å to 3000 Å) and an n+ amorphous silicon film (thickness: 400 Å to 700 Å) doped with phosphorus are continuously deposited over the gate insulating film (over the entire substrate) by CVD. Then, the films are patterned by the PEP technique to form an island-shaped multi-layered body of silicon composed of the intrinsic amorphous silicon layer and the n+ amorphous silicon layer on the gate electrode.

Next, over the entire substrate with the multi-layered body of silicon formed thereon, a metal film of titanium, chrome, aluminum, molybdenum, tantalum, tungsten, copper, or the like, an alloy film of such metals, or a layered film (thickness: 1000 Å to 3000 Å) of such metals is deposited by sputtering. Then, patterning is conducted by the PEP technique to form data signal lines, source electrodes and drain electrodes of transistors, drain lead-out wirings, and capacitance electrodes.

Further, using the source electrode and the drain electrode as a mask, the n+ amorphous silicon layer constituting the multi-layered body of silicon is etched away to form a transistor channel. Here, although the semiconductor layer may be formed of an amorphous silicon film as described above, a polysilicon film may alternatively be deposited. Also, the amorphous silicon film or the polysilicon film may optionally be subjected to a laser annealing treatment for improved crystallinity. This treatment makes the electrons in the semiconductor layer move faster, and therefore improves the characteristics of the transistor (TFT).

Next, over the entire substrate with data signal lines or the like formed thereon, an inorganic insulating film of silicon nitride, silicon oxide, or the like (thickness: 2000 Å to 5000 Å) is deposited by the CVD method to form an inorganic interlayer insulating film.

Subsequently, using the PEP technique, the interlayer insulating film is etched to form contact holes. Then, over the interlayer insulating film on the entire substrate with contact holes formed therein, a transparent conductive film made of ITO (Indium Tin Oxide), IZO (Indium Zinc Oxide), zinc oxide, tin oxide, or the like (thickness: 1000 Å to 2000 Å) is formed by sputtering. Then, patterning is conducted using the PEP technique to form each pixel electrode.

Lastly, a polyimide resin is printed for a thickness of 500 Å to 1000 Å over the entire substrate with the pixel electrodes formed thereon. Then, through baking and a unidirectional rubbing treatment using a rotating cloth, an alignment film is formed. The active matrix substrate is manufactured in this manner.

Below, the process of manufacturing the color filter substrate is described.

First, over a substrate made of glass, plastic, or the like (over the entire substrate), a chrome thin film or a resin containing a black pigment is deposited. Then, using the PEP technique, the film is patterned to form a black matrix. Next, in openings in the black matrix, a color filter layer (thickness: approx. 2 μm) of red, green, and blue is formed by patterning using a pigment dispersing method or the like.

Next, on the color filter layer over the entire substrate, a transparent conductive film (thickness: approx. 1000 Å) made of ITO, IZO, zinc oxide, tin oxide, or the like is deposited to form a common electrode (com).

Lastly, a polyimide resin is printed for a thickness of 500 Å to 1000 Å over the entire substrate with the pixel electrodes formed thereon. Then, through baking and a unidirectional rubbing treatment using a rotating cloth, an alignment film is formed. The color filter substrate can be manufactured in this manner.

Below, the assembly process is described.

First, a sealing material made of a thermosetting epoxy resin or the like is applied on either the active matrix substrate or the color filter substrate by screen printing in a frame-like pattern with an opening, which will be the inlet for the liquid crystal. On the other substrate, ball-shaped spacers made of plastic or silica and having a diameter equivalent to the thickness of the liquid crystal layer are dispersed.

Next, the active matrix substrate and the color filter substrate are bonded together, and the sealing material is cured.

Lastly, a liquid crystal material is introduced into the space surrounded by the active matrix substrate, the color filter substrate, and the sealing material by a decompression procedure. Then, a UV-curable resin is applied to the inlet for the liquid crystal and is subjected to UV radiation to seal in the liquid crystal material and thereby to form a liquid crystal layer. The liquid crystal panel is manufactured in this manner.

Described below is the first inspection process, which is conducted during the active matrix substrate manufacturing process (after the pixel electrodes are formed and before the alignment film is formed, for example), or after the active matrix substrate manufacturing process. In the first inspection process, the active matrix substrate is subjected to an appearance inspection, electro-optical inspection, and the like to identify the location of any short-circuit (short-circuit site). A short-circuit can occur between the capacitance electrode and the pixel electrode, for example. The appearance inspection refers to an optical inspection of the wiring pattern using a CCD camera or the like, and the electro-optical inspection refers to an inspection in which, after a modulator (electro-optic element) is installed facing the active matrix substrate, a voltage is applied and light is passed between the active matrix substrate and the modulator. The change in the light luminance is detected by a CCD camera for the electro-optical examination of the wiring pattern.

If any short-circuit site is detected, a repair process is conducted in which among pixel electrodes that are connected to the shorted capacitance electrode through a contact hole, a portion inside the contact hole is removed (trimmed) by a laser or the like. Or, if any short-circuit site is detected, a repair process may be conducted in which a shorted capacitance electrode or a conductive portion connected to the shorted capacitance electrode (drain lead-out wiring, for example) is cut by a laser. For the laser cutting, the fourth harmonic (wavelength: 266 nm) of YAG (Yttrium Aluminium Garnet) laser, for example, is used. High cutting precision can be obtained this way. Also, in the repair process conducted after the first inspection process, normally, laser light can be radiated from the front side (pixel electrode side) or the back side (substrate side) of the active matrix substrate.

The first inspection process and the repair process can be conducted after the pixel electrode is formed, after the capacitance electrode is formed, or after the transistor channel is formed. This way, defects can be corrected at an earlier stage of the manufacturing process, which can increase the production yield of the active matrix substrate.

Next, a second inspection process, which is conducted after the assembly process, is described. In the second inspection process, a short-circuit site is detected by performing a lighting test of the liquid crystal panel. Short-circuits may occur between the capacitance electrode and the pixel electrode, for example. Specifically, for example, to respective scan signal lines, a gate inspection signal having a bias voltage of −10V, frequency of 16.7 msec, pulse width of 50 μsec, and pulse voltage of +15V is input to turn all TFTs on. Further, a source inspection signal that has a potential of ±2V and reverses the polarity every 16.7 msec is input to respective data signal lines to write the signal potential corresponding to ±2V to the pixel electrode through the source electrode and the drain electrode of respective TFTs. Simultaneously, a common electrode inspection signal, which is a direct current and having a potential of −1V is input to the common electrode (com) and the storage capacitance wiring. At this time, a voltage is applied to the liquid crystal capacitance formed between the pixel electrodes and the common electrode, and to the storage capacitance formed between the pixel electrodes and the storage capacitance wiring, thereby lighting the sub-pixels formed of the pixel electrodes. At the short-circuit site, the pixel electrode and the capacitance electrode are conducted, and a sub-pixel that was supposed to be a dark sub-pixel becomes a bright sub-pixel. This way, short-circuits are detected.

If any short-circuit site is detected, a repair process is conducted in which a shorted capacitance electrode or a conductive portion connected to the shorted capacitance electrode (drain lead-out wiring, for example) is cut by a laser. In the repair process conducted after the second inspection process, normally, laser is radiated from the back side of the active matrix substrate (the substrate side of the active matrix substrate).

Figure 4:
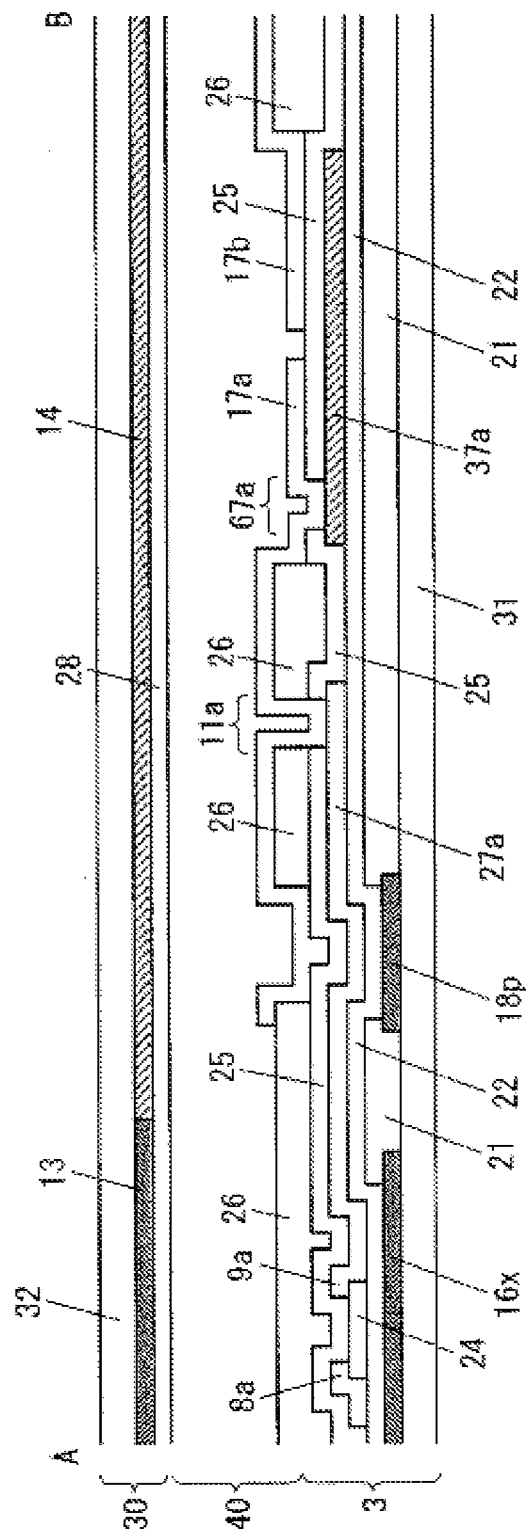
FIG. 4 is a cross-sectional arrow view of a modified configuration of FIG. 2, taken along the line A-B.

The cross-section taken along the line A-B of FIG. 2 can also be configured as shown in FIG. 4. That is, a thick organic gate insulating film 21 and a thin inorganic gate insulating film 22 are formed on the glass substrate 31, and a thin inorganic interlayer insulating film 25 and a thick organic interlayer insulating film 26 are formed under the pixel electrode. This configuration provides effects such as reduction in various parasitic capacitances, prevention of short-circuiting between wirings, and reduction of problems such as torn pixel electrode due to planarization. In this case, as shown in FIG. 4, it is preferable that the organic interlayer insulating film 26 be removed in a portion located above the capacitance electrode 37a and in a portion located above the storage capacitance wiring 18p. This way, the effects described above can be obtained while ensuring sufficient capacitance values of the coupling capacitance (Cab) and the storage capacitances (Cha and Chb).

The inorganic interlayer insulating film 25, the organic interlayer insulating film 26, and the contact hole 11a of FIG. 4 can be formed as described below, for example. That is, after the transistors (TFT) and the data signal lines are formed, an inorganic interlayer insulating film 25 (passivation film) made of SiNx having a thickness of about 3000 Å is formed over the entire substrate by CVD using a mixed gas of $SiH_4$, $NH_3$, and $N_2$. Then, the organic interlayer insulating film 26 made of a positive photosensitive acrylic resin having a thickness of about 3 μm is formed by spin coating or die coating. Subsequently, a pattern is formed on the organic interlayer insulating film 26 by photolithography for the removal portion and contacts. Further, using the patterned organic interlayer insulating film 26 as a mask, the inorganic interlayer insulating film 25 is dry-etched using a mixed gas of $CF_4$ and $O_2$. Specifically, for example, for the removal portion of the organic interlayer insulating film, the film is half-exposed in the photolithography process so that when the development is complete, a thin layer of the organic interlayer insulating film is preserved, and for the contact holes, the film is fully exposed in the photolithography process so that when the development is complete, no residue of the organic interlayer insulating film remains. Here, dry-etching is conducted using a mixed gas of $CF_4$ and $O_2$ to remove the preserved layer (of the organic interlayer insulating film) for the removal portion of the organic interlayer insulating film, and to remove portions of the inorganic interlayer insulating film, which are under the organic interlayer insulating film, for the contact hole portions. The organic gate insulating film 21 and the organic interlayer insulating film 26 may be an insulating film made of SOG (spin-on-glass) material, for example. The organic gate insulating film 21 and the organic interlayer insulating film 26 may contain at least any one of the acrylic resin, epoxy resin, polyimide resin, polyurethane resin, novolac resin, and siloxane resin.

Figure 9:
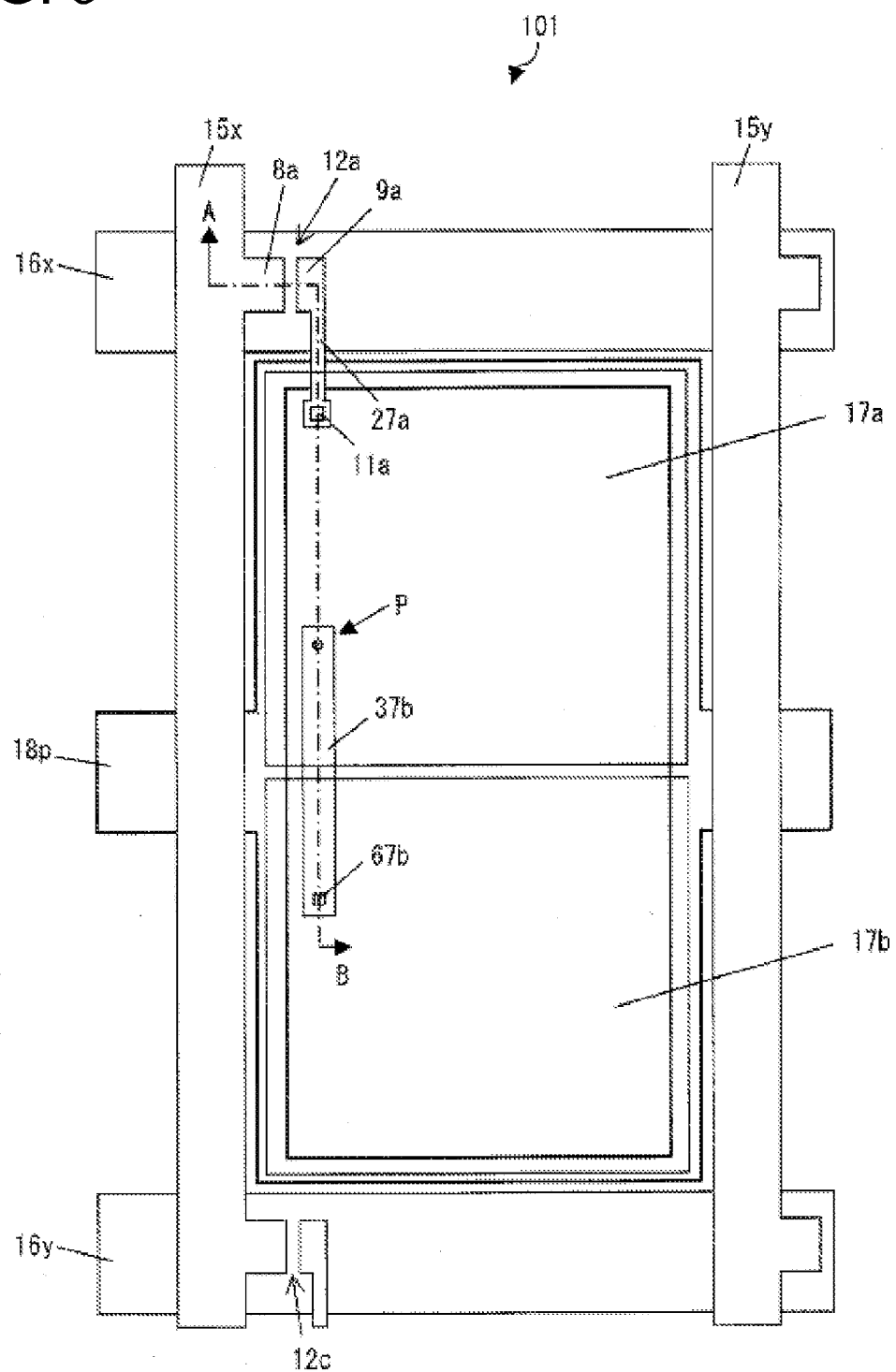
FIG. 9 is a plan view showing another specific example of the liquid crystal panel shown in FIG. 1.
Figure 10:
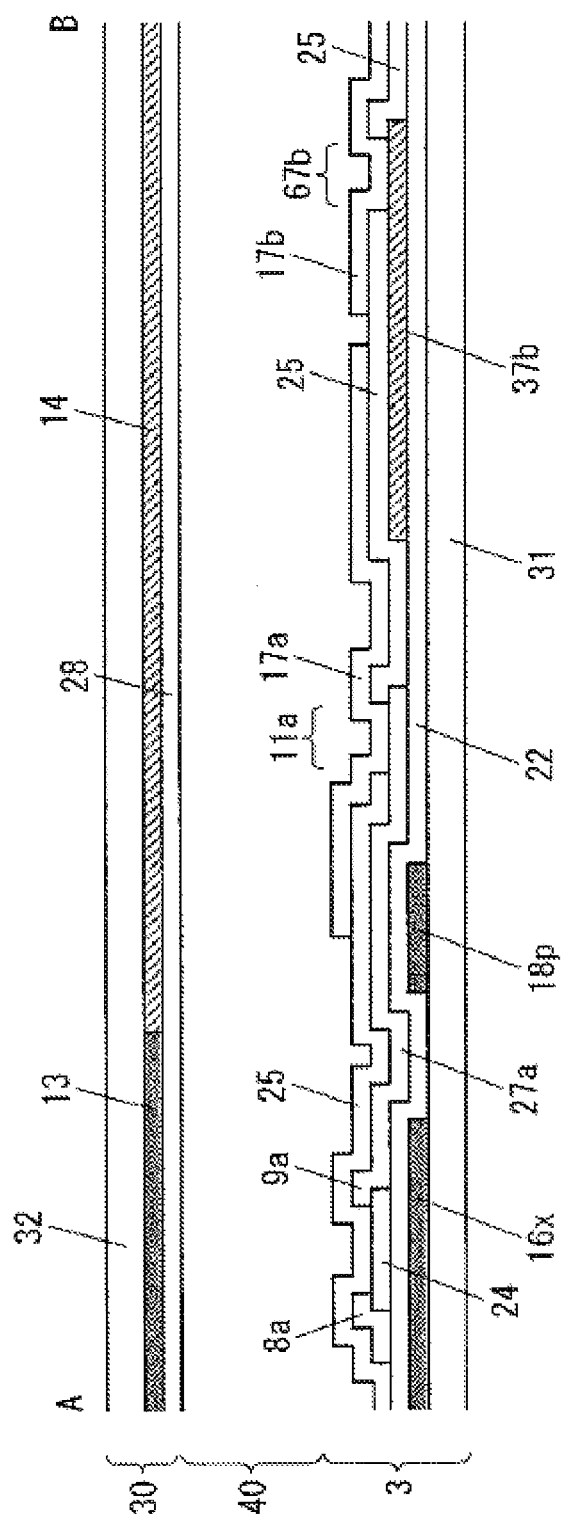
FIG. 10 is a cross-sectional arrow view taken along the line A-B of FIG. 9.

The pixel 101 of FIG. 2 may be modified as shown in FIG. 9. FIG. 10 is a cross-sectional arrow view taken along the line A-B of FIG. 9. As shown in FIGS. 9 and 10, the present liquid crystal panel has a configuration in which a capacitance electrode is electrically connected to pixel electrodes corresponding to sub-pixels that will be dark sub-pixels. Specifically, in the present liquid crystal panel, the drain electrode 9a of the transistor 12a is connected to the pixel electrode 17a through the contact hole 11a, and the pixel electrode 17b and the capacitance electrode 37b (a first capacitance electrode) are connected through a contact hole 67b. The pixel electrodes 17a and 17b are connected (capacitively-coupled) to each other through a capacitance (coupling capacitance) formed by overlapping the capacitance electrode 37b, which is electrically connected to the pixel electrode 17b, with the pixel electrode 17a through the interlayer insulating film 25. Further, the capacitance electrode 37b is formed such that it overlaps the pixel electrode 17b through the interlayer insulating film, and the area of the overlapped portion becomes substantially equal to the area of the overlapped portion between the capacitance electrode 37b and the pixel electrode 17a.

According to this configuration, because the pixel electrode 17a and the pixel electrode 17b are connected by the coupling capacitances (Cab), if the capacitance electrode 37b is short-circuited to the pixel electrode 17a (in the manufacturing process or the like) at "P" in FIG. 9, for example, by removing (trimming) a portion of the pixel electrode 17b inside the contact hole 67b to electrically disconnect the pixel electrode 17b from the capacitance electrode 37b by a laser or the like, the capacitance coupling of the pixel electrodes 17a and 17b can be maintained through a coupling capacitance formed at a portion where the pixel electrode 17b and the capacitance electrode 37b overlap. This way, according to the present embodiment, a higher production yield of the liquid crystal panel and the active matrix substrate for use in the liquid crystal panel can be achieved.

Furthermore, in the present liquid crystal panel, the capacitance electrode 37b is disposed such that an area it overlaps the pixel electrode 17a and an area it overlaps the pixel electrode 17b are equal to each other, and therefore, a value of the coupling capacitance before and after a short-circuit (that is, a capacitance value formed in a portion where the capacitance electrode 37b and the pixel electrode 17a overlap (before the short-circuit) and a capacitance value formed in a portion where the capacitance electrode 37b and the pixel electrode 17b overlap (after the short-circuit)) is unlikely to change. Accordingly, potential of the pixel electrodes 17a and 17b can be controlled normally.

Figure 11:
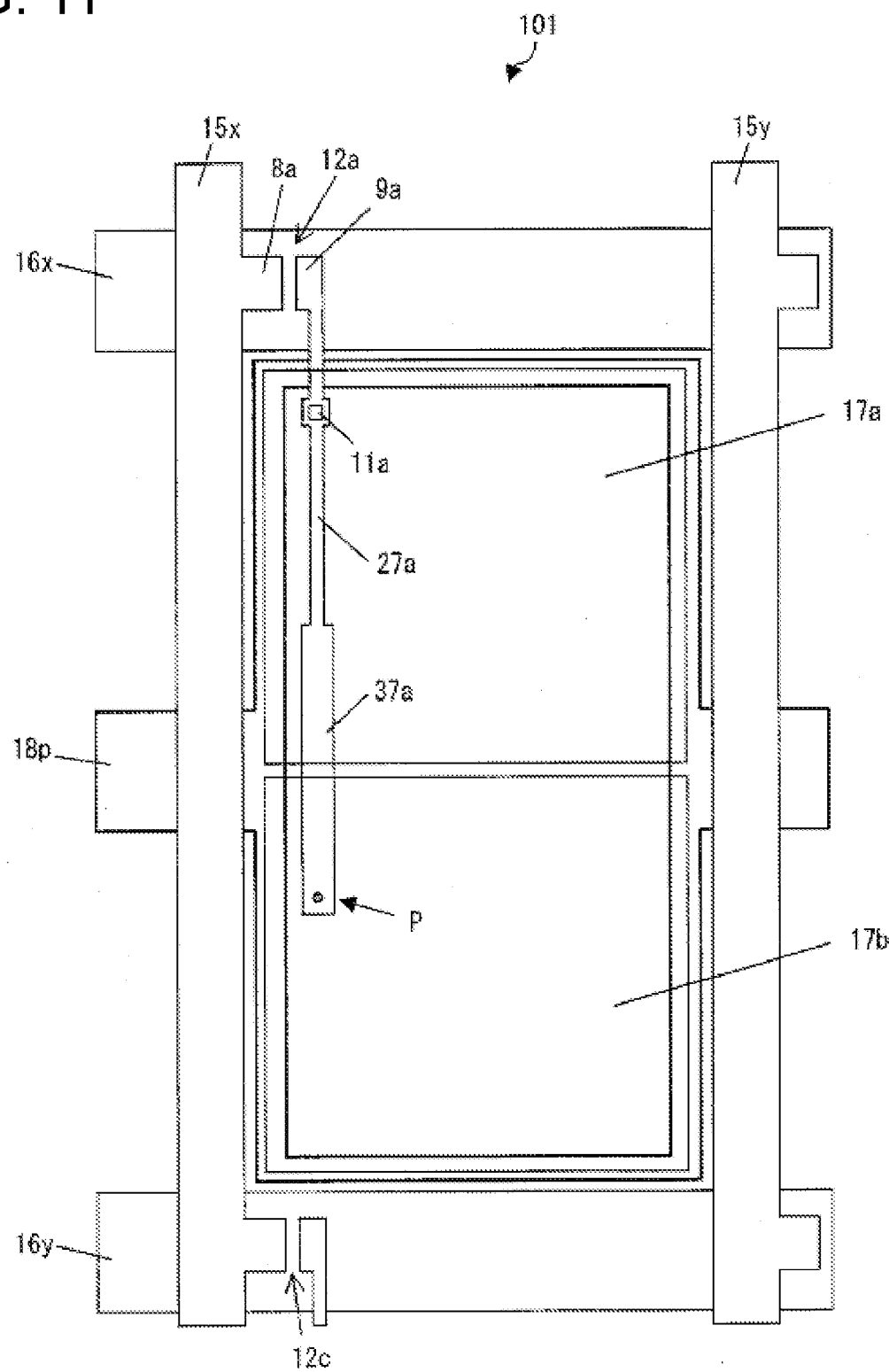
FIG. 11 is a plan view showing another specific example of the liquid crystal panel shown in FIG. 1.

The pixel 101 of FIG. 2 may be modified as shown in FIG. 11. In a liquid crystal panel of FIG. 11, the drain electrode 9a of the transistor 12a is connected to the drain lead-out wiring 27a, and the drain lead-out wiring 27a leads to the capacitance electrode 37a formed in the same layer, and is also connected to the pixel electrode 17a through the contact hole 11a. Moreover, in the present liquid crystal panel, the area of the portion where the capacitance electrode 37a and the pixel electrode 17b overlap is also substantially equal to the area of the overlapped portion between the capacitance electrode 37a and the pixel electrode 17a.

Figure 12:
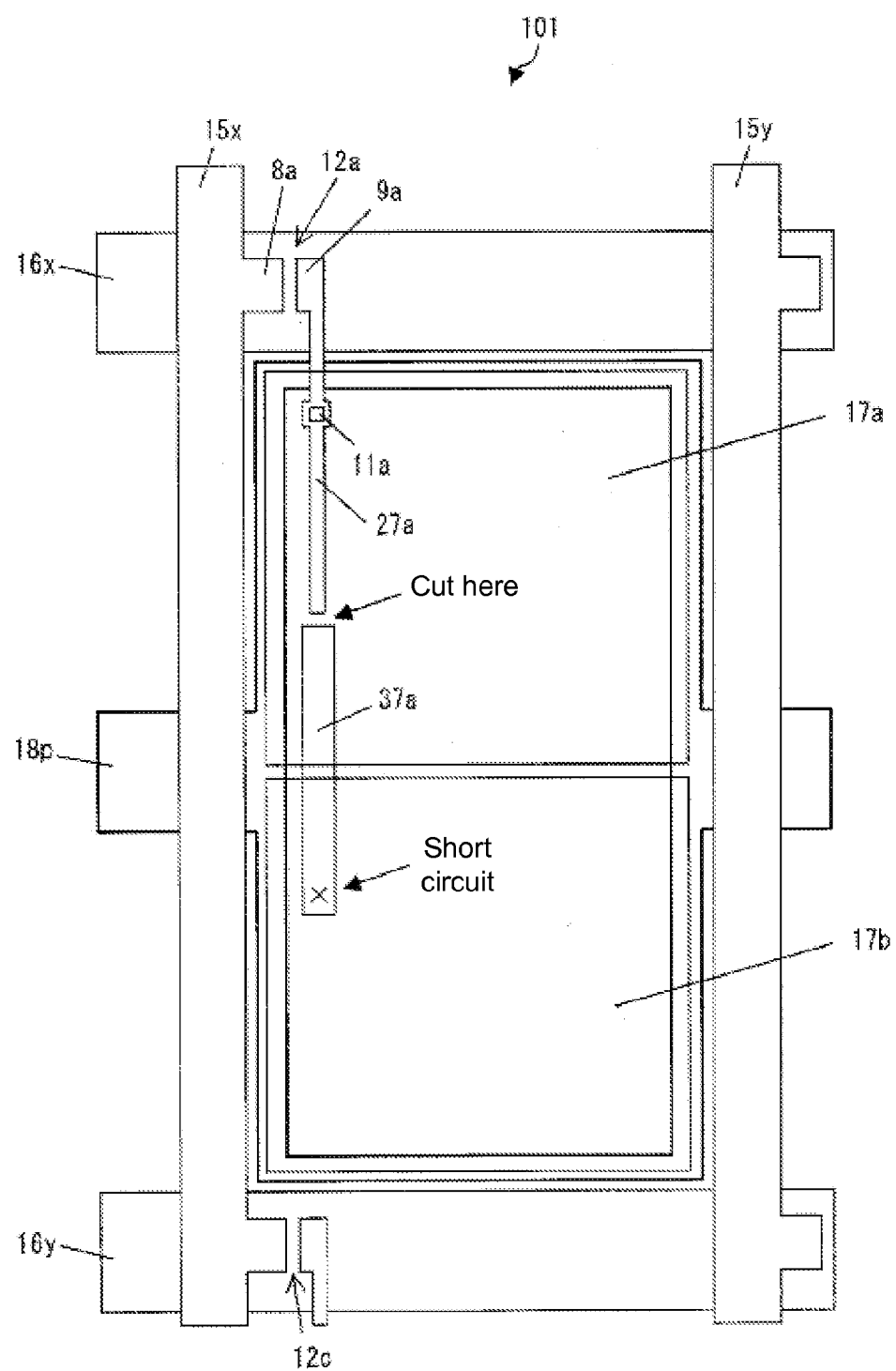
FIG. 12 is a plan view showing a repair method of the liquid crystal panel of FIG. 11.

According to this configuration, if the capacitance electrode 37a is short-circuited to the pixel electrode 17b (in the manufacturing process or the like) at "P" in FIG. 11, for example, as shown in FIG. 12, a repair process is conducted in which the connected site of the drain lead-out wiring 27a and the capacitance electrode 37a is cut by a laser, so that the capacitance coupling of the pixel electrodes 17a and 17b can be maintained through the coupling capacitance (Cab) that is formed in a portion where the pixel electrode 17a and the capacitance electrode 37a overlap. This way, the effects described above (improvement of the manufacturing yield and a potential control of the pixel electrode 17b) can be obtained in the present embodiment as well.

Figure 13:
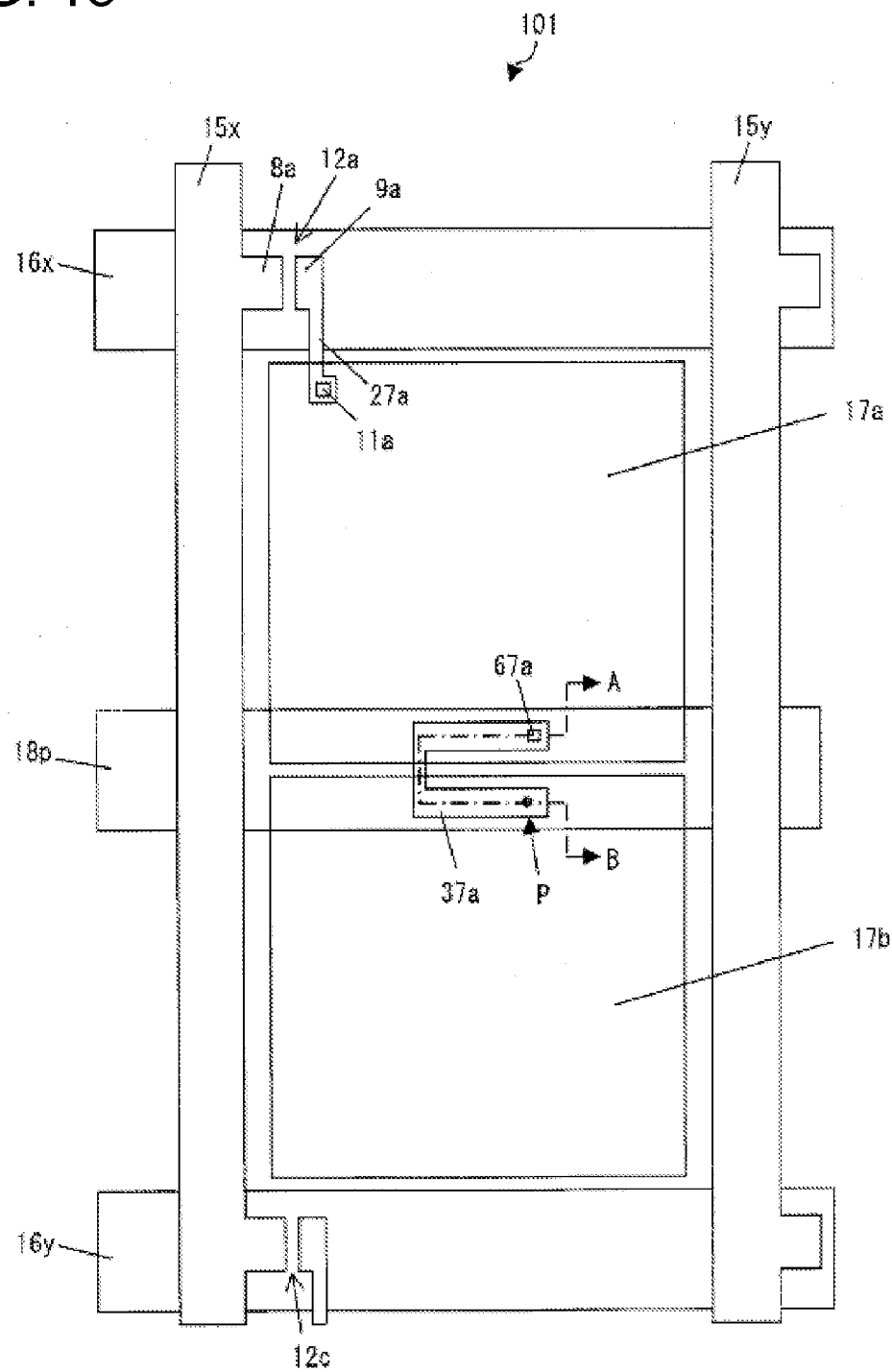
FIG. 13 is a plan view showing another specific example of the liquid crystal panel shown in FIG. 1.
Figure 14:
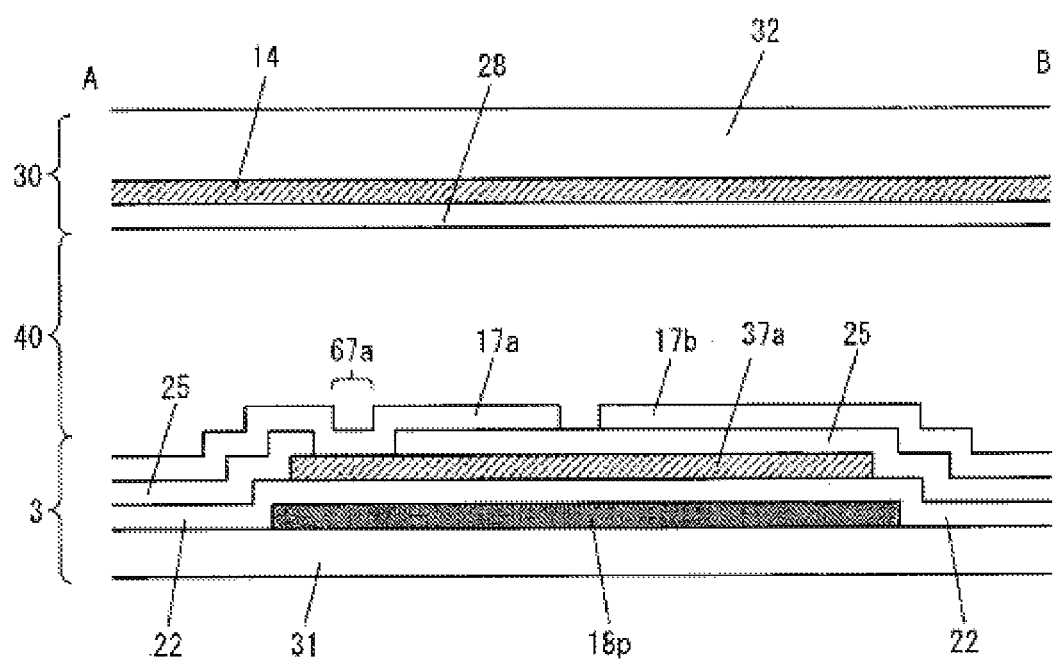
FIG. 14 is a cross-sectional arrow view taken along the line A-B of FIG. 13.

The pixel 101 of FIG. 2 may be modified as shown in FIG. 13. FIG. 14 is a cross-sectional arrow view taken along the line A-B of FIG. 13. In the present liquid crystal panel, the storage capacitance wiring 18p is disposed such that it extends in the row direction so as to overlap a space between the pixel electrodes 17a and 17b. The capacitance electrode 37a is formed in a U shape, and overlaps the storage capacitance wiring 18p, and the pixel electrodes 17a and 17b, respectively.

More specifically, the source electrode 8a and the drain electrode 9a of the transistor 12a are formed over the scan signal line 16x, and the source electrode 8a is connected to the data signal line 15x. The drain electrode 9a is connected to the drain lead-out wiring 27a, and the drain lead-out wiring 27a is connected to the pixel electrode 17a through the contact hole 11a. The capacitance electrode 37a is connected to the pixel electrode 17a through the contact hole 67a, and overlaps the pixel electrode 17b through the interlayer insulating film 25, and the coupling capacitance Cab (see FIG. 1) between the pixel electrodes 17a and 17b is formed in the location of the overlap. Also, the capacitance electrode 37a overlaps the storage capacitance wiring 18p through the gate insulating film 22, and most of the storage capacitance Cha (see FIG. 1) is formed at the location of the overlap. The pixel electrode 17b and the storage capacitance wiring 18p overlap through the interlayer insulating film 25 and the gate insulating film 22, and the storage capacitance Chb (see FIG. 1) is formed at the location of the overlap. Further, the capacitance electrode 37a is disposed such that the area it overlaps the pixel electrode 17a and the area it overlaps the pixel electrode 17b are substantially equal to each other.

According to this configuration, if the capacitance electrode 37a is short-circuited (in the manufacturing process or the like) to the pixel electrode 17b at "P" in FIG. 13, for example, by removing (trimming) a portion of the pixel electrode 17a inside the contact hole 67a by a laser or the like to electrically disconnect the pixel electrode 17a from the capacitance electrode 37a, the capacitance coupling of the pixel electrodes 17a and 17b can be maintained through a coupling capacitance that is formed in a portion where the pixel electrode 17a and the capacitance electrode 37a overlap.

Here, in the liquid crystal panel of FIG. 13, a value of the storage capacitance of the respective pixel electrodes (17a and 17b) changes before and after the short-circuit. Specifically, a storage capacitance before a short-circuit (a short-circuit of the capacitance electrode 37a and the pixel electrode 17b) is constituted, at the pixel electrode 17a, of a capacitance formed in a portion where the capacitance electrode 37a and the storage capacitance wiring 18p overlap through a gate insulating film, and also of a capacitance formed in a portion where the pixel electrode 17a and the storage capacitance wiring 18p overlap through the gate insulating film and an interlayer insulating film. And, at the pixel electrode 17b, the storage capacitance before a short-circuit is constituted of a capacitance formed in a portion where the pixel electrode 17b and the storage capacitance wiring 18p overlap through the gate insulating film and the interlayer insulating film. On the other hand, the storage capacitance after a short-circuit is constituted, at the pixel electrode 17a, of the capacitance formed in a portion where the pixel electrode 17a and the storage capacitance wiring 18p overlap through the gate insulating film and the interlayer insulating film, and at the pixel electrode 17b, the storage capacitance after a short-circuit is constituted of a capacitance formed in a portion where the capacitance electrode 37a and the storage capacitance wiring 18p overlap through the gate insulating film, and also of the capacitance formed in a portion where the pixel electrode 17b and the storage capacitance wiring 18p overlap through the gate insulating film and the interlayer insulating film. As just described, the value of the storage capacitance of the respective pixel electrodes (17a and 17b) changes before and after the short-circuit, and therefore, it is difficult to control the potential of the pixel electrodes 17a and 17b normally.

Figure 15:
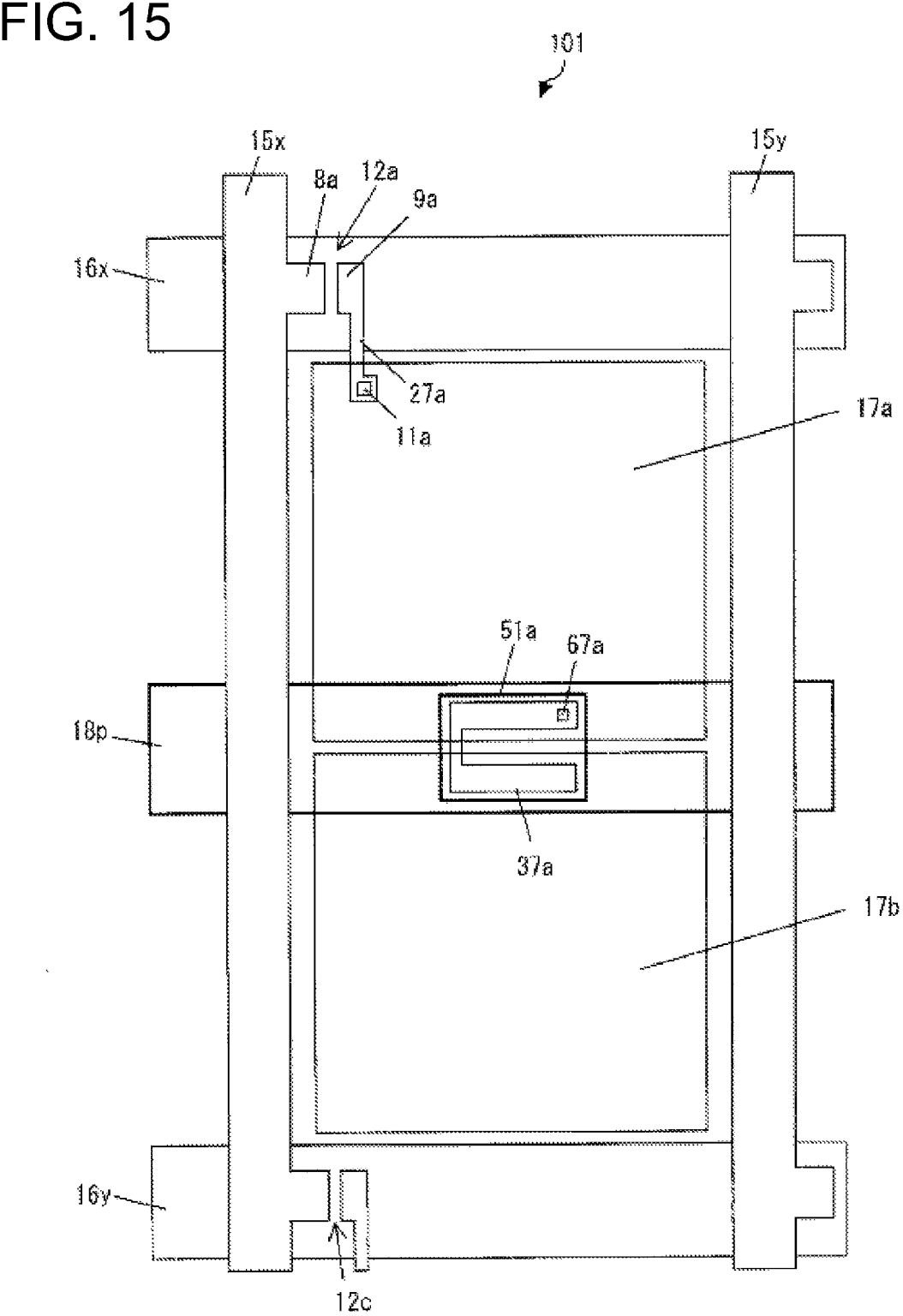
FIG. 15 is a plan view showing another specific example of the liquid crystal panel shown in FIG. 1.

Therefore, the storage capacitance wiring 18p may have a configuration shown in FIG. 15. In FIG. 15, the storage capacitance wiring 18p has an opening 51a that is formed in a region overlapping with the capacitance electrode 37a. According to this configuration, at the pixel electrode 17a, both before and after the short-circuit, a storage capacitance is constituted of a capacitance formed in a portion where the pixel electrode 17a and the storage capacitance wiring 18p overlap through the gate insulating film and the interlayer insulating film, and at the pixel electrode 17b, both before and after the short-circuit, a storage capacitance is constituted of a capacitance formed in a portion where the pixel electrode 17b and the storage capacitance wiring 18p overlap through the gate insulating film and the interlayer insulating film. As just described, the value of the storage capacitance of the respective pixel electrodes (17a and 17b) does not change before and after the short-circuit, and therefore, the potential of the pixel electrodes 17a and 17b can be controlled normally.

Figure 16:
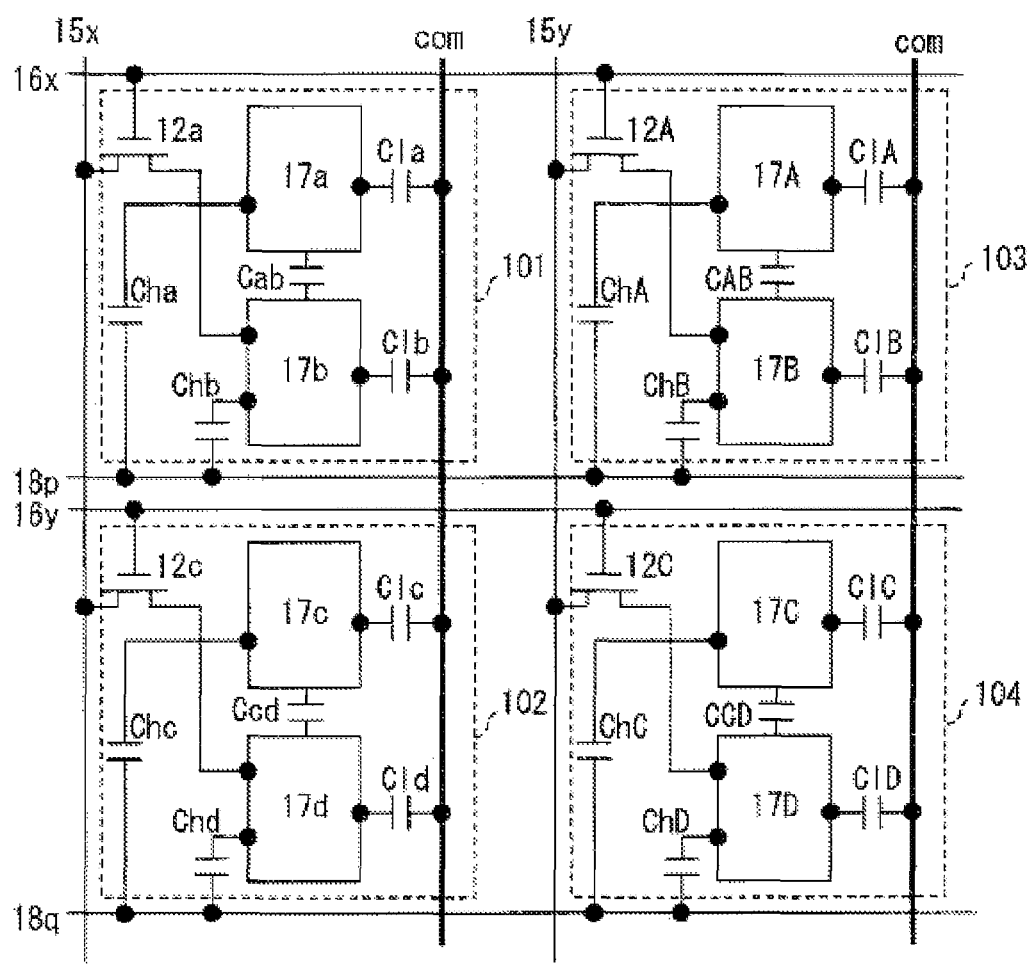
FIG. 16 is a circuit diagram showing another configuration of the liquid crystal panel according to Embodiment 1.
Figure 17:
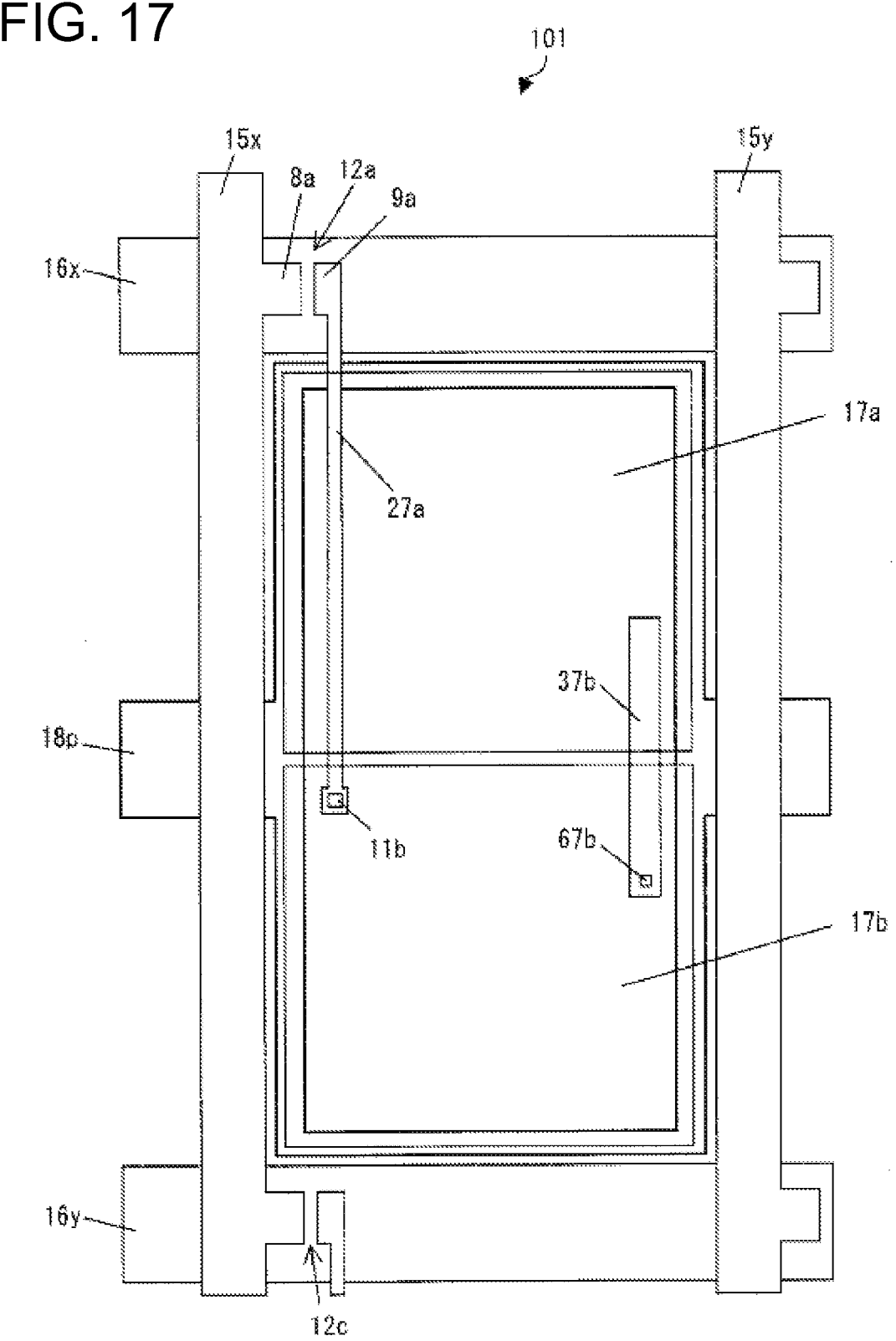
FIG. 17 is a plan view showing a specific example of the liquid crystal panel shown in FIG. 16.

Here, in the liquid crystal panel of FIG. 1, out of the two pixel electrodes provided in a single pixel, the one proximal to the transistor is connected to the transistor. However, the configuration is not limited to such. As shown in FIG. 16, out of the two pixel electrodes provided in a single pixel, the one distal to the transistor may be connected to the transistor. A specific example of the pixel 101 of FIG. 16 is shown in FIG. 17. In the liquid crystal panel shown in FIG. 17, the transistor 12a is disposed in the proximity of the intersection of the data signal line 15x and the scan signal line 16x, and in the pixel region defined by the signal lines (15x and 16x), a rectangular-shaped pixel electrode 17a and a rectangular-shaped pixel electrode 17b are arranged in the column direction, and one of the four sides constituting the perimeter of the first pixel electrode and one of the four sides constituting the perimeter of the second pixel electrode are disposed adjacent to each other. The capacitance electrode 37b is disposed such that it crosses a space between these two adjacent sides (a space between the pixel electrodes 17a and 17b), and extends in the column direction so as to overlap with each of the pixel electrodes 17a and 17b. The storage capacitance wiring 18p has a storage capacitance wiring extended portion that branches off from the storage capacitance wiring 18p, and is disposed such that it extends to overlap portions of the edges of the pixel electrodes 17a and 17b when observed in a plan view.

Over the scan signal line 16x, a source electrode 8a and a drain electrode 9a of the transistor 12a are formed, and the source electrode 8a is connected to the data signal line 15x. The drain electrode 9a is connected to the drain lead-out wiring 27a, and the drain lead-out wiring 27a is connected to the pixel electrode 17b through the contact hole 11b. The capacitance electrode 37b is connected to the pixel electrode 17b through the contact hole 67b, and overlaps the pixel electrode 17a through an interlayer insulating film, and the coupling capacitance Cab (see FIG. 16) between the pixel electrodes 17a and 17b is formed in the location of the overlap. Moreover, the capacitance electrode 37b is formed such that it overlaps the pixel electrode 17b through the interlayer insulating film, and the area of the overlapped portion is substantially equal to the area of the overlapped portion between the capacitance electrode 37b and the pixel electrode 17a.

Also, the pixel electrode 17a and the storage capacitance wiring 18p overlap with each other through the interlayer insulating film and the gate insulating film, and the storage capacitance Cha (see FIG. 16) is formed at the location of the overlap. The pixel electrode 17b and the storage capacitance wiring 18p overlap with each other through the interlayer insulating film and the gate insulating film, and the storage capacitance Chb (see FIG. 16) is formed at the location of the overlap. The configuration (the shapes and locations of the respective members, and the relation of connection among them) of other pixels is the same as that of the pixel 101.

According to this configuration, the sub-pixel that includes the pixel electrode 17a becomes "DA", and the sub-pixel that includes the pixel electrode 17b becomes "BR".

Figure 18:
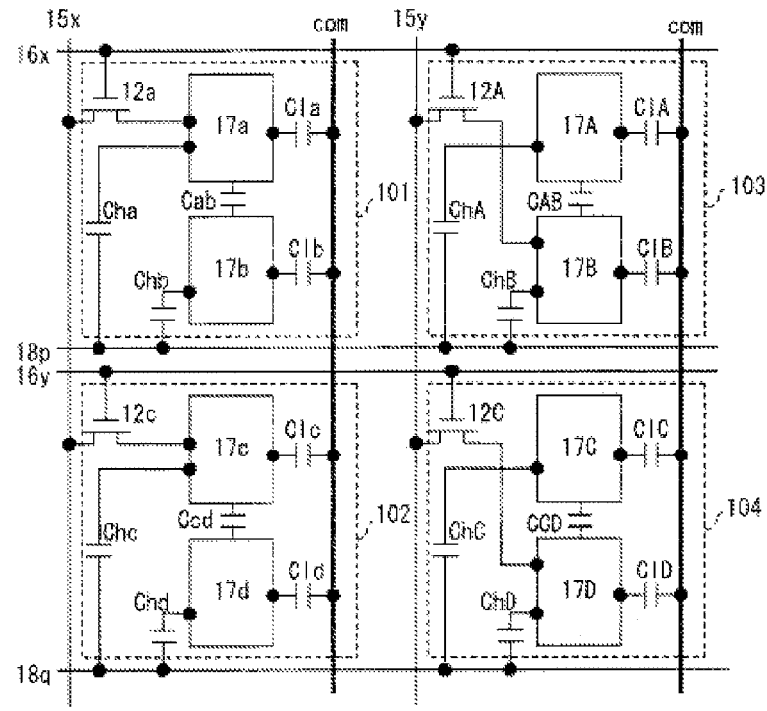
FIG. 18 is a circuit diagram showing another configuration of the liquid crystal panel according to Embodiment 1.
Figure 19:
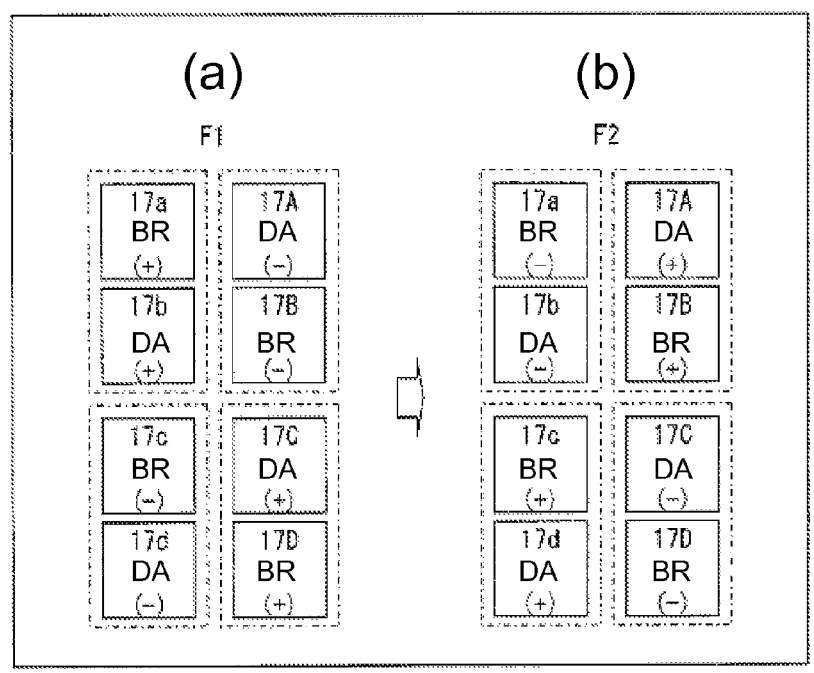
FIG. 19 is a schematic view showing the display state of respective frames when the driving method of FIG. 5 is used for a liquid crystal display device equipped with the liquid crystal panel of FIG. 18.

The liquid crystal panel of FIG. 1 may be configured as shown in FIG. 18. In FIG. 18, in one of the two adjacent pixels in the row direction, the pixel electrode proximal to the transistor is connected to the transistor, and in the other pixel, the pixel electrode distal to the transistor is connected to the transistor.

In the liquid crystal display device equipped with the liquid crystal panel of FIG. 18, when the data signal lines 15x and 15y are driven as shown in FIG. 5, in frame F1, the sub-pixel that includes the pixel electrode 17a (positive polarity) becomes "BR", the sub-pixel that includes the pixel electrode 17b (positive polarity) becomes "DA", the sub-pixel that includes the pixel electrode 17c (negative polarity) becomes "BR", the sub-pixel that includes the pixel electrode 17d (negative polarity) becomes "DA", the sub-pixel that includes the pixel electrode 17A (negative polarity) becomes "DA", and the sub-pixel that includes the pixel electrode 17B (negative polarity) becomes "BR". FIG. 19(a) shows the overall picture. In frame F2, the sub-pixel that includes the pixel electrode 17a (negative polarity) becomes "BR", the sub-pixel that includes the pixel electrode 17b (negative polarity) becomes "DA", the sub-pixel that includes the pixel electrode 17c (positive polarity) becomes "BR", the sub-pixel that includes the pixel electrode 17d (positive polarity) becomes "DA", and the sub-pixel that includes the pixel electrode 17A (positive polarity) becomes "DA", and the sub-pixel that includes the pixel electrode 17B (positive polarity) becomes "BR". FIG. 19(b) shows the overall picture.

In the liquid crystal panel of FIG. 18, because no two bright sub-pixels are arranged side by side in the row direction and no two dark sub-pixels are arranged side by side in the row direction, uneven streaks in the row direction can be suppressed.

Figure 20:
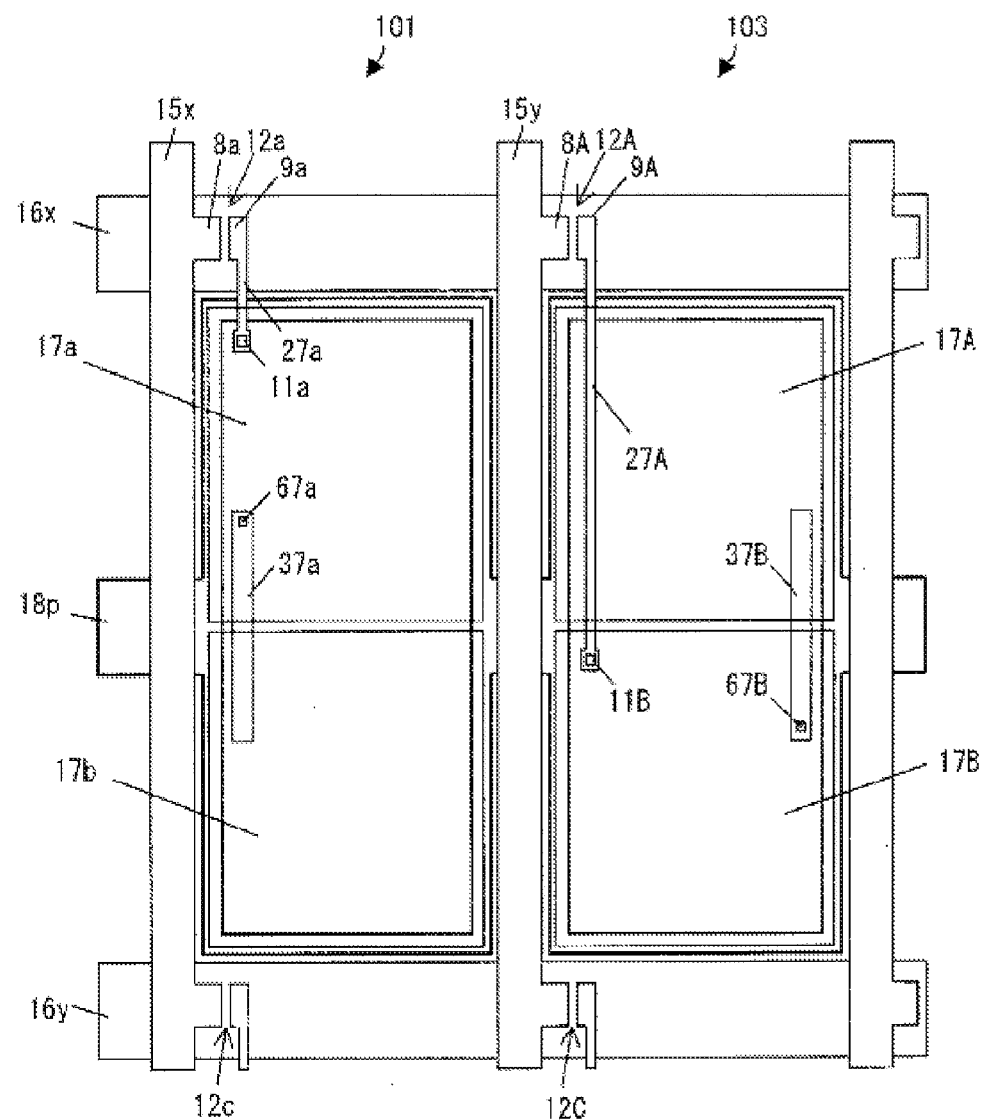
FIG. 20 is a plan view showing a specific example of the liquid crystal panel shown in FIG. 18.

A specific example of pixels 101 and 103 of FIG. 18 is shown in FIG. 20. As shown in the figure, in the pixel 101, the transistor 12a is disposed in the proximity of the intersection of the data signal line 15x and the scan signal line 16x, and in the pixel region defined by the signal lines (15x and 16x), a rectangular-shaped pixel electrode 17a and a rectangular-shaped pixel electrode 17b are arranged in the column direction, and one of the four sides constituting the perimeter of the first pixel electrode and one of the four sides constituting the perimeter of the second pixel electrode are disposed adjacent to each other. The capacitance electrode 37a is disposed such that it crosses a space between these two adjacent sides (a space between the pixel electrodes 17a and 17b), and extends in the column direction so as to overlap each of the pixel electrodes 17a and 17b. The storage capacitance wiring 18p has a storage capacitance wiring extended portion that branches off from the storage capacitance wiring 18p, and is disposed such that it extends to overlap portions of the edges of the pixel electrodes 17a and 17b when observed in a plan view.

Over the scan signal line 16x, the source electrode 8a and the drain electrode 9a of the transistor 12a are formed, and the source electrode 8a is connected to the data signal line 15x. The drain electrode 9a is connected to the drain lead-out wiring 27a, and the drain lead-out wiring 27a is connected to the pixel electrode 17a through the contact hole 11a. The capacitance electrode 37a is connected to the pixel electrode 17a through the contact hole 67a, and overlaps the pixel electrode 17b through the interlayer insulating film, and the coupling capacitance Cab (See FIG. 18) between the pixel electrodes 17a and 17b is formed at the location of the overlap. Moreover, the capacitance electrode 37a is formed such that it overlaps the pixel electrode 17a through the interlayer insulating film, and the area of the overlapped portion is substantially equal to the area of the overlapped portion between the capacitance electrode 37a and the pixel electrode 17b.

Also, the pixel electrode 17a and the storage capacitance wiring 18p overlap with each other through the interlayer insulating film and the gate insulating film, and the storage capacitance Cha (see FIG. 18) is formed at the location of the overlap. The pixel electrode 17b and the storage capacitance wiring 18p overlap with each other through the interlayer insulating film and the gate insulating film, and the storage capacitance Chb (see FIG. 18) is formed at the location of the overlap.

According to this configuration, in the pixel 101, the sub-pixel that includes the pixel electrode 17a becomes "BR", and the sub-pixel that includes the pixel electrode 17b becomes "DA".

On the other hand, in the pixel 103, a transistor 12A is disposed in the proximity of the intersection of the data signal line 15y and the scan signal line 16x, and in the pixel region defined by the signal lines (15y and 16x), a rectangular-shaped pixel electrode 17A and a rectangular-shaped pixel electrode 17B are arranged in the column direction, and one of the four sides constituting the perimeter of the first pixel electrode and one of the four sides constituting the perimeter of the second pixel electrode are disposed adjacent to each other. The capacitance electrode 37B is disposed such that it crosses a space between these two adjacent sides (a space between the pixel electrodes 17A and 17B), and extends in the column direction so as to overlap each of the pixel electrodes 17A and 17B. The storage capacitance wiring 18p has a storage capacitance wiring extended portion that branches off from the storage capacitance wiring 18p, and is disposed such that it extends to overlap portions of the edges of the pixel electrodes 17A and 17b when observed in a plan view.

Over the scan signal line 16x, the source electrode 8A and the drain electrode 9A of the transistor 12A are formed, and the source electrode 8A is connected to the data signal line 15y. The drain electrode 9A is connected to a drain lead-out wiring 27A, and the drain lead-out wiring 27A is connected to the pixel electrode 17B through the contact hole 11B. The capacitance electrode 37B is connected to the pixel electrode 17B through a contact hole 67B, and overlaps the pixel electrode 17A through an interlayer insulating film, and the coupling capacitance CAB (see FIG. 18) between the pixel electrodes 17A and 17B is formed at the location of the overlap. Also, the capacitance electrode 37B is formed such that it overlaps the pixel electrode 17B through the interlayer insulating film, and the area of the overlapped portion is substantially equal to the area of the overlapped portion between the capacitance electrode 37B and the pixel electrode 17A.

Also, the pixel electrode 17A and the storage capacitance wiring 18p overlap with each other through the interlayer insulating film and the gate insulating film, and a storage capacitance ChA (see FIG. 18) is formed at the location of the overlap. The pixel electrode 17B and the storage capacitance wiring 18p overlap with each other through the interlayer insulating film and the gate insulating film, and a storage capacitance ChB (see FIG. 18) is formed at the location of the overlap.

According to this configuration, in the pixel 103, the sub-pixel that includes the pixel electrode 17A becomes "DA", and the sub-pixel that includes the pixel electrode 17B becomes "BR".

Furthermore, the present embodiment has a configuration in which the pixel electrodes 17a and 17b are aligned in the column direction, but the arrangement of the pixel electrodes 17a and 17b is not limited to such, and it may be a configuration in which the pixel electrodes 17a and 17b are aligned in the row direction as well, for example. In this case, the capacitance electrode 37a shown in FIG. 2, for example, is disposed such that it crosses a space between the pixel electrodes 17a and 17b, and extends in the row direction so as to overlap each of the pixel electrodes 17a and 17b.

Embodiment 2

Figure 21:
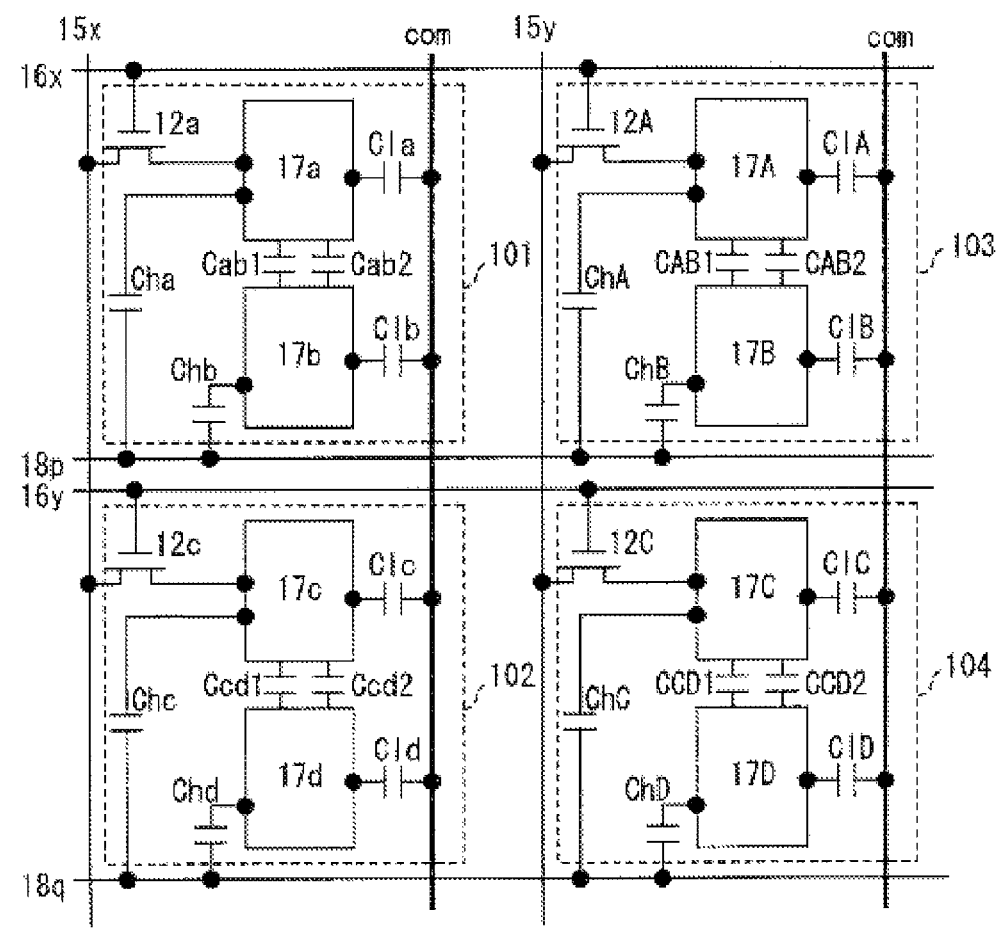
FIG. 21 is a circuit diagram showing the configuration of a liquid crystal panel according to Embodiment 2.

FIG. 21 is an equivalent circuit diagram showing a part of the liquid crystal panel according to Embodiment 2. As shown in FIG. 21, the present liquid crystal panel includes: data signal lines (15x and 15y) extending in a column direction (up and down directions in the figure); scan signal lines (16x and 16y) extending in a row direction (right and left directions in the figure); pixels arranged in the row and column directions (101 to 104); storage capacitance wirings (18p and 18q); and a common electrode (opposite electrode) com. All pixels have the same structure. The pixel column that includes the pixels 101 and 102 and the pixel column that includes the pixels 103 and 104 are adjacent to each other, and the pixel row that includes the pixels 101 and 103 and the pixel row that includes the pixels 102 and 104 are adjacent to each other.

In the present liquid crystal panel, one data signal line and one scan signal line are provided for each of the pixels. Two pixel electrodes are aligned in the column direction within a single pixel, and two pixel electrodes 17a and 17b provided in the pixel 101 as well as two pixel electrodes 17c and 17d provided in the pixel 102 are arranged in one column, and two pixel electrodes 17A and 17B provided in the pixel 103 as well as two pixel electrodes 17C and 17D provided in the pixel 104 are arranged in one column. The pixel electrode 17a and 17A, the pixel electrode 17b and 17B, the pixel electrode 17c and 17C, and the pixel electrode 17d and 17D are adjacent to each other, respectively, in the row direction.

In the pixel 101, the pixel electrodes 17a and 17b are connected together through the coupling capacitances Cab1 and Cab2; the pixel electrode 17a is connected to the data signal line 15x through the transistor 12a that is connected to the scan signal line 16x; a storage capacitance Cha is formed between the pixel electrode 17a and the storage capacitance wiring 18p; a storage capacitance Chb is formed between the pixel electrode 17b and the storage capacitance wiring 18p; a liquid crystal capacitance Cla is formed between the pixel electrode 17a and the common electrode com; and a liquid crystal capacitance Clb is formed between the pixel electrode 17b and the common electrode com.

In the pixel 102, which is adjacent to the pixel 101 in the column direction, pixel electrodes 17c and 17d are connected to each other through a coupling capacitances Ccd1 and Ccd2; the pixel electrode 17c is connected to the data signal line 15x through a transistor 12c connected to a scan signal line 16y; a storage capacitance Chc is formed between the pixel electrode 17c and the storage capacitance wiring 18q; a storage capacitance Chd is formed between the pixel electrode 17d and the storage capacitance wiring 18q; a liquid crystal capacitance Clc is formed between the pixel electrode 17c and the common electrode com; and a liquid crystal capacitance Cld is formed between the pixel electrode 17d and the common electrode com.

In the pixel 103, which is adjacent to the pixel 101 in the row direction, the pixel electrodes 17A and 17B are connected together through the coupling capacitances CAB 1 and CAB2; the pixel electrode 17A is connected to the data signal line 15y through the transistor 12A that is connected to the scan signal line 16x; a storage capacitance ChA is formed between the pixel electrode 17A and the storage capacitance wiring 18p; a storage capacitance ChB is formed between the pixel electrode 17B and the storage capacitance wiring 18p; a liquid crystal capacitance ClA is formed between the pixel electrode 17A and the common electrode com; and a liquid crystal capacitance ClB is formed between the pixel electrode 17B and the common electrode com.

Figure 22:
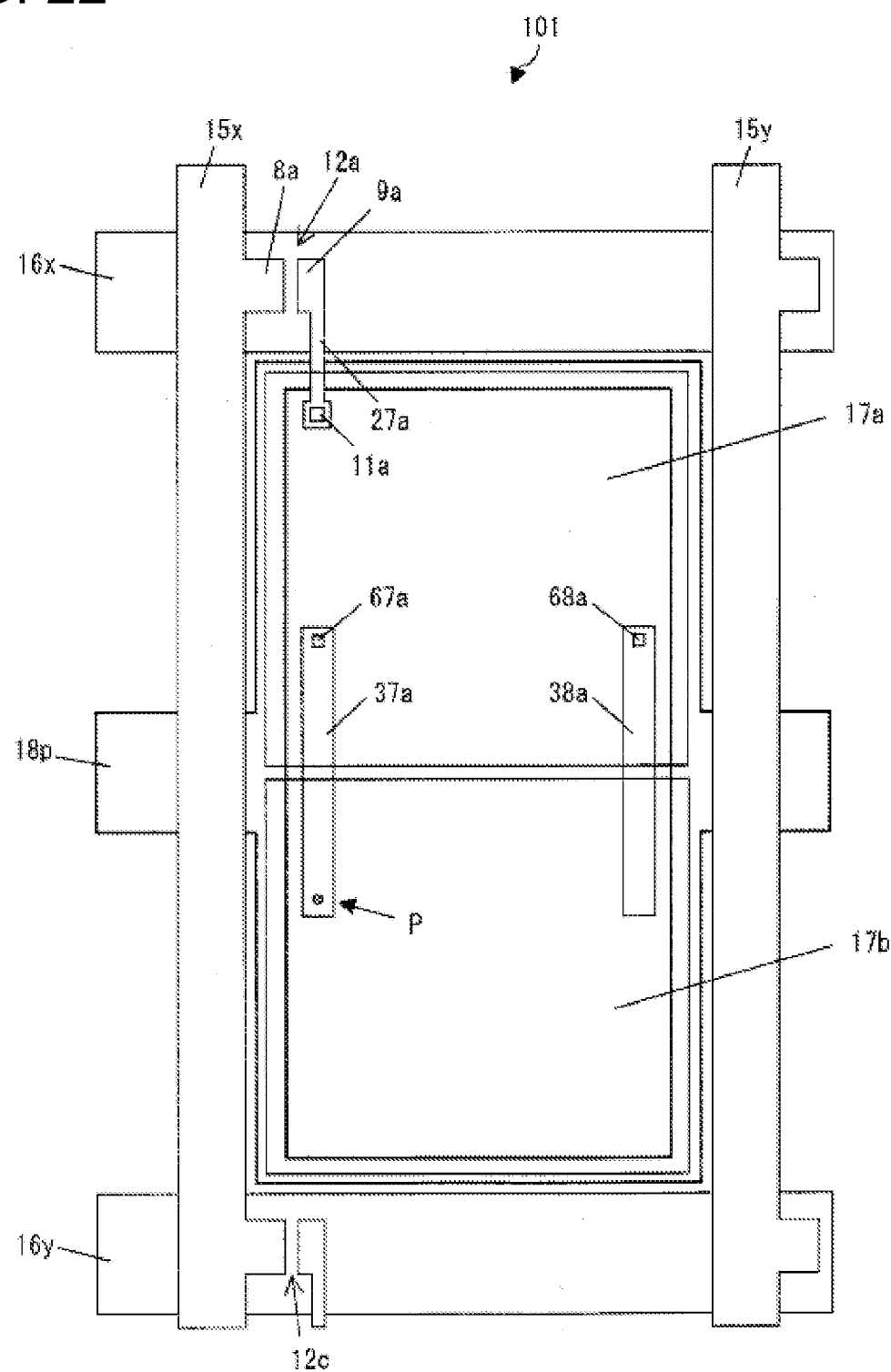
FIG. 22 is a plan view showing a specific example of the liquid crystal panel shown in FIG. 21.

A specific example of the pixel 101 of FIG. 21 is shown in FIG. 22. As shown in the figure, the transistor 12a is disposed in the proximity of the intersection of the data signal line 15x and the scan signal line 16x, and in the pixel region defined by the signal lines (15x and 16x), a rectangular-shaped pixel electrode 17a and a rectangular-shaped pixel electrode 17b are arranged in the column direction, and one of the four sides constituting the perimeter of the first pixel electrode and one of the four sides constituting the perimeter of the second pixel electrode are disposed adjacent to each other. The capacitance electrode 37a (a first capacitance electrode) and 38a (second capacitance electrode) are disposed such that they cross a space between these two adjacent sides (a space between 17a and 17b), and extend in the column direction so as to overlap each of the pixel electrodes 17a and 17b. The storage capacitance wiring 18p has a storage capacitance wiring extended portion that branches off from the storage capacitance wiring 18p, and is disposed such that it extends to overlap portions of the edges of the pixel electrodes 17a and 17b when observed in a plan view.

More specifically, the capacitance electrode 37a extends in a direction that is the same as the direction in which the data signal line 15x extends, and overlaps the pixel electrodes 17a and 17b. The capacitance electrode 38a is disposed in parallel with the capacitance electrode 37a in the row direction (the direction in which the scan signal line 16x extends), and extends in a direction that is the same as the direction in which the data signal line 15x extends, and overlaps the pixel electrodes 17a and 17b.

Over the scan signal line 16x, the source electrode 8a and the drain electrode 9a of the transistor 12a are formed, and the source electrode 8a is connected to the data signal line 15x. The drain electrode 9a is connected to the drain lead-out wiring 27a, and the drain lead-out wiring 27a is connected to the pixel electrode 17a through the contact hole 11a. The capacitance electrode 37a is connected to the pixel electrode 17a through the contact hole 67a, and overlaps the pixel electrode 17b through an interlayer insulating film, and the coupling capacitance Cab1 (see FIG. 21) between the pixel electrodes 17a and 17b are formed at the location of the overlap. Further, the capacitance electrode 38a is connected to the pixel electrode 17a through the contact hole 68a, and overlaps the pixel electrode 17b through the interlayer insulating film, and the coupling capacitance Cab2 (see FIG. 21) between the pixel electrodes 17a and 17b is formed at the location of the overlap. Also, the capacitance electrode 37a is formed such that it overlaps the pixel electrode 17a through the interlayer insulating film, and the area of the overlapped portion is substantially equal to the area of the overlapped portion between the capacitance electrode 37a and the pixel electrode 17b. The capacitance electrode 38a is formed such that it overlaps the pixel electrode 17a through the interlayer insulating film, and the area of the overlapped portion is substantially equal to the area of the overlapped portion between the capacitance electrode 38a and the pixel electrode 17b. In FIG. 22, the capacitance electrodes 37a and 38a are formed in the same shape, but the present invention is not limited to such, and they can also have different shapes.

Also, the pixel electrode 17a and the storage capacitance wiring 18p overlap with each other through the interlayer insulating film and the gate insulating film, and the storage capacitance Cha (see FIG. 21) is formed at the location of the overlap. The pixel electrode 17b and the storage capacitance wiring 18p overlap with each other through the interlayer insulating film and the gate insulating film, and the storage capacitance Chb (see FIG. 21) is formed at the location of the overlap. The configuration (the shapes and locations of the respective members, and the relation of connection among them) of other pixels is the same as that of the pixel 101.

According to this configuration, the sub-pixel that includes the pixel electrode 17a becomes "BR", and the sub-pixel that includes the pixel electrode 17b becomes "DA".

In the liquid crystal panel of FIG. 22, the pixel electrode 17a and the pixel electrode 17b are connected together (capacitively-coupled) by the two coupling capacitances (Cab1 and Cab2) disposed side by side. Therefore, even if a short-circuiting occurs (in the manufacturing process or the like) between the capacitance electrode 37a and the pixel electrode 17b, for example, the capacitance coupling between the pixel electrodes 17a and 17b can be maintained by cutting the capacitance electrode 37a by laser between the contact hole 67a and the location of the short-circuit. Further, even if the contact hole 67a is not formed properly in the manufacturing process or the like, the capacitance coupling between the pixel electrodes 17a and 17b can be maintained. If a short-circuiting occurs between the capacitance electrode 38a and the pixel electrode 17b, the capacitance electrode 38a can be cut between the contact hole 68a and the location of the short-circuit by laser. This way, according to the present embodiment, a higher production yield of the liquid crystal panel and the active matrix substrate for use in the liquid crystal panel can be achieved.

Figure 23:
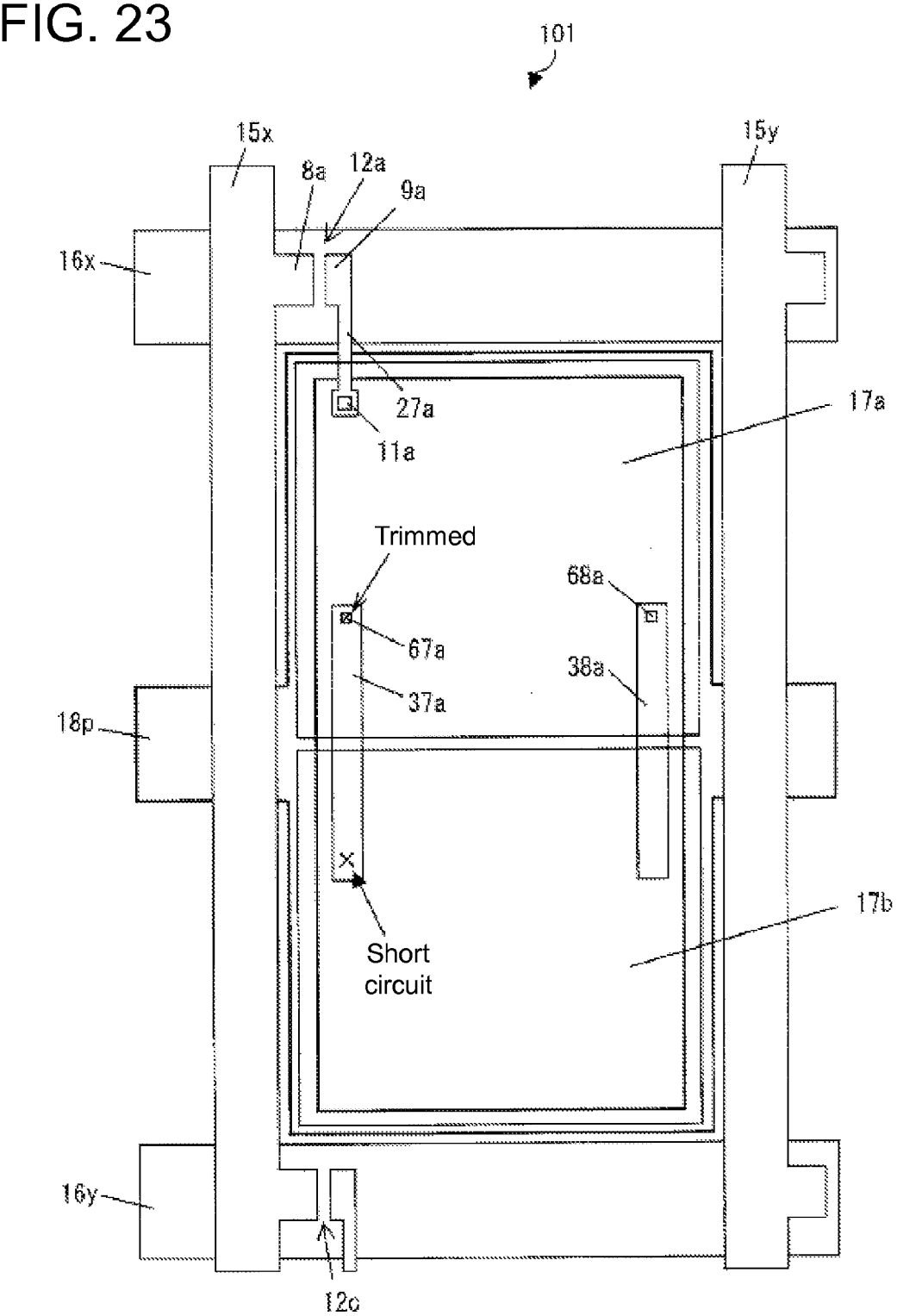
FIG. 23 is a plan view showing a repair method of the liquid crystal panel of FIG. 22.

Moreover, in the present liquid crystal panel, the capacitance electrode 37a and the capacitance electrode 38a are disposed such that the areas they each overlap the pixel electrodes 17a and 17b are substantially equal to each another, and therefore, the total amount of the coupling capacitance is unlikely to change before and after a short-circuiting. For example, if the capacitance electrode 37a is short-circuited to the pixel electrode 17b (during the manufacturing process or the like) at "P" in FIG. 22, as shown in FIG. 23, by removing (trimming) a portion of the pixel electrode 17a inside the contact hole 67a by a laser or the like to electrically disconnect the pixel electrode 17a from the capacitance electrode 37a, the pixel electrodes 17a and 17b are connected to each other through a coupling capacitance formed at the location where the pixel electrode 17a and the capacitance electrode 37a overlap, and also through a coupling capacitance formed in the location where the pixel electrode 17b and the capacitance electrode 38a overlap. The total amount of this coupling capacitance becomes substantially equal to the total amount of the coupling capacitance formed before the short-circuit (that is, a total of the coupling capacitance formed in the portion where the pixel electrode 17b and the capacitance electrode 37a overlap, and the coupling capacitance formed in the portion where the pixel electrode 17b and the capacitance electrode 38a overlap). Accordingly, the potential of the pixel electrodes 17a and 17b can be controlled normally.

Figure 24:
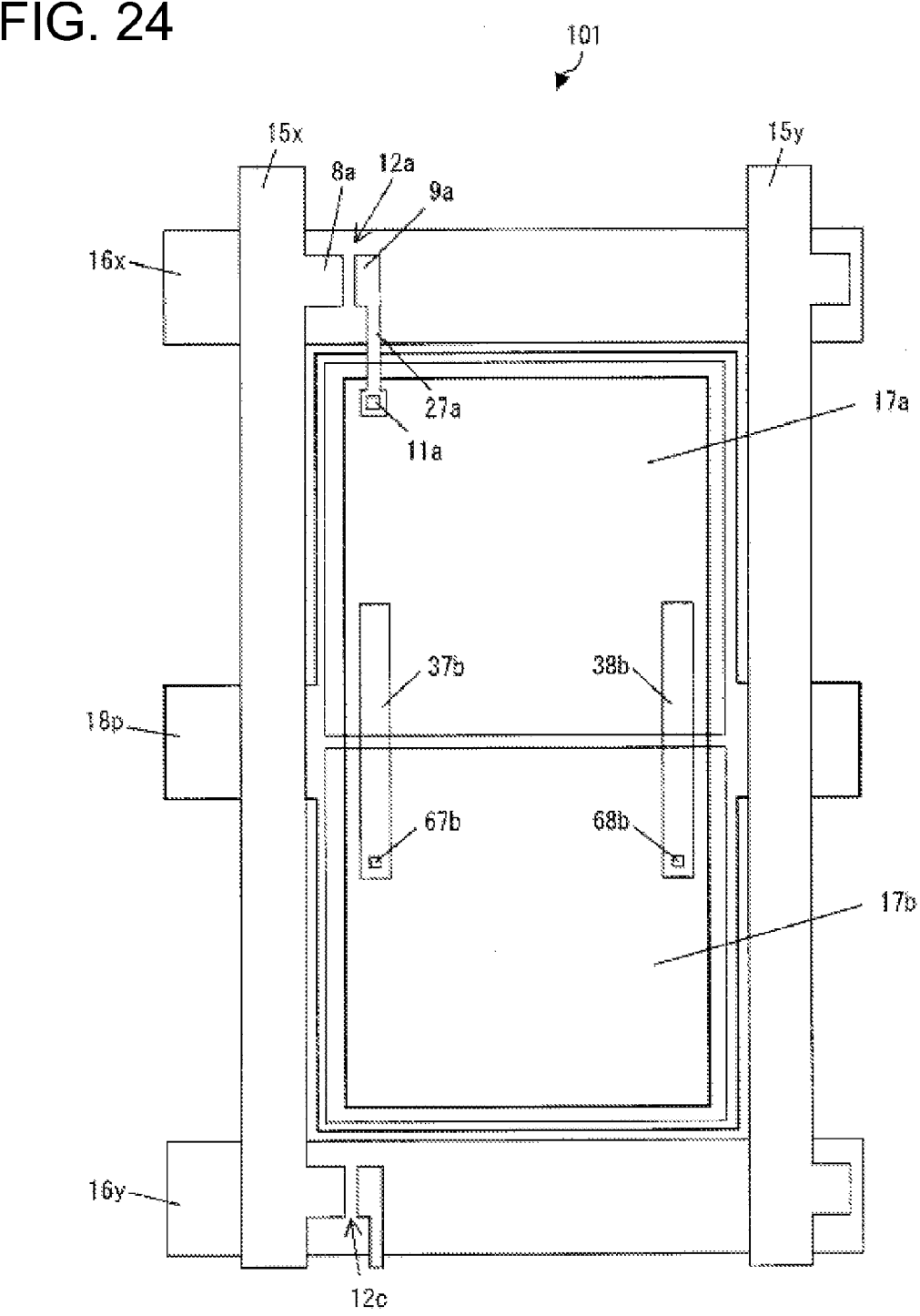
FIG. 24 is a plan view showing another specific example of the liquid crystal panel shown in FIG. 21.

The pixel 101 of FIG. 22 may be modified as shown in FIG. 24. A liquid crystal panel of FIG. 24 has a configuration in which capacitance electrodes are electrically connected to pixel electrodes corresponding to sub-pixels that will be dark sub-pixels. Specifically, in the present liquid crystal panel, the drain electrode 9a of the transistor 12a is connected to the pixel electrode 17a through the contact hole 11a, and the pixel electrode 17b and the capacitance electrode 37b (the first capacitance electrode) are connected to each other through the contact hole 67b. Moreover, the pixel electrode 17b and the capacitance electrode 38b (the second capacitance electrode) are connected to each other through the contact hole 68b. The pixel electrodes 17a and 17b are connected (capacitively-coupled) to each other through two capacitances (coupling capacitances) formed by overlapping each of the capacitance electrodes 37b and 38b, which are electrically connected to the pixel electrode 17b, with the pixel electrode 17a through the interlayer insulating film 25. Moreover, the capacitance electrode 37b (38b) is formed such that it overlaps the pixel electrode 17b through the interlayer insulating film, and the area of the overlapped portion is substantially equal to the area of the overlapped portion between the capacitance electrode 37b (38b) and the pixel electrode 17a.

According to this configuration, the effects described above (improvement of the manufacturing yield and a potential control of the pixel electrode 17b) that are achieved by the configuration of the liquid crystal panel in FIG. 22 can be obtained.

Furthermore, needless to say, one of two capacitance electrodes may be electrically connected to a pixel electrode corresponding to a sub-pixel that will be a bright sub-pixel, and the other capacitance electrode may be electrically connected to a pixel electrode corresponding to a sub-pixel that will be a dark sub-pixel.

Figure 25:
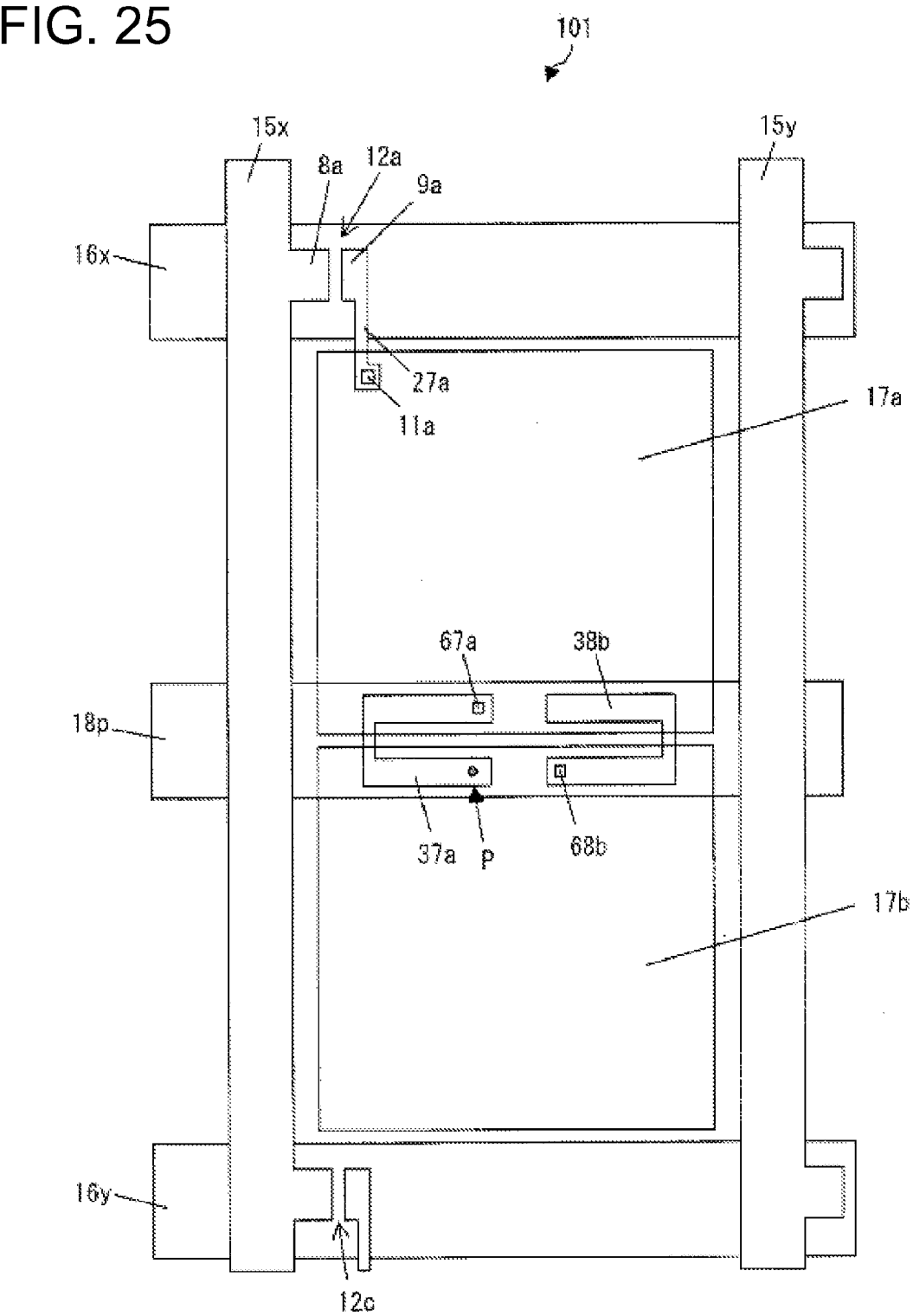
FIG. 25 is a plan view showing another specific example of the liquid crystal panel shown in FIG. 21.

The pixel 101 of FIG. 22 may be modified as shown in FIG. 25. In the present liquid crystal panel of FIG. 25, the storage capacitance wiring 18p is disposed such that it extends in the row direction so as to overlap a space between the pixel electrodes 17a and 17b. The capacitance electrodes 37a and 38b are respectively formed in the same shape, which is a U shape, and overlap the storage capacitance wiring 18p and the pixel electrodes 17a and 17b.

More specifically, over the scan signal line 16x, the source electrode 8a and the drain electrode 9a of the transistor 12a are formed, and the source electrode 8a is connected to the data signal line 15x. The drain electrode 9a is connected to the drain lead-out wiring 27a, and the drain lead-out wiring 27a is connected to the pixel electrode 17a through the contact hole 11a. The capacitance electrode 37a is connected to the pixel electrode 17a through the contact hole 67a, and overlaps the pixel electrode 17b through the interlayer insulating film, and the coupling capacitance Cab1 (see FIG. 21) between the pixel electrodes 17a and 17b is formed at the location of the overlap. Further, the capacitance electrode 38b is connected to the pixel electrode 17b through the contact hole 68b, and overlaps the pixel electrode 17a through the interlayer insulating film, and the coupling capacitance Cab2 (see FIG. 21) between the pixel electrodes 17a and 17b is formed at the location of the overlap. Also, the capacitance electrode 37a is formed such that it overlaps the pixel electrode 17a through the interlayer insulating film, and the area of the overlapped portion is substantially equal to the area of the overlapped portion between the capacitance electrode 37a and the pixel electrode 17b. The capacitance electrode 38b is formed such that it overlaps the pixel electrode 17b through the interlayer insulating film, and the area of the overlapped portion is substantially equal to the area of the overlapped portion between the capacitance electrode 38b and the pixel electrode 17a.

The capacitance electrode 37a overlaps the storage capacitance wiring 18p through the gate insulating film, and most of the storage capacitance Cha (see FIG. 21) is formed at the location of the overlap. The capacitance electrode 38b overlaps the storage capacitance wiring 18p through the gate insulating film, and most of the storage capacitance Chb (see FIG. 21) is formed at the location of the overlap. The configuration (the shapes and locations of the respective members, and the relation of connection among them) of other pixels is the same as that of the pixel 101.

Because this configuration can increase the storage capacitance value of the respective pixel electrodes (17a and 17b), reliability can be improved.

Figure 26:
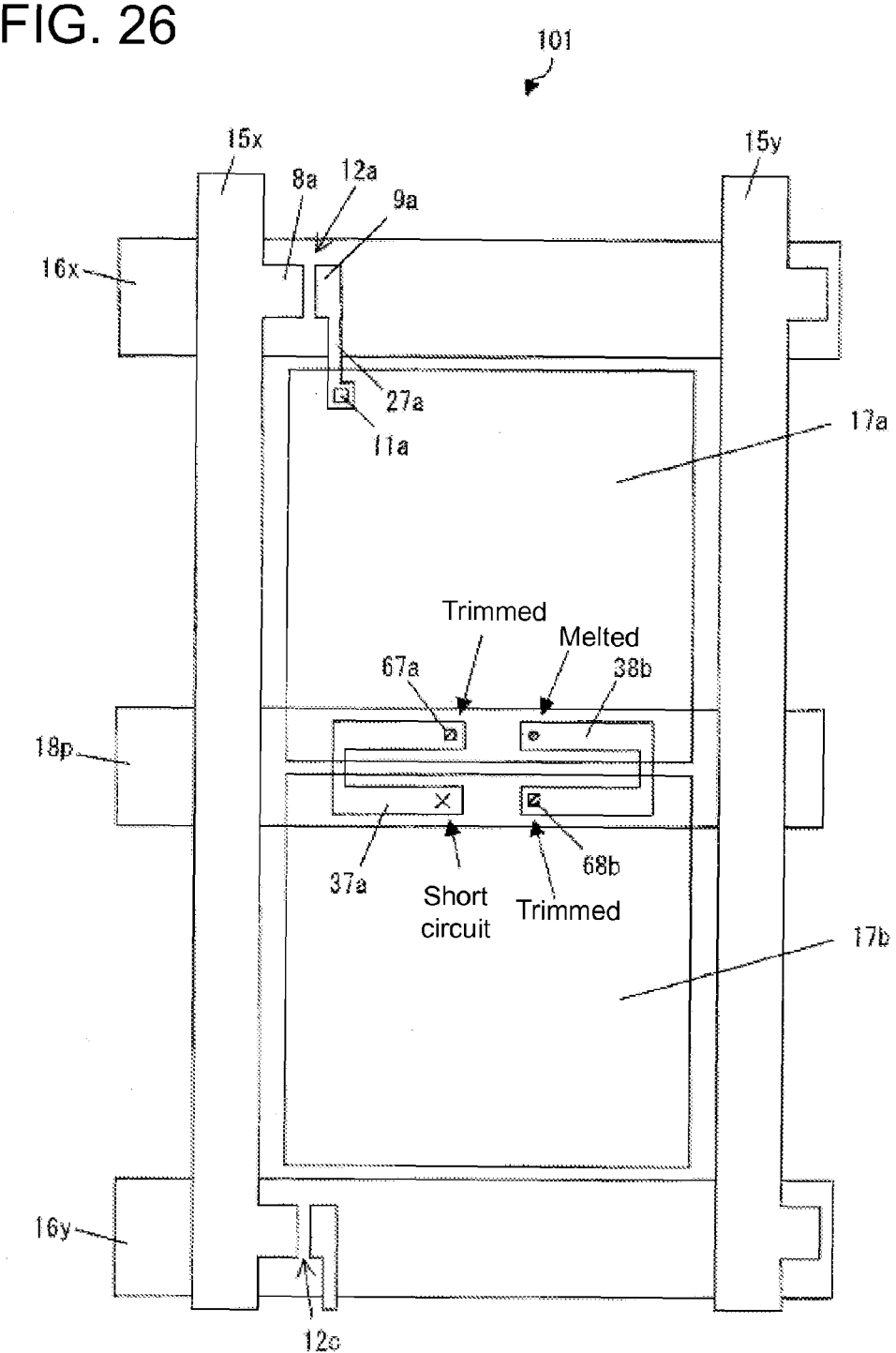
FIG. 26 is a plan view showing a repair method of the liquid crystal panel of FIG. 25.

Here, in the above-mentioned configuration, if the capacitance electrode 37a is short-circuited (in the manufacturing process or the like) to the pixel electrode 17b at "P" in FIG. 25, for example, as shown in FIG. 26, a portion of the pixel electrode 17a inside the contact hole 67a is removed (trimmed) by a laser or the like to electrically disconnect the pixel electrode 17a from the capacitance electrode 37a, and also a portion of the pixel electrode 17b inside the contact hole 68b is removed (trimmed) by a laser or the like to electrically disconnect the pixel electrode 17b from the capacitance electrode 38b, and a part of the portion where the capacitance electrode 38b and the pixel electrode 17a overlap is melted to short-circuit (electrically connect) them. Here, the electrical connection between the capacitance electrode 38b and the pixel electrode 17a becomes possible by irradiating the capacitance electrode 38b with laser from the back side (substrate side) of the active matrix substrate, for example. Specifically, when a part of the capacitance electrode 38b is irradiated with laser, the portion becomes melted and peeled upward to reach the pixel electrode 17a, and the capacitance electrode 38b and the pixel electrode 17a become electrically connected to each other. Further, in order to facilitate the electrical connection between them, it is preferable that each capacitance electrode extend up to an area that does not overlap the storage capacitance wiring 18p, or a protruded part that overlaps the pixel electrode 17a be provided in an area that does not overlap the storage capacitance wiring 18p for each capacitance electrode.

This way, the pixel electrodes 17a and 17b are connected to each other through a coupling capacitance formed in the portion where the pixel electrode 17a and the capacitance electrode 37a overlap, and also through a coupling capacitance formed in the portion where the pixel electrode 17b and the capacitance electrode 38b overlap. Here, the area where the capacitance electrode 37a and the pixel electrode 17a overlap is substantially equal to the area of the overlapped portion between the capacitance electrode 37a and the pixel electrode 17b. Also, the area where the capacitance electrode 38b and the pixel electrode 17a overlap is substantially equal to the area of the overlapped portion between the capacitance electrode 38b and the pixel electrode 17b. Therefore, the total amount of the coupling capacitance is unlikely to change before and after the short-circuit.

In the pixel electrode 17a, a storage capacitance formed at a portion where the capacitance electrode 37a and the storage capacitance wiring 18p overlap (before a short-circuit) is replaced with a storage capacitance formed at a portion where the capacitance electrode 38b and the storage capacitance wiring 18p overlap (after a short-circuit), which is substantially the same capacitance value as the storage capacitance formed at a portion where the capacitance electrode 37a and the storage capacitance wiring 18p overlap. And, at the pixel electrode 17b, a storage capacitance formed at a portion where the capacitance electrode 38b and the storage capacitance wiring 18p overlap (before a short-circuit) is replaced with a storage capacitance formed at a portion where the capacitance electrode 37a and the storage capacitance wiring 18p overlap (after a short-circuit), which is substantially the same capacitance value as the storage capacitance formed at a portion where the capacitance electrode 38b and the storage capacitance wiring 18p overlap. Consequently, the total amount of a storage capacitance of the respective pixel electrodes 17a and 17b is unlikely to change before and after a short-circuit.

As just described, in the liquid crystal panel of FIG. 25, even when a short-circuiting occurs between a capacitance electrode and a pixel electrode, the total amount of a coupling capacitance and the total amount of a storage capacitance are unlikely to change before and after the short-circuit, and therefore, potential of the pixel electrodes 17a and 17b can be controlled normally while securing the storage capacitance.

Furthermore, the present embodiment has a configuration in which the pixel electrodes 17a and 17b are aligned in the column direction, but the arrangement of the pixel electrodes 17a and 17b is not limited to such, and the pixel electrodes 17a and 17b may be aligned in the row direction, for example. In this case, the capacitance electrodes 37a and 38a shown in FIG. 22 are disposed such that they cross a space between the pixel electrodes 17a and 17b, extend in the column direction so as to overlap each of the pixel electrodes 17a and 17b, and are disposed in parallel with each other in the row direction, for example.

Embodiment 3

Figure 27:
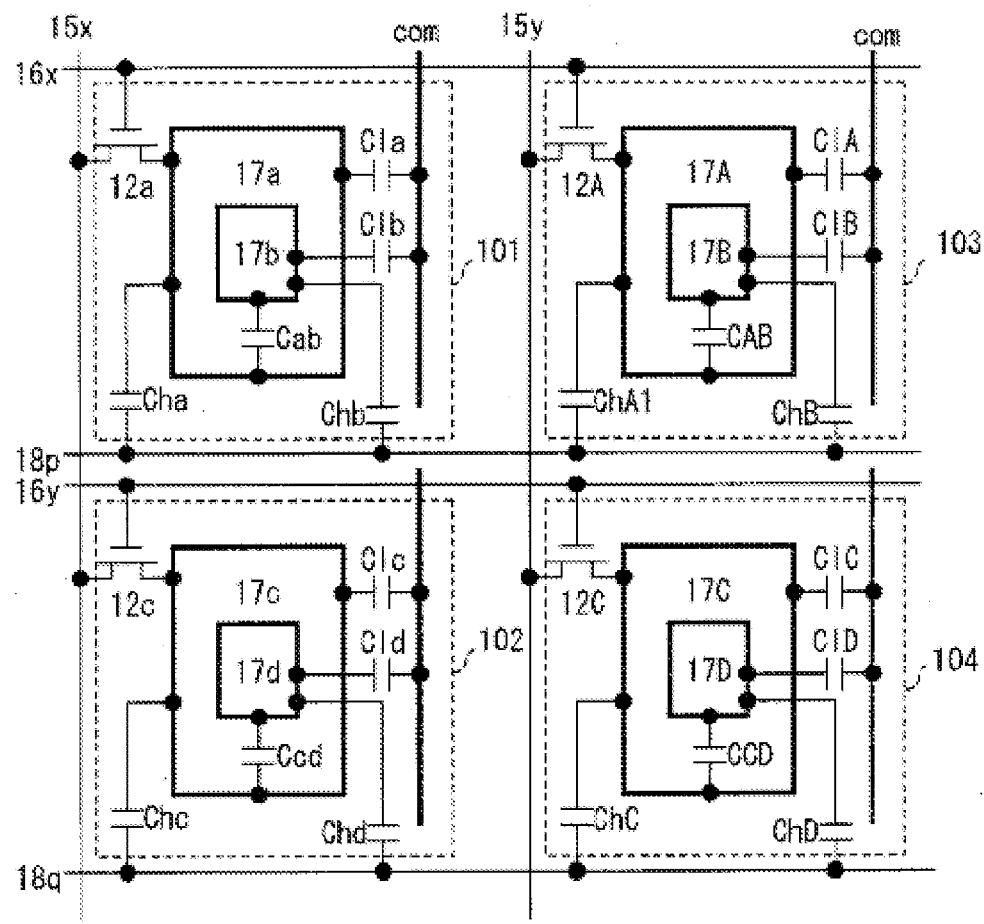
FIG. 27 is a circuit diagram showing the configuration of a liquid crystal panel according to Embodiment 3.

FIG. 27 is an equivalent circuit diagram showing a part of the liquid crystal panel according to Embodiment 3. As shown in FIG. 27, the present liquid crystal panel includes: data signal lines (15x and 15y) extending in a column direction (up and down directions in the figure); scan signal lines (16x and 16y) extending in a row direction (right and left directions in the figure); pixels arranged in the row and column directions (101 to 104); storage capacitance wirings (18p and 18q); and a common electrode (opposite electrode) com. All pixels have the same structure. The pixel column that includes the pixels 101 and 102 and the pixel column that includes the pixels 103 and 104 are adjacent to each other, and the pixel row that includes the pixels 101 and 103 and the pixel row that includes the pixels 102 and 104 are adjacent to each other.

In the present liquid crystal panel, one data signal line and one scan signal line are provided for each of the pixels. Moreover, two pixel electrodes are provided in a single pixel such that one of the two pixel electrodes surrounds the other. The pixel electrode 17b and the pixel electrode 17a, which surrounds the pixel electrode 17b, are provided in the pixel 101; the pixel electrode 17d and the pixel electrode 17c, which surrounds the pixel electrode 17d, are provided in the pixel 102; the pixel electrode 17B and the pixel electrode 17A, which surrounds the pixel electrode 17B, are provided in the pixel 103; and the pixel electrode 17D and the pixel electrode 17C, which surrounds the pixel electrode 17D, are provided in the pixel 104.

Figure 28:
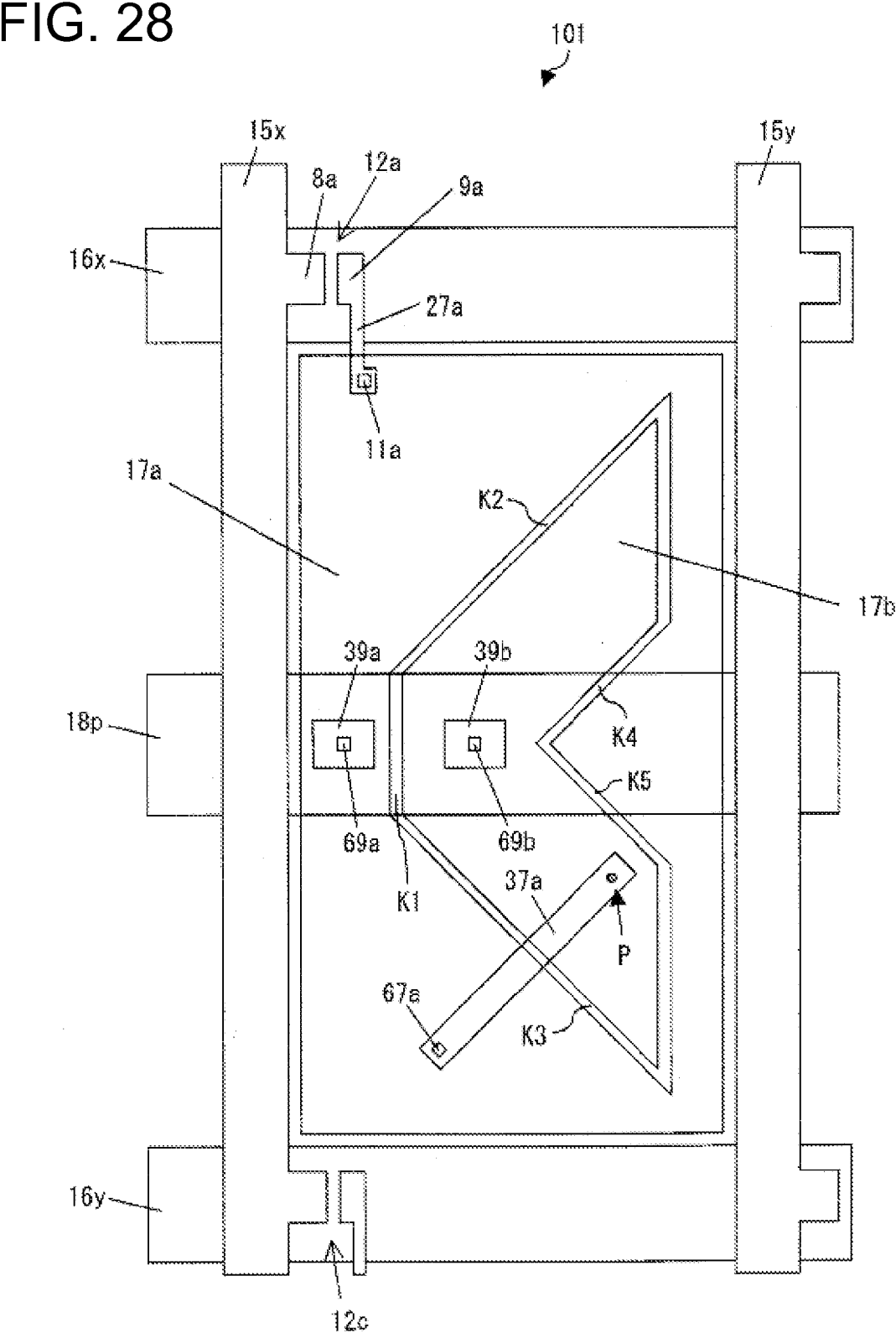
FIG. 28 is a plan view showing a specific example of the liquid crystal panel shown in FIG. 27.

A specific example of the pixel 101 of FIG. 27 is shown in FIG. 28. As shown in the figure, the transistor 12a is disposed in the proximity of the intersection of the data signal line 15x and the scan signal line 16x, and in the pixel region defined by the both signal lines (15x and 16x), the pixel electrode 17b, which has a V-shape when viewed in the row direction, and the pixel electrode 17a, which surrounds the pixel electrode 17b, are provided, and the storage capacitance wiring 18p extends in the row direction crossing the center of the pixels. Specifically, the pixel electrode 17b is constituted of a first side that is located over the storage capacitance wiring 18p and forms approximately 90 degrees to the row direction; a second side that extends from one end of the first side by forming approximately 45 degrees to the row direction; a third side that extends from the other end of the first side by forming approximately 315 degrees to the row direction; a fourth side that has one end over the storage capacitance wiring 18p, and is in parallel with and shorter than the second side; a fifth side that is connected to one end of the fourth side, and is parallel with and shorter than the third side; a sixth side that connects the second and fourth sides; and a seventh side that connects the third and fifth sides. The inner periphery of the pixel electrode 17a is constituted of seven sides that are facing the above-mentioned first to seventh sides.

Further, a space between the first side of the pixel electrode 17b and an inner peripheral side of the pixel electrode 17a that faces the first side is called a first space K1; a space between the second side of the pixel electrode 17b and an inner peripheral side of the pixel electrode 17a that faces the second side is called a second space K2; a space between the third side of the pixel electrode 17b and an inner peripheral side of the pixel electrode 17a that faces this third side is called a third space K3; a space between the fourth side of the pixel electrode 17b and an inner peripheral side of the pixel electrode 17a that faces the fourth side is called a fourth space K4; and a space between the fifth side of the pixel electrode 17b and an inner peripheral side of the pixel electrode 17a that faces the fourth side is called a fifth space K5. The capacitance electrode 37a is disposed such that it crosses the third space K3 and overlaps the pixel electrode 17a and the pixel electrode 17b. More specifically, the capacitance electrode 37a has a shape that extends to form 225 degrees to the row direction of the storage capacitance wiring 18p so as to cross the third space K3 when observed in a plan view, and it does not overlap the storage capacitance wiring 18p.

Over the scan signal line 16x, the source electrode 8a and the drain electrode 9a of the transistor 12a are formed, and the source electrode 8a is connected to the data signal line 15x. The drain electrode 9a is connected to the drain lead-out wiring 27a, and the drain lead-out wiring 27a is connected to the pixel electrode 17a through the contact hole 11a. Further, the capacitance electrode 37a is connected to the pixel electrode 17a through the contact hole 67a, and overlaps the pixel electrode 17b through an interlayer insulating film, and the coupling capacitance Cab (see FIG. 27) between the pixel electrodes 17a and 17b is formed at the location of the overlap. Also, the capacitance electrode 37a is formed such that it overlaps the pixel electrode 17a through the interlayer insulating film, and the area of the overlapped portion is substantially equal to the area of the overlapped portion between the capacitance electrode 37a and the pixel electrode 17b.

The storage capacitance electrode 39a (conductive body) is connected to the pixel electrode 17a through the contact hole 69a, and overlaps the storage capacitance wiring 18p through the gate insulating film, and most of the storage capacitance Cha (see FIG. 27) is formed at the location of the overlap. The storage capacitance electrode 39b (conductive body) is connected to the pixel electrode 17b through the contact hole 69b, and overlaps the storage capacitance wiring 18p through the gate insulating film, and most of the storage capacitance Chb (see FIG. 27) is formed at the location of the overlap.

In the liquid crystal panel of FIG. 28, the pixel electrode 17a and the pixel electrode 17b are connected (capacitively-coupled) to each other by the coupling capacitance (Cab), and therefore, if the capacitance electrode 37a is short-circuited to the pixel electrode 17b (in the manufacturing process or the like) at "P" in FIG. 28, for example, by removing (trimming) a portion of the pixel electrode 17a inside the contact hole 67a by a laser or the like to electrically disconnect the pixel electrode 17a from the capacitance electrode 37a, the capacitance coupling of the pixel electrodes 17a and 17b can be maintained through a coupling capacitance formed in the portion where the pixel electrode 17a and the capacitance electrode 37a overlap. This way, according to the present embodiment, a higher production yield of the liquid crystal panel and the active matrix substrate for use in the liquid crystal panel can be achieved.

Moreover, in the present liquid crystal panel, the capacitance electrode 37a is disposed such that the area it overlaps the pixel electrode 17a and the area it overlaps the pixel electrode 17b are substantially equal to each another, and therefore, the value of the coupling capacitance before and after a short-circuit (that is, a capacitance value formed in a portion where the capacitance electrode 37a and the pixel electrode 17b overlap (before a short-circuit) and a capacitance value formed in a portion where the capacitance electrode 37a and the pixel electrode 17b overlap (after the short-circuit)) is unlikely to change. Accordingly, the potential of the pixel electrodes 17a and 17b can be controlled normally.

In the liquid crystal panel of FIG. 28, because the pixel electrode 17a surrounds the pixel electrode 17b that is electrically floating, this pixel electrode 17a functions as a shield electrode, and it is possible to suppress a jumping or the like of electric charge to the pixel electrode 17b. This way, burn-ins of sub-pixels (dark sub-pixels) including the pixel electrode 17b can be mostly suppressed.

Figure 29:
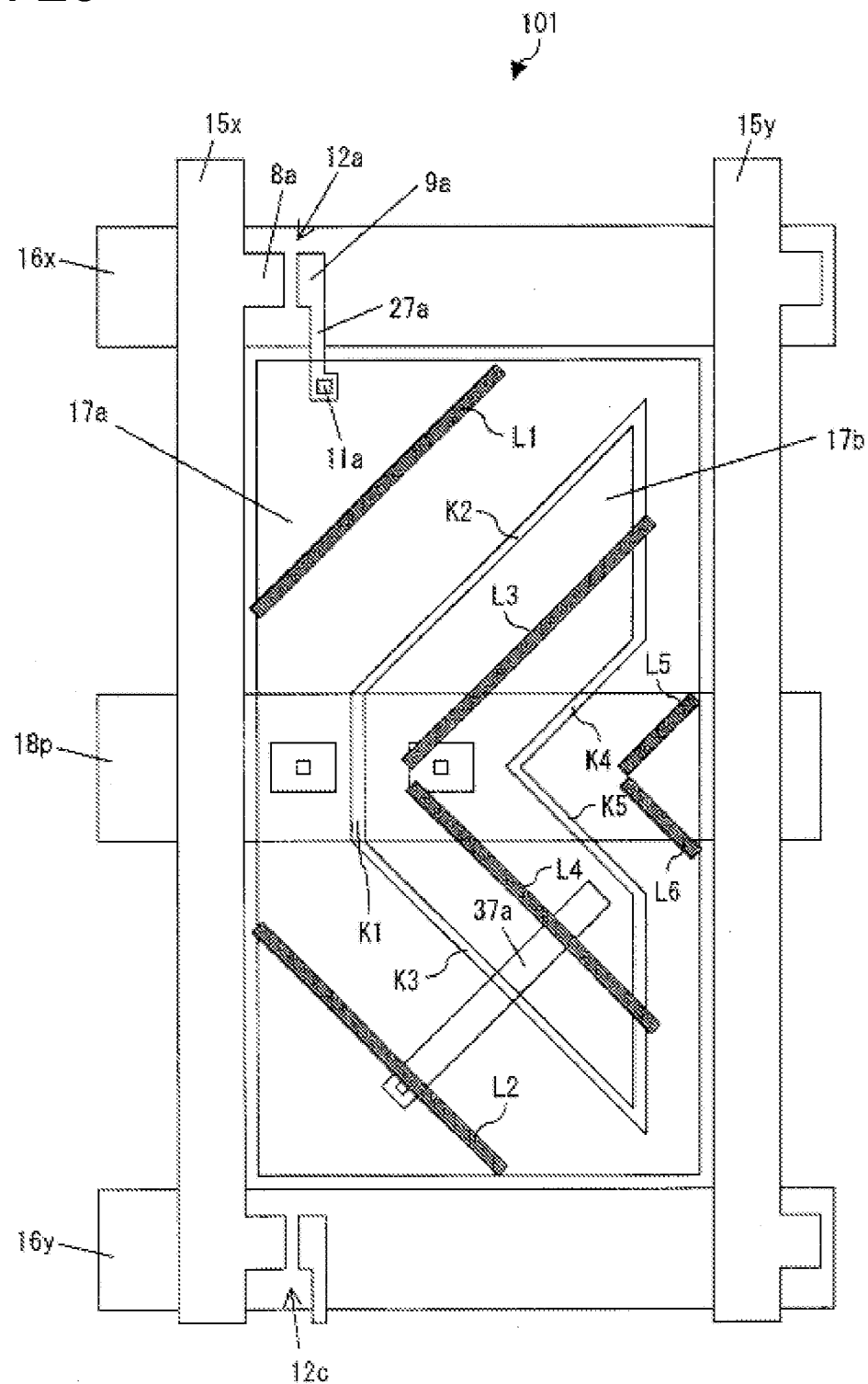
FIG. 29 is a plan view showing another specific example of the liquid crystal panel shown in FIG. 27.

Furthermore, the alignment control structure is omitted in FIG. 28. However, for a liquid crystal panel of MVA (Multi-domain Vertical Alignment) system, for example, as shown in FIG. 29, the spaces K2 to K5 of the pixel electrodes 17a and 17b function as the alignment control structure, and a rib L3, which is parallel with the spaces K2 and K4, and a rib L4, which is parallel with the spaces K3 and K5, are formed at the portion corresponding to the pixel electrode 17b of the color filter substrate; and ribs L1 and L5, which are parallel with the spaces K2 and K4, and ribs L2 and L6, which are parallel with the spaces K3 and K5, are formed in a portion corresponding to the pixel electrode 17a of the color filter substrate, for example. Here, instead of providing the above-mentioned alignment control ribs, alignment control slits may be provided in the common electrode of the color filter substrate.

Figure 30:
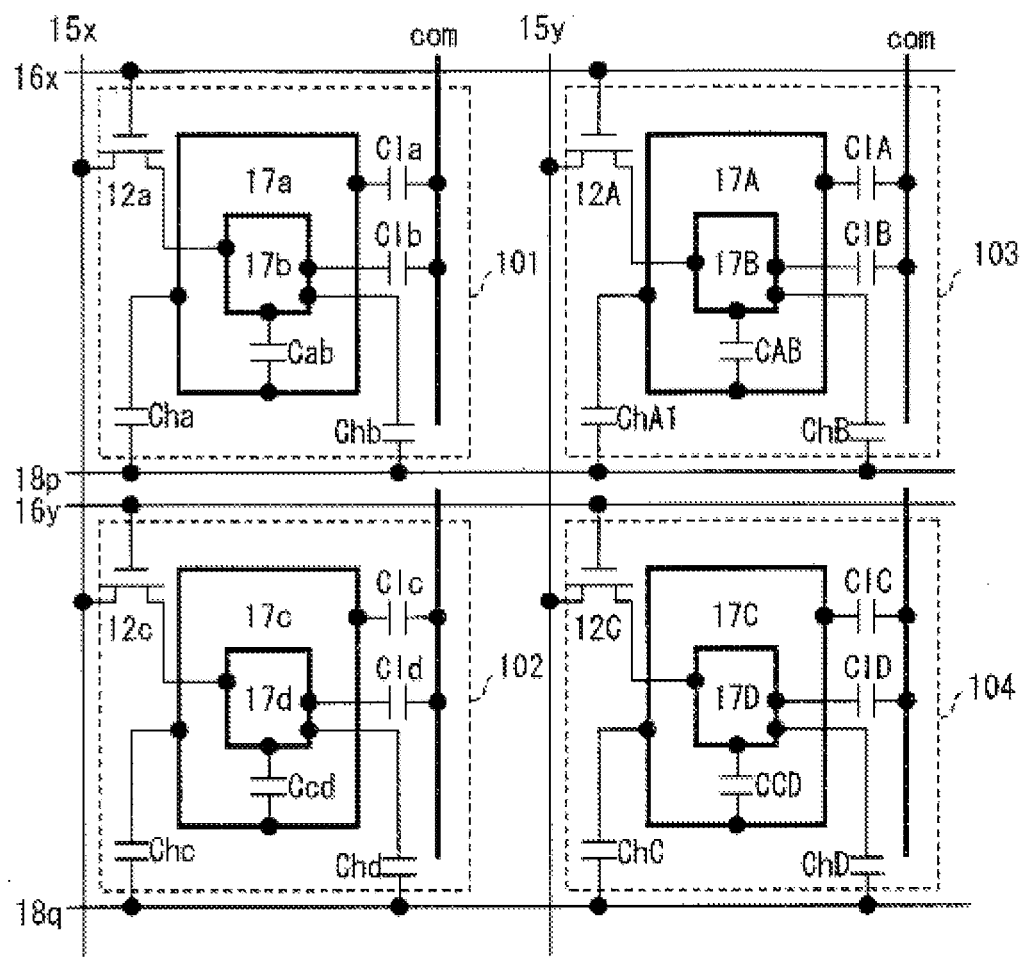
FIG. 30 is a circuit diagram showing another configuration of the liquid crystal panel according to Embodiment 3.

Here, in FIG. 27, out of two pixel electrodes formed in a single pixel, one of them surrounds the other pixel electrode, and the pixel electrode that is surrounding the other is connected to the transistor, but the present invention is not limited to such. As shown in FIG. 30, out of two pixel electrodes formed in a single pixel, one of them surrounds the other pixel electrode, and the pixel electrode that is being surrounded may be connected to the transistor.

Figure 31:
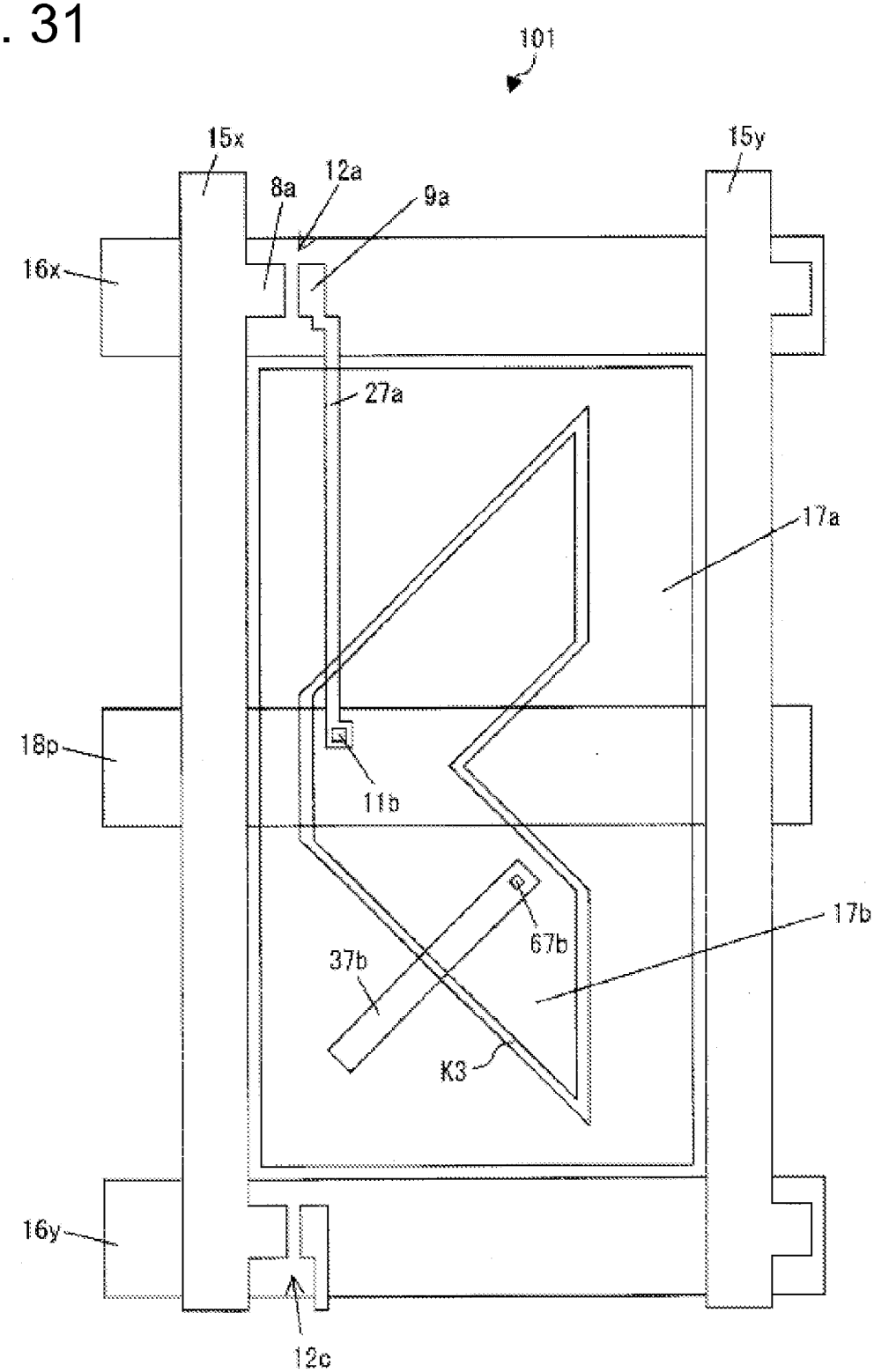
FIG. 31 is a plan view showing a specific example of the liquid crystal panel shown in FIG. 30.

A specific example of the pixel 101 of FIG. 30 is shown in FIG. 31. As shown in the figure, the shapes and arrangement of the pixel electrodes 17a and 17b as well as the storage capacitance wiring 18p are the same as those of FIG. 28. The capacitance electrode 37b is disposed such that it crosses the third space K3, and overlaps the pixel electrode 17a and the pixel electrode 17b.

Over the scan signal line 16x, the source electrode 8a and the drain electrode 9a of the transistor 12a are formed, and the source electrode 8a is connected to the data signal line 15x. The drain electrode 9a is connected to the pixel electrode 17b through the drain lead-out wiring 27a and the contact hole 11b. The capacitance electrode 37b is connected to the pixel electrode 17b through the contact hole 67b, and overlaps the pixel electrode 17a through an interlayer insulating film, and the coupling capacitance Cab (see FIG. 30) between the pixel electrodes 17a and 17b is formed at the location of the overlap. Also, the capacitance electrode 37b is formed such that it overlaps the pixel electrode 17b through the interlayer insulating film, and the area of the overlapped portion is substantially equal to the area of the overlapped portion between the capacitance electrode 37b and the pixel electrode 17a.

Also, the pixel electrode 17a and the storage capacitance wiring 18p overlap with each other through the interlayer insulating film and a gate insulating film, and the storage capacitance Cha (see FIG. 30) is formed at the location of the overlap. The pixel electrode 17b and the storage capacitance wiring 18p overlap through the interlayer insulating film and the gate insulating film, and the storage capacitance Chb (see FIG. 30) is formed at the location of the overlap. Here, the storage capacitance electrodes 39a and 39b shown in FIG. 28 may also be included in order to increase the storage capacitance value. The configuration (the shapes and locations of the respective members, and the relation of connection among them) of other pixels is the same as that of the pixel 101. According to this configuration, the sub-pixel that includes the pixel electrode 17a becomes "DA", and the sub-pixel that includes the pixel electrode 17b becomes "BR".

Further, only one capacitance electrode is formed in the present embodiment, but the present invention is not limited to such, and two or more capacitance electrodes may be formed as well. This way, the coupling capacitance value can be increased.

Embodiment 4

Figure 32:
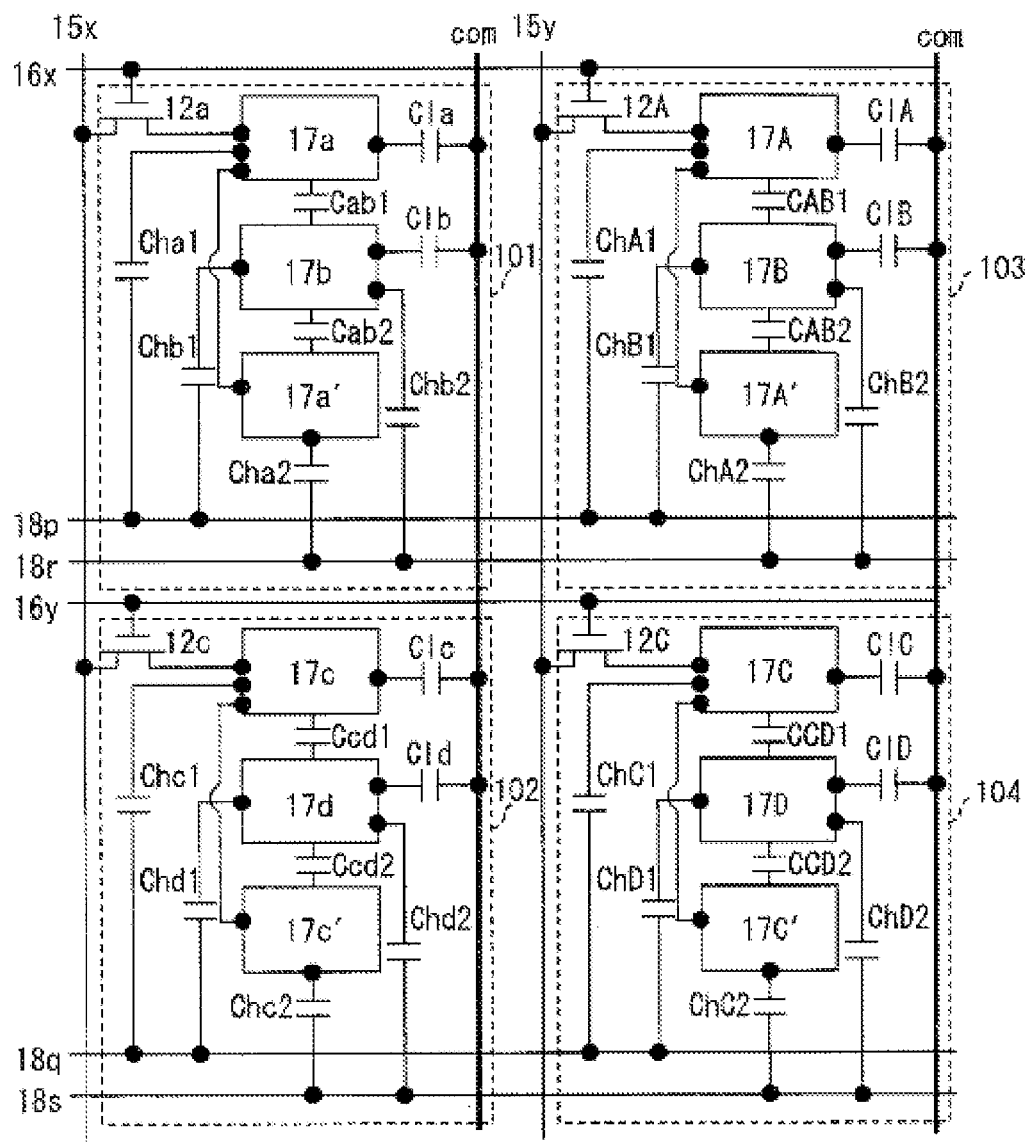
FIG. 32 is a circuit diagram showing another configuration of a liquid crystal panel according to Embodiment 4.

FIG. 32 is an equivalent circuit diagram showing a part of the liquid crystal panel according to Embodiment 4. As shown in FIG. 32, the present liquid crystal panel includes: data signal lines (15x and 15y) extending in a column direction (up and down directions in the figure); scan signal lines (16x and 16y) extending in a row direction (right and left directions in the figure); pixels arranged in the row and column directions (101 to 104); storage capacitance wirings (18p to 18s); and a common electrode (opposite electrode) com. All pixels have the same structure. The pixel column that includes the pixels 101 and 102 and the pixel column that includes the pixels 103 and 104 are adjacent to each other, and the pixel row that includes the pixels 101 and 103 and the pixel row that includes the pixels 102 and 104 are adjacent to each other.

In the present liquid crystal panel, one data signal line, one scan signal line, and two storage capacitance wirings are provided for each of the pixels. Three pixel electrodes are provided in a single pixel. Pixel electrodes 17a (a first pixel electrode), 17b (a second pixel electrode), and 17a' (a third pixel electrode) are provided in the pixel 101, pixel electrodes 17c, 17d, and 17c' are provided in the pixel 102, pixel electrodes 17A, 17B, and 17A' are provided in the pixel 103, and pixel electrodes 17C, 17D, and 17C' are provided in the pixel 104. Here, the storage capacitance wiring may also be just one.

Figure 33:
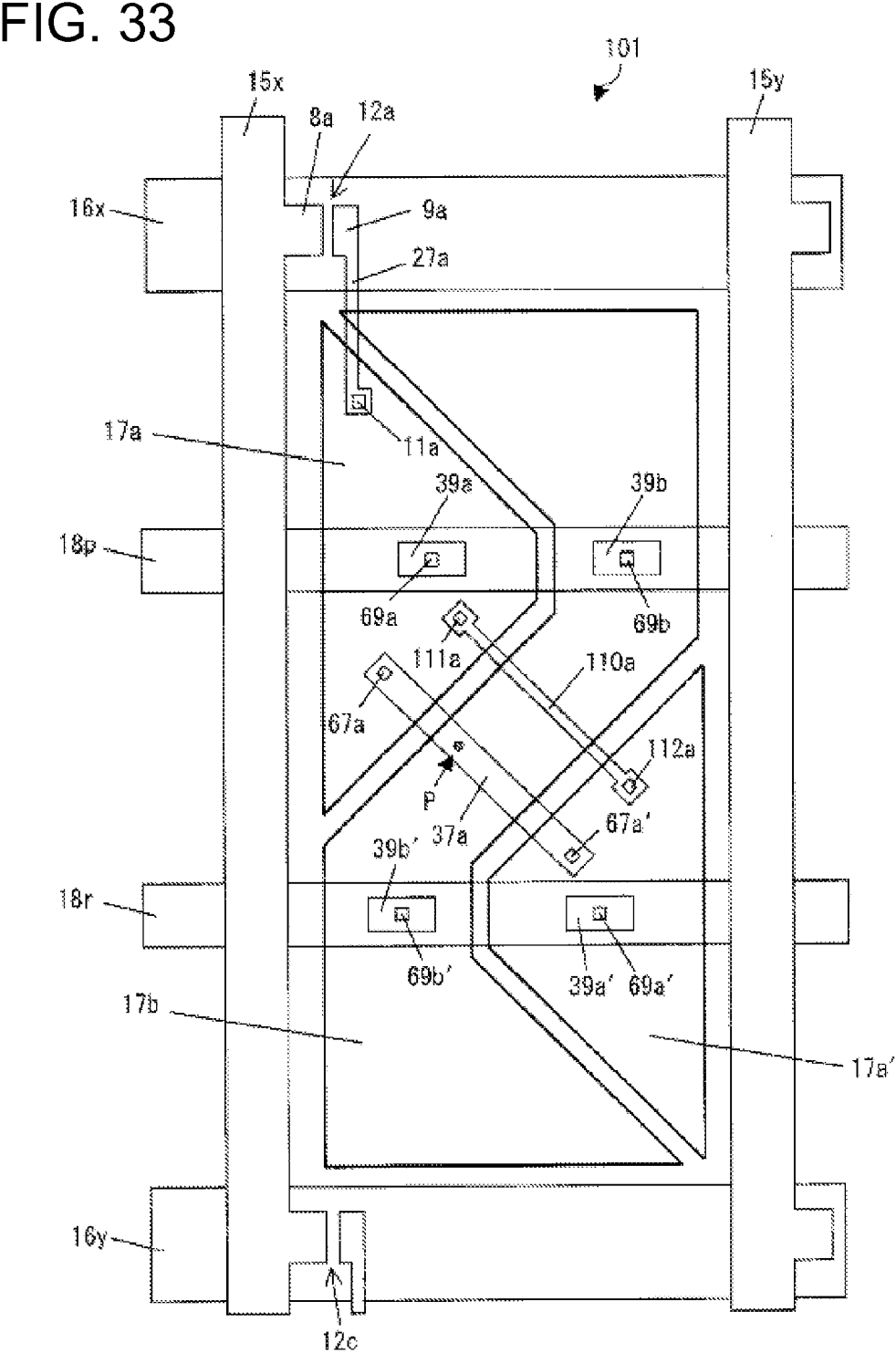
FIG. 33 is a plan view showing a specific example of the liquid crystal panel shown in FIG. 32.

A specific example of the pixel 101 of FIG. 32 is shown in FIG. 33. As shown in the figure, the transistor 12a is disposed in the proximity of the intersection of the data signal line 15x and the scan signal line 16x. In a pixel region defined by the two signal lines (15x and 16x), a trapezoidal-shaped pixel electrode 17a is formed, a trapezoidal-shaped pixel electrode 17a', which substantially matches the shape of the pixel electrode 17a when it is rotated 180 degrees, is formed at a position that is substantially 315 degrees to a row direction of the storage capacitance wiring 18p, and a pixel electrode 17b is disposed in a region where these pixel electrodes 17a and 17a' are absent such that it corresponds to (fits) the shape of the pixel electrodes 17a and 17a'. Further, the storage capacitance wirings 18p and 18r are disposed in parallel with each other, and the storage capacitance wirings 18p crosses the pixel electrodes 17a and 17b to extend in the row direction, and the storage capacitance wirings 18r crosses the pixel electrodes 17b and 17a' to extend in the row direction.

According to this configuration, each of the pixel electrodes 17a, 17b, and 17a' are disposed such that a part of the pixel electrode 17a is located near the scan signal line 16x, a part of the pixel electrode 17a' is located near the scan signal line 16y, and one edge of the pixel electrode 17b is located near the scan signal line 16x and the other edge is located near the scan signal line 16y. In other words, at least parts of the respective pixel electrodes 17a and 17a' are disposed near the respective scan signal lines 16x and 16y, and the pixel electrode 17b is disposed to extend in the column direction as if to bridge the scan signal lines 16x and 16y. The capacitance electrode 37a extends, forming 315 degrees to the row direction of the storage capacitance wiring 18p across the pixel electrode 17b to cross a space between the pixel electrodes 17a and 17b and a space between the pixel electrodes 17b and 17a', and overlaps portions of the respective pixel electrodes 17a and 17a'. Moreover, the capacitance electrode 37a is formed such that the area overlapping the pixel electrode 17b is substantially equal to the sum of the area overlapping the pixel electrode 17a and the area overlapping the pixel electrode 17a'.

Over the scan signal line 16x, the source electrode 8a and the drain electrode 9a of the transistor 12a are formed, and the source electrode 8a is connected to the data signal line 15x. The drain electrode 9a is connected to a drain lead-out wiring 27a, and the drain lead-out wiring 27a is connected to the pixel electrode 17a through the contact hole 11a. The capacitance electrode 37a is connected to the pixel electrode 17a through the contact hole 67a, and is also connected to the pixel electrode 17a' through the contact hole 67a', and overlaps the pixel electrode 17b through an interlayer insulating film, and the coupling capacitance Cab (corresponds to Cab1 and Cab2 of FIG. 32) between the pixel electrodes 17a (17a') and 17b is formed at the location of the overlap. The pixel electrodes 17a and 17a' are electrically connected to each other through the contact holes 111a, 112a, and a relay wiring 110a.

Furthermore, the storage capacitance electrode 39a is connected to the pixel electrode 17a through the contact hole 69a, and overlaps the storage capacitance wiring 18p through a gate insulating film, and most of the storage capacitance Cha1 (see FIG. 32) is formed at the location of the overlap. The storage capacitance electrode 39a' is connected to the pixel electrode 17a' through the contact hole 69a', and overlaps the storage capacitance wiring 18r through the gate insulating film, and most of the storage capacitance Cha2 (see FIG. 32) is formed at the location of the overlap. Also, the storage capacitance electrode 39b is connected to the pixel electrode 17b through the contact hole 69b, and overlaps the storage capacitance wiring 18p through the gate insulating film, and most of the storage capacitance Chb1 (see FIG. 32) is formed at the location of the overlap. The storage capacitance electrode 39b' is connected to the pixel electrode 17b through the contact hole 69b', and overlaps the storage capacitance wiring 18r through the gate insulating film, and most of the storage capacitance Chb2 (see FIG. 32) is formed at the location of the overlap. For this liquid crystal panel, the sub-pixel that includes the pixel electrodes 17a and 17a' becomes "BR", and the sub-pixel that includes the pixel electrode 17b becomes "DA".

Figure 34:
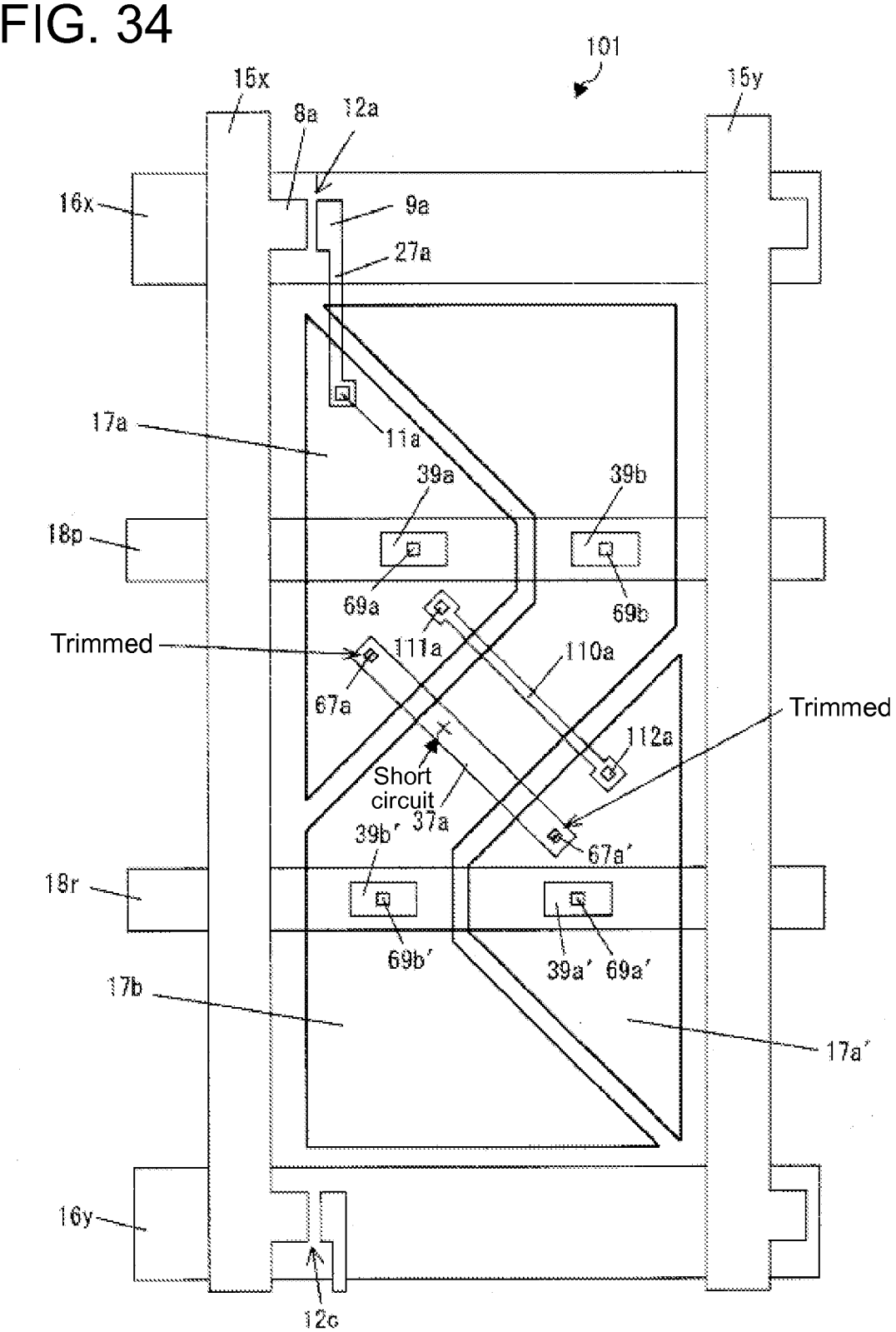
FIG. 34 is a plan view showing a repair method of the liquid crystal panel of FIG. 33.

In the liquid crystal panel of FIG. 33, the pixel electrode 17a (17a') and the pixel electrode 17b are connected (capacitively-coupled) to each other by the coupling capacitances (Cab1 and Cab2), and therefore, if the capacitance electrode 37a is short-circuited (in the manufacturing process or the like) to the pixel electrode 17b at "P" in FIG. 33, for example, as shown in FIG. 34, by removing (trimming) a portion of the pixel electrode 17a inside the contact hole 67a by a laser or the like to electrically disconnect the pixel electrode 17a from the capacitance electrode 37a, and also by removing (trimming) a portion of the pixel electrode 17a' inside the contact hole 67a' by a laser or the like to electrically disconnect the pixel electrode 17a' from the capacitance electrode 37a, it is possible to maintain the capacitance coupling of the pixel electrodes 17a (17a') and 17b through a coupling capacitance formed in the portion where the pixel electrode 17a and the capacitance electrode 37a overlap, and a coupling capacitance formed in the portion where the pixel electrode 17a' and the capacitance electrode 37a overlap. This way, according to the present embodiment, a higher production yield of the liquid crystal panel and the active matrix substrate for use in the liquid crystal panel can be achieved.

Further, in the present liquid crystal panel, the capacitance electrode 37a is disposed such that the area overlapping the pixel electrode 17b is substantially equal to the sum of the area overlapping the pixel electrode 17a and the area overlapping the pixel electrode 17a', and therefore, the value of the coupling capacitance before and after a short-circuit (that is, a capacitance value formed between the capacitance electrode 37a and the pixel electrode 17b (before the short-circuit), and a capacitance value formed between the capacitance electrode 37a and the pixel electrodes 17a and 17a' (after the short-circuit)) is unlikely to change. Accordingly, the potential of the pixel electrodes 17a and 17b can be controlled normally.

Figure 35:
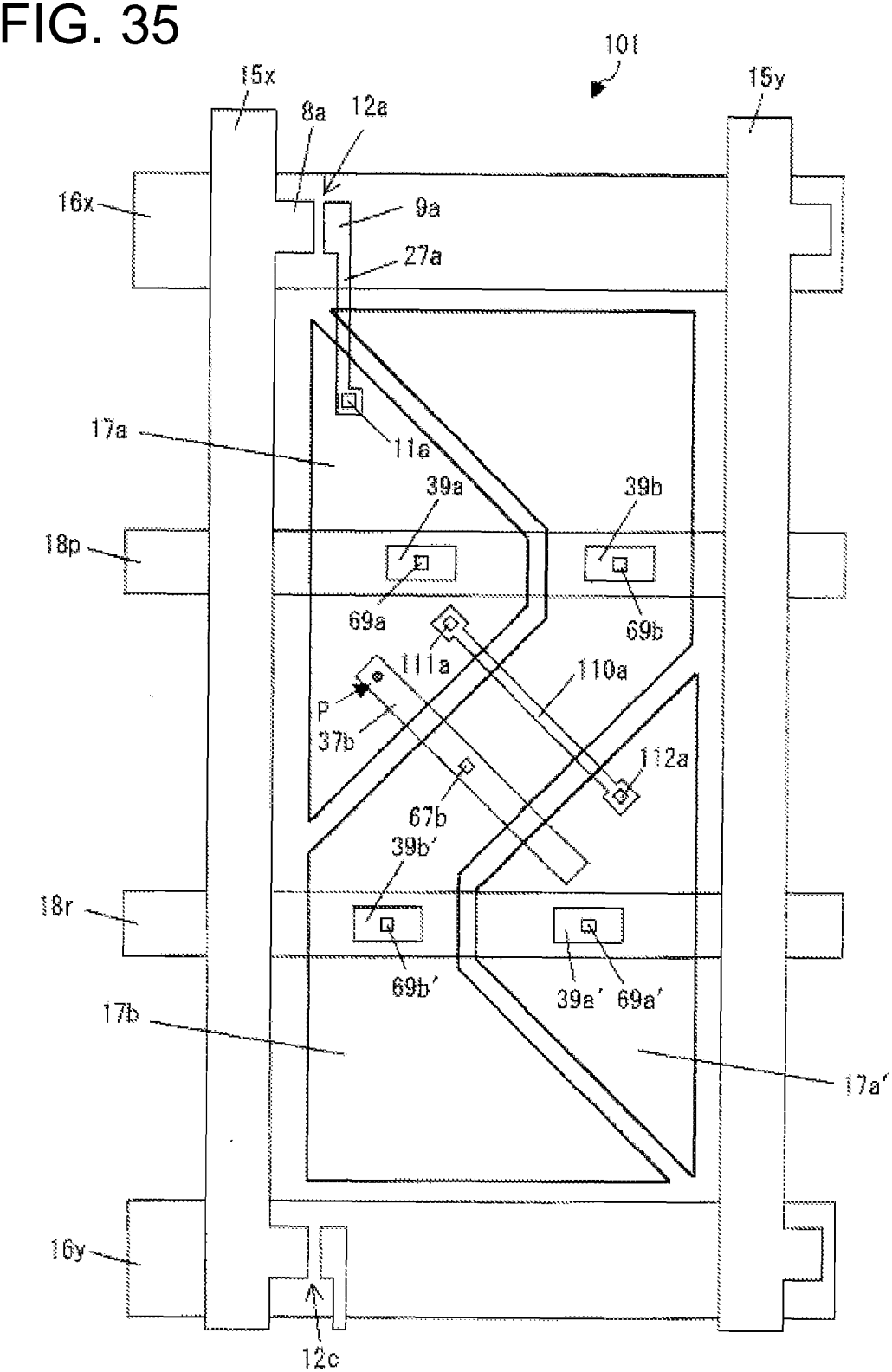
FIG. 35 is a plan view showing another specific example of the liquid crystal panel shown in FIG. 32.

The pixel 101 of FIG. 33 may be modified as shown in FIG. 35. The liquid crystal panel of FIG. 35 has a configuration in which a capacitance electrode is electrically connected to a pixel electrode corresponding to a sub-pixel that will be a dark sub-pixel. Specifically, in the present liquid crystal panel, the drain electrode 9a of the transistor 12a is connected to the pixel electrode 17a through the contact hole 11a, and the pixel electrode 17b and the capacitance electrode 37b are connected to each other through the contact hole 67b. The pixel electrodes 17a (17a') and 17b are connected (capacitively-coupled) to each other through a capacitance (coupling capacitance) that is formed by overlapping the capacitance electrode 37b, which is electrically connected to the pixel electrode 17b, with the pixel electrodes 17a and 17a' through the interlayer insulating film 25. Moreover, the capacitance electrode 37b is formed such that it overlaps the pixel electrode 17b through the interlayer insulating film, and the area overlapping the pixel electrode 17b is substantially equal to the sum of the area overlapping the pixel electrode 17a and the area overlapping the pixel electrode 17a'.

According to this configuration, because the pixel electrode 17a (17a') and the pixel electrode 17b are connected to each other by the coupling capacitance (Cab), if the capacitance electrode 37b is short-circuited (in the manufacturing process or the like) to the pixel electrode 17a at "P" in FIG. 35, for example, a portion of the pixel electrode 17b inside the contact hole 67b is removed (trimmed) by a laser or the like to electrically disconnect the pixel electrode 17b from the capacitance electrode 37b, and a portion of the portion where the capacitance electrode 37b and the pixel electrode 17a' overlap is melted to short-circuit them. This way, the capacitance coupling of the pixel electrodes 17a (17a') and 17b can be maintained through a coupling capacitance formed in a portion where the pixel electrode 17b and the capacitance electrode 37b overlap. Thus, according to the present embodiment, a higher production yield of the liquid crystal panel and the active matrix substrate for use in the liquid crystal panel can be achieved.

Moreover, in the present liquid crystal panel, the capacitance electrode 37b is disposed such that the total of the areas overlapping each of the pixel electrodes 17a and 17a' is substantially equal to the area overlapping the pixel electrode 17b, and therefore, the value of the coupling capacitance before and after the short-circuit (that is, a capacitance value formed in a portion where the capacitance electrode 37b and the pixel electrodes 17a and 17a' overlap (before a short-circuit) and a capacitance value formed in a portion where the capacitance electrode 37b and the pixel electrode 17b overlap (after the short-circuit)) is unlikely to change. Accordingly, the potential of the pixel electrodes 17a (17a') and 17b can be controlled normally.

Figure 36:
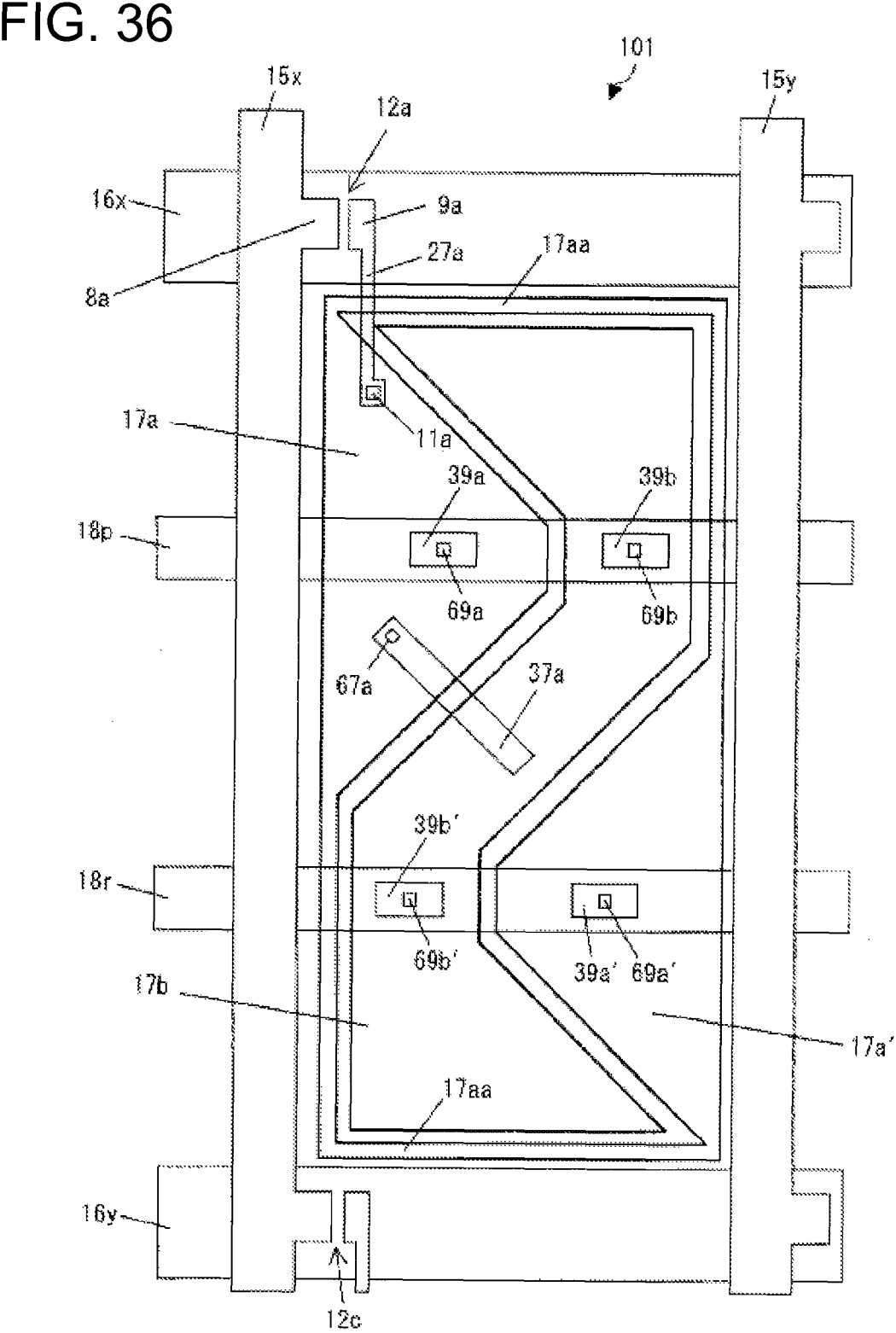
FIG. 36 is a plan view showing another specific example of the liquid crystal panel shown in FIG. 32.

The pixel 101 of FIG. 33 may be modified as shown in FIG. 36. In the configuration of FIG. 36, the pixel electrodes 17a and 17a' of FIG. 33 are connected to each other at the outer peripheral region of the pixel electrode 17b through the connecting member 17aa, which is made of an ITO or the like. That is, a pixel electrode integrally formed by the pixel electrodes 17a and 17a' is disposed so as to surround the pixel electrode 17b. Therefore, because the pixel electrode 17b that is electrically floating is surrounded by the pixel electrodes 17a and 17a', the pixel electrodes 17a and 17a' function as shield electrodes, and it is possible to suppress a jumping or the like of electric charge to the pixel electrode 17b. This way, a burn-in of a sub-pixel (dark sub-pixel) including the pixel electrode 17b can be suppressed.

Further, in this configuration, the pixel electrodes 17a and 17a' are electrically connected to each other through the connecting member 17aa, and therefore, the capacitance electrode 37a only needs to be connected to one of the pixel electrodes 17a and 17a' (the pixel electrode 17a in FIG. 36) through a contact hole (67a). Moreover, the capacitance electrode 37a only needs to be formed such that it overlaps the pixel electrode 17a (or the pixel electrode 17a') through an interlayer insulating film, and that the area of the overlapped portion is substantially equal to the area of the overlapped portion between the capacitance electrode 37a and the pixel electrode 17b.

Only one capacitance electrode is formed in the present embodiment, but the present invention is not limited to such, and two or more capacitance electrodes may also be formed. This way, the coupling capacitance value can be increased.

Embodiment 5

Figure 37:
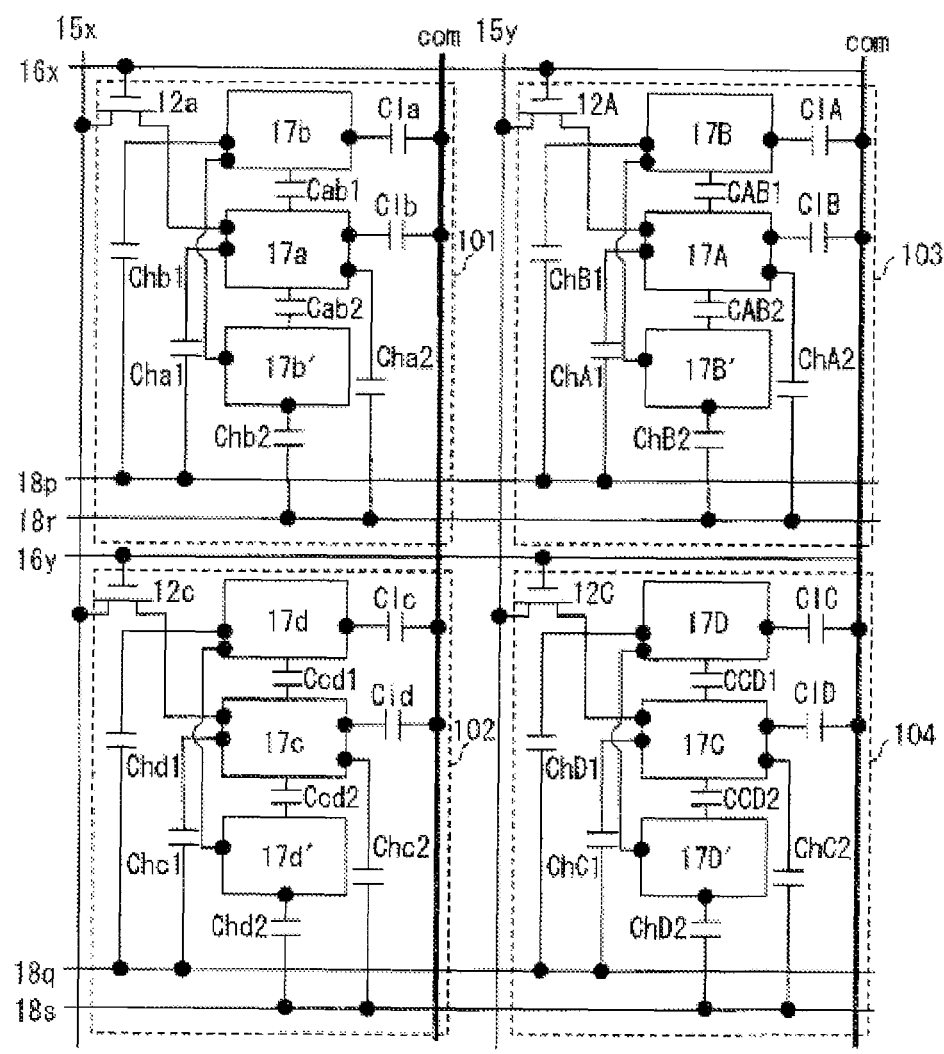
FIG. 37 is a circuit diagram showing another configuration of a liquid crystal panel according to Embodiment 5.

FIG. 37 is an equivalent circuit diagram showing a part of the liquid crystal panel according to Embodiment 5. As shown in FIG. 37, the present liquid crystal panel includes: data signal lines (15x and 15y) extending in a column direction (up and down directions in the figure); scan signal lines (16x and 16y) extending in a row direction (right and left directions in the figure); pixels arranged in the row and column directions (101 to 104); storage capacitance wirings (18p to 18s); and a common electrode (opposite electrode) com. All pixels have the same structure. The pixel column that includes the pixels 101 and 102 and the pixel column that includes the pixels 103 and 104 are adjacent to each other, and the pixel row that includes the pixels 101 and 103 and the pixel row that includes the pixels 102 and 104 are adjacent to each other.

In the present liquid crystal panel, one data signal line, one scan signal line, and two storage capacitance wirings are provided for each of the pixels. Moreover, three pixel electrodes are provided in a single pixel. The pixel electrodes 17b (a second pixel electrode), 17a (a first pixel electrode), and 17b' (a third pixel electrode) are provided in the pixel 101, the pixel electrodes 17d, 17c, and 17d' are provided in the pixel 102, the pixel electrodes 17B, 17A, and 17B' are provided in the pixel 103, and the pixel electrodes 17D, 17C, and 17D' are provided in the pixel 104. Here, the storage capacitance wiring may be just one.

Figure 38:
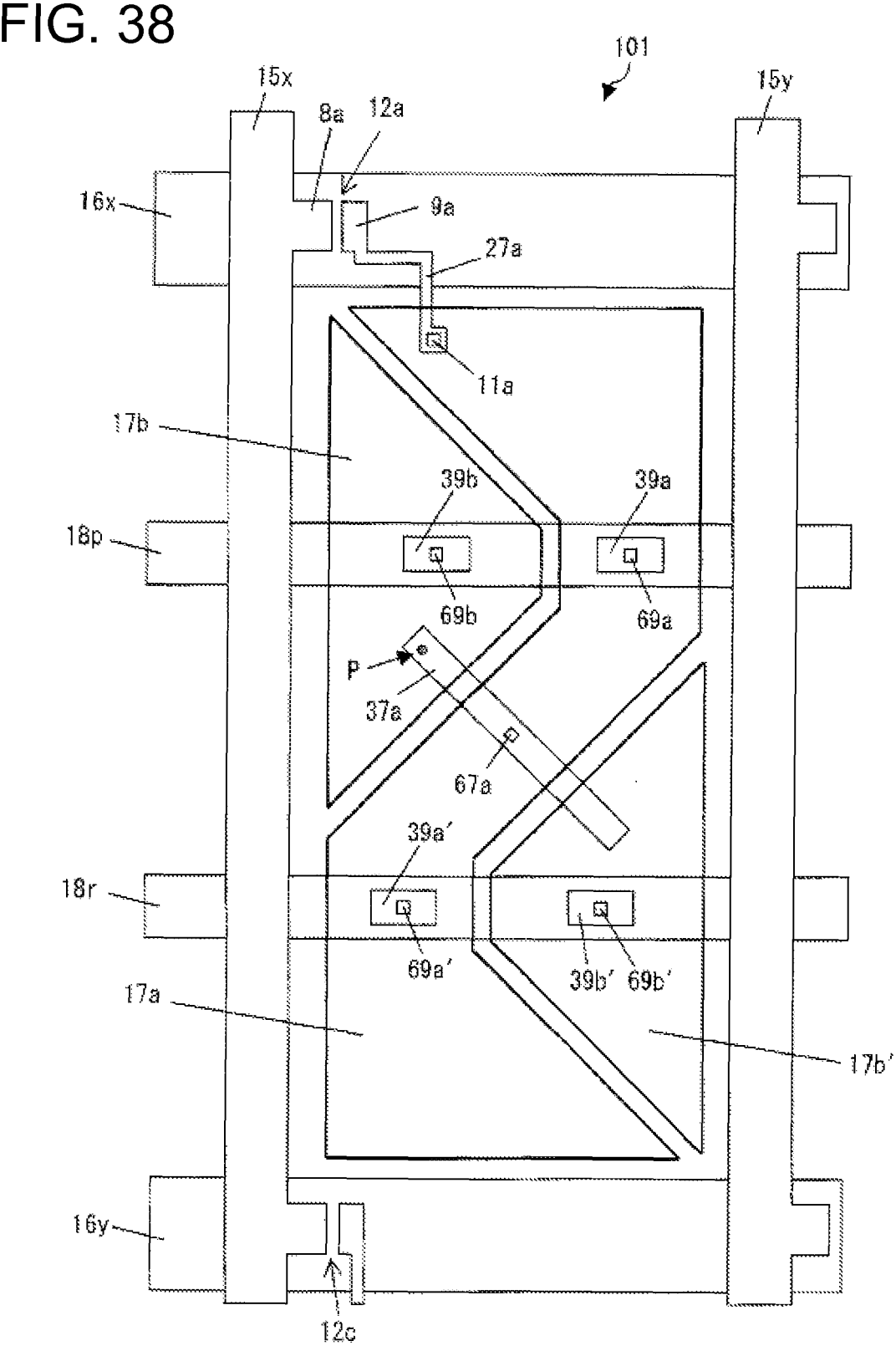
FIG. 38 is a plan view showing another specific example of the liquid crystal panel shown in FIG. 37.

A specific example of the pixel 101 of FIG. 37 is shown in FIG. 38. As shown in the figure, the transistor 12a is disposed in the proximity of the intersection of the data signal line 15x and the scan signal line 16x, and in a pixel region defined by the two signal lines (15x and 16x), a trapezoidal shaped pixel electrode 17b is formed; a trapezoidal-shaped pixel electrode 17b', which substantially matches the shape of the pixel electrode 17b when it is rotated 180 degrees, is formed at a position that is substantially 315 degrees to the row direction of the storage capacitance wiring 18p; and a pixel electrode 17a is disposed in a region where these pixel electrodes 17b and 17b' are absent such that it corresponds to (fits) the shape of the pixel electrodes 17b and 17b'. Further, the storage capacitance wirings 18p and 18r are disposed in parallel with each other, and the storage capacitance wiring 18p crosses the pixel electrodes 17b and 17a to extend in the row direction, and the storage capacitance wiring 18r crosses the pixel electrodes 17a and 17b' to extend in the row direction.

According to this structure, each of the pixel electrodes 17b, 17a, and 17b' are disposed such that a part of the pixel electrode 17b is located near the scan signal line 16x, a part of the pixel electrode 17b' is located near the scan signal line 16y, one of the edges of the pixel electrode 17a is located near the scan signal line 16x, and the other edge is located near the scan signal line 16y. In other words, at least portions of the respective pixel electrodes 17b and 17b' are located near the respective scan signal lines 16x and 16y, and the pixel electrode 17a is disposed to extend in the column direction as if to bridge the scan signal lines 16x and 16y. The capacitance electrode 37a extends, forming 315 degrees to the row direction of the storage capacitance wiring 18p across the pixel electrode 17b to cross a space between the pixel electrodes 17b and 17a and a space between the pixel electrodes 17a and 17b', and overlaps with portions of the respective pixel electrodes 17b and 17b'. Further, the capacitance electrode 37a is formed such that the area overlapping the pixel electrode 17a is substantially equal to the sum of the area overlapping the pixel electrode 17b and the area overlapping the pixel electrode 17b'.

Over the scan signal line 16x, the source electrode 8a and the drain electrode 9a of the transistor 12a are formed, and the source electrode 8a is connected to the data signal line 15x. The drain electrode 9a is connected to a drain lead-out wiring 27a, and the drain lead-out wiring 27a is connected to the pixel electrode 17a through the contact hole 11a. Further, the capacitance electrode 37a is connected to the pixel electrode 17a through the contact hole 67a, overlaps the pixel electrodes 17b and 17b' through an interlayer insulating film, and the coupling capacitance Cab (corresponds to Cab1 and Cab2 of FIG. 37) between the pixel electrodes 17a and 17b (17b') is formed at the location of the overlap.

Furthermore, the storage capacitance electrode 39a is connected to the pixel electrode 17a through the contact hole 69a, and overlaps the storage capacitance wiring 18p through a gate insulating film, and most of the storage capacitance Cha1 (see FIG. 37) is formed at the location of the overlap. The storage capacitance electrode 39a' is connected to the pixel electrode 17a through the contact hole 69a', and overlaps the storage capacitance wiring 18r through the gate insulating film, and most of the storage capacitance Cha2 (see FIG. 37) is formed at the location of the overlap. Moreover, the storage capacitance electrode 39b is connected to the pixel electrode 17b through the contact hole 69b, and overlaps the storage capacitance wiring 18p through the gate insulating film, and most of the storage capacitance Chb1 (see FIG. 37) is formed at the location of the overlap. The storage capacitance electrode 39b' is connected to the pixel electrode 17b' through the contact hole 69b', and overlaps the storage capacitance wiring 18r through the gate insulating film, and most of the storage capacitance Chb2 (see FIG. 37) is formed at the location of the overlap. For this liquid crystal panel, the sub-pixel that includes the pixel electrode 17a becomes "BR", and the sub-pixel that includes the pixel electrodes 17b and 17b' becomes "DA".

Figure 39:
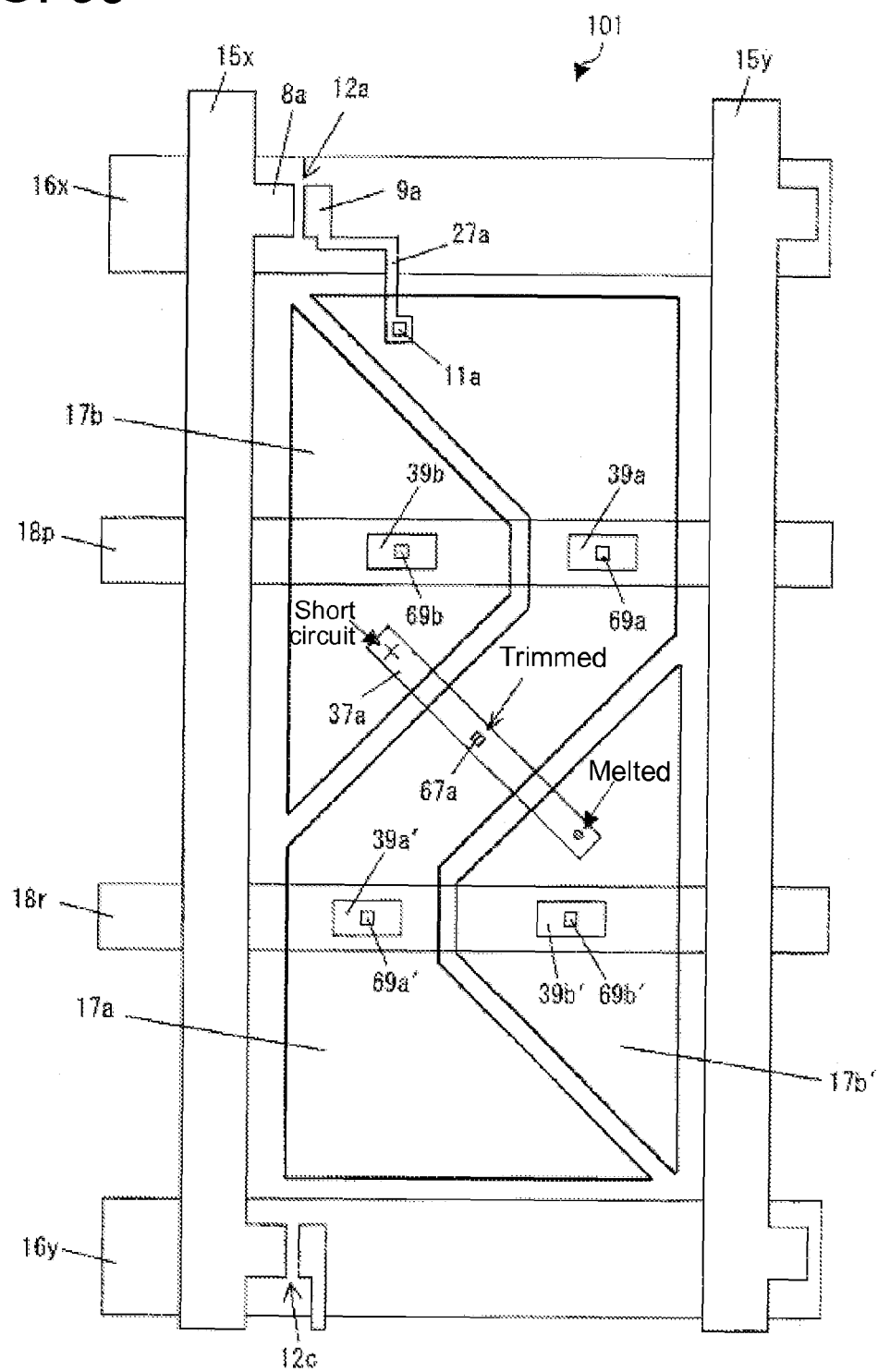
FIG. 39 is a plan view showing a repair method of the liquid crystal panel of FIG. 38.

In the liquid crystal panel of FIG. 38, the pixel electrode 17a and the pixel electrode 17b (17b') are connected (capacitively-coupled) to each other by the coupling capacitance (Cab1 and Cab2), and therefore, if the capacitance electrode 37a is short-circuited (in the manufacturing process or the like) to the pixel electrode 17b at "P" in FIG. 38, for example, as shown in FIG. 39, a portion of the pixel electrode 17a inside the contact hole 67a is removed (trimmed) by a laser or the like to electrically disconnect the pixel electrode 17a from the capacitance electrode 37a, a part of a portion where the capacitance electrode 37a and the pixel electrode 17b' overlap is melted to short-circuit them. Accordingly, the capacitance coupling of the pixel electrodes 17a and 17b (17b') can be maintained through a coupling capacitance formed at the portion where the pixel electrode 17a and the capacitance electrode 37a overlap. This way, according to the present embodiment, a higher production yield of the liquid crystal panel and the active matrix substrate for use in the liquid crystal panel can be achieved.

Furthermore, in the present liquid crystal panel, the capacitance electrode 37a is disposed such that the area overlapping the pixel electrode 17a is substantially equal to the sum of the area overlapping the pixel electrode 17b and the area overlapping the pixel electrode 17b', and therefore, the value of the coupling capacitance before and after the short-circuit (that is, a capacitance value formed between the capacitance electrode 37a and the pixel electrodes 17b and 17b' (before the short-circuit), and a capacitance value formed between the capacitance electrode 37a and the pixel electrode 17a (after the short-circuit)) is unlikely to change. Accordingly, the potential of the pixel electrodes 17a and 17b (17b') can be controlled normally.

Figure 40:
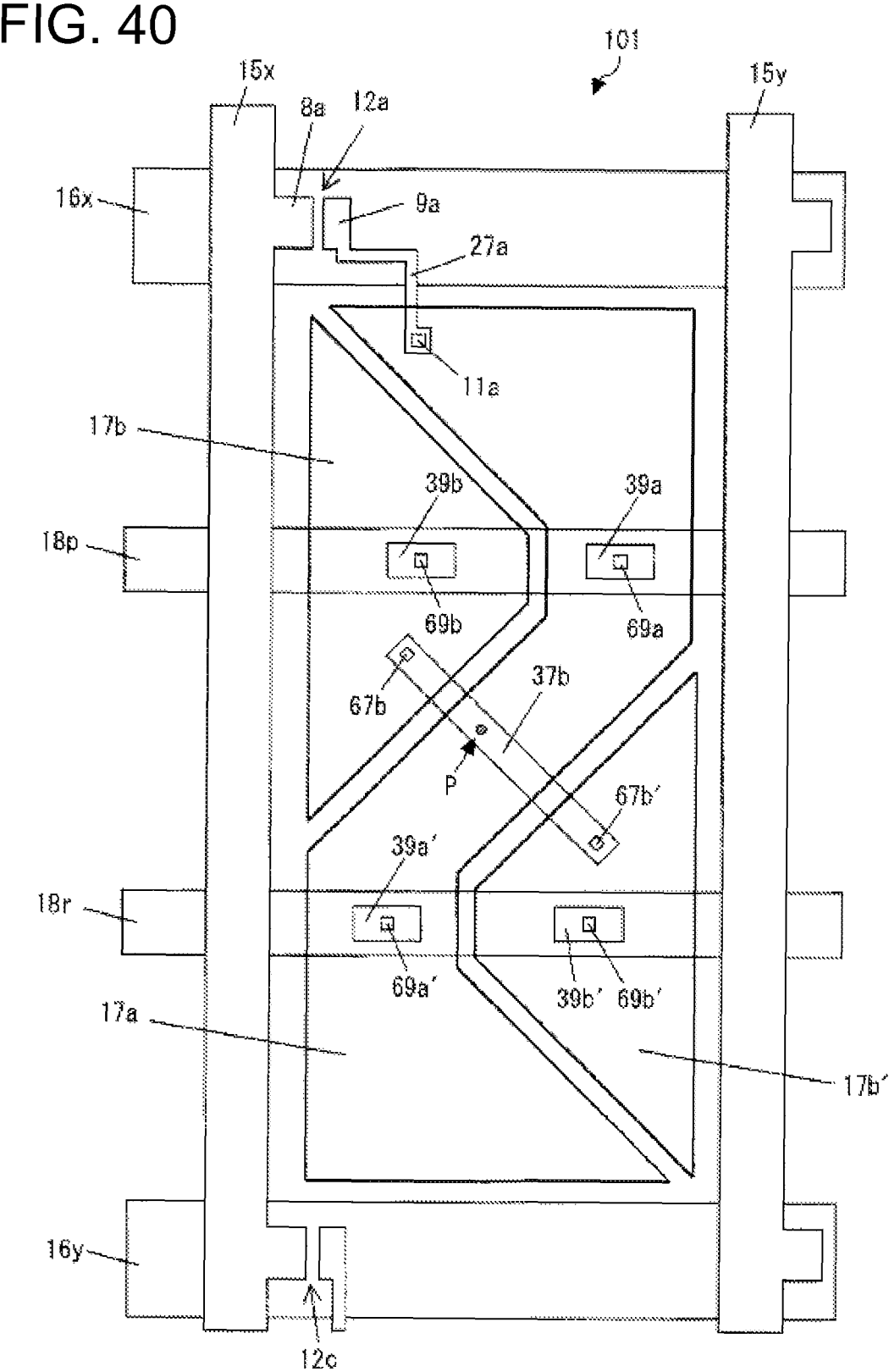
FIG. 40 is a plan view showing another specific example of the liquid crystal panel shown in FIG. 37.

The pixel 101 of FIG. 38 may be modified as shown in FIG. 40. The present liquid crystal panel of FIG. 40 has a configuration in which a capacitance electrode is electrically connected to a pixel electrode corresponding to a sub-pixel that will be a dark sub-pixel. Specifically, in the present liquid crystal panel, the drain electrode 9a of the transistor 12a is connected to the pixel electrode 17a through the contact hole 11a, the pixel electrode 17b and the capacitance electrode 37b are connected through the contact hole 67b, and the pixel electrode 17b' and the capacitance electrode 37b are connected through the contact hole 67b'. The pixel electrodes 17a and 17b (17b') are connected (capacitively-coupled) to each other through a capacitance (coupling capacitance) formed by overlapping the capacitance electrode 37b, which is electrically connected to the pixel electrodes 17b and 17b', with the pixel electrode 17a through the interlayer insulating film 25. Further, the capacitance electrode 37b is formed such that it overlaps the pixel electrodes 17b and 17b' through an interlayer insulating film, and the sum of the area overlapping the pixel electrode 17b and the area overlapping the pixel electrode 17b' is substantially equal to the area overlapping the pixel electrode 17a.

According to this structure, the pixel electrode 17a and the pixel electrode 17b (17b') are connected to each other by a coupling capacitance (Cab), and therefore, if the capacitance electrode 37b is short-circuited (in the manufacturing process or the like) to the pixel electrode 17a at "P" in FIG. 40, for example, a portion of the pixel electrode 17b inside the contact hole 67b is removed (trimmed) by a laser or the like to electrically disconnect the pixel electrode 17b from the capacitance electrode 37b, and a portion of the pixel electrode 17b' inside the contact hole 67b' is removed (trimmed) to electrically disconnect the pixel electrode 17b' from the capacitance electrode 37b. This way, the capacitance coupling of the pixel electrodes 17a and 17b (17b') can be maintained through a coupling capacitance formed in a portion where the pixel electrode 17b and the capacitance electrode 37b overlap, and also through a coupling capacitance formed in a portion where the pixel electrode 17b' and the capacitance electrode 37b overlap. Thus, according to the present embodiment, a higher production yield of the liquid crystal panel and the active matrix substrate for use in the liquid crystal panel can be achieved.

Further, in the present liquid crystal panel, the capacitance electrode 37b is disposed such that the area overlapping the pixel electrode 17a is substantially equal to the sum of the area overlapping the pixel electrode 17b and the area overlapping the pixel electrode 17b', and therefore, the value of the coupling capacitance before and after the short-circuit (that is, a capacitance value formed between the capacitance electrode 37b and the pixel electrode 17a (before the short-circuit), and a capacitance value formed between the capacitance electrode 37b and the pixel electrodes 17b and 17b' (after the short-circuit)) is unlikely to change. Accordingly, the potential of the pixel electrodes 17a and 17b (17b') can be controlled normally.

Further, only one capacitance electrode is formed in the present embodiment, but the present invention is not limited to such, and two or more capacitance electrodes may be formed as well. This way, the coupling capacitance value can be increased.

Embodiment 6

In the liquid crystal panels shown in the above-mentioned embodiments 1 to 5, a capacitance electrode is formed in a drain layer, that is, a layer between a gate insulating film and an interlayer insulating film, but the present invention is not limited to such. In other words, the present liquid crystal panel may also have a configuration in which a capacitance electrode is formed in a layer that is the same as a scan signal line, and is covered by a gate insulating film. In the present Embodiment 6, an example of a liquid crystal panel having this configuration is described. The present embodiment can be applied to each of the liquid crystal panels described above (specifically, a liquid crystal panel having a configuration in which a capacitance electrode does not overlap a storage capacitance wiring), but here, as one example, an embodiment when the present embodiment is applied to the liquid crystal panel shown in FIG. 2 is described.

An equivalent circuit diagram showing a part of the liquid crystal panel of Embodiment 6 is similar to FIG. 1, and therefore, the description is omitted.

Figure 41:
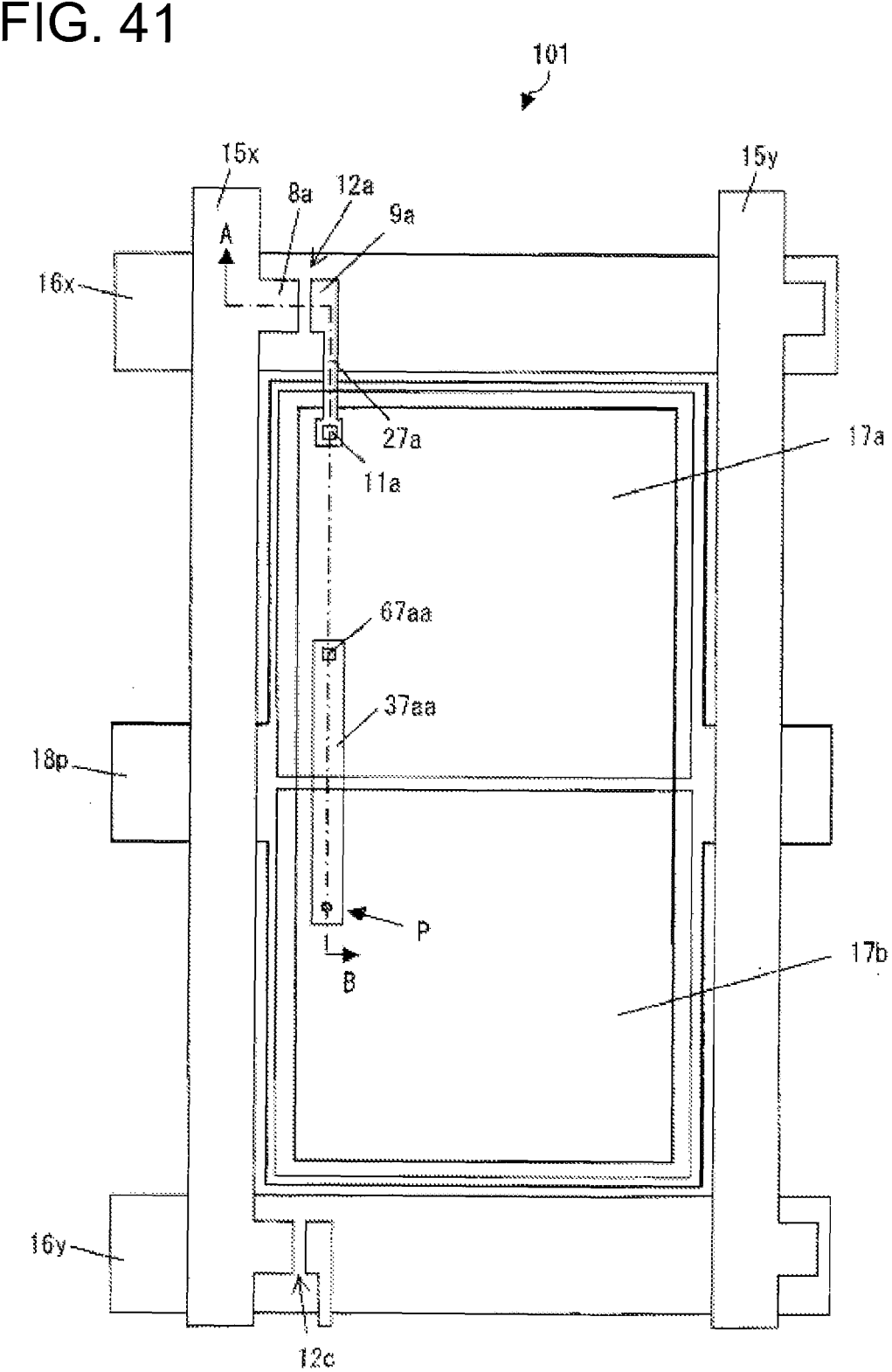
FIG. 41 is a plan view showing a specific example of the liquid crystal panel according to Embodiment 6.

A specific example of the pixel 101 of the present liquid crystal panel is shown in FIG. 41. As shown in the figure, the transistor 12a is disposed in the proximity of the intersection of the data signal line 15x and the scan signal line 16x, and in the pixel region defined by the signal lines (15x and 16x), a rectangular-shaped pixel electrode 17a and a rectangular-shaped pixel electrode 17b are arranged in the column direction, and one of the four sides constituting the perimeter of the first pixel electrode and one of the four sides constituting the perimeter of the second pixel electrode are disposed adjacent to each other. A capacitance electrode 37aa is disposed such that it crosses a space between these two adjacent sides (a space between the pixel electrodes 17a and 17b) and extends in the column direction so as to overlap each of the pixel electrodes 17a and 17b. The storage capacitance wiring 18p has a storage capacitance wiring extended portion that branches off from the storage capacitance wiring 18p, and is disposed such that it extends to overlap portions of the edges of the pixel electrodes 17a and 17b when observed in a plan view.

More specifically, the capacitance electrode 37aa is formed in the same layer with the scan signal line 16x, extends in a direction that is the same as the direction in which the data signal line 15x extends, and overlaps the pixel electrodes 17a and 17b when observed in a plan view.

Over the scan signal line 16x, the source electrode 8a and the drain electrode 9a of the transistor 12a are formed, and the source electrode 8a is connected to the data signal line 15x. The drain electrode 9a is connected to a drain lead-out wiring 27a, and the drain lead-out wiring 27a is connected to the pixel electrode 17a through the contact hole 11a. The capacitance electrode 37aa is connected to the pixel electrode 17a through the contact hole 67aa, overlaps the pixel electrode 17b through a gate insulating film and an interlayer insulating film, and the coupling capacitance Cab (see FIG. 1) between the pixel electrodes 17a and 17b is formed at the location of the overlap. Further, the capacitance electrode 37aa is formed such that it overlaps the pixel electrode 17a through the gate insulating film and the interlayer insulating film, and the area of the overlapped portion is substantially equal to the area of the overlapped portion between the capacitance electrode 37aa and the pixel electrode 17b.

Also, the pixel electrode 17a and the storage capacitance wiring 18p overlap with each other through the interlayer insulating film and the gate insulating film, and the storage capacitance Cha (see FIG. 1) is formed at the location of the overlap. The pixel electrode 17b and the storage capacitance wiring 18p overlap with each other through the interlayer insulating film and the gate insulating film, and the storage capacitance Chb (see FIG. 1) is formed at the location of the overlap. The configuration (the shapes and locations of the respective members, and the relation of connection among them) of other pixels is the same as that of the pixel 101.

According to this structure, the sub-pixel that includes the pixel electrode 17a becomes "BR", and the sub-pixel that includes the pixel electrode 17b becomes "DA".

Figure 42:
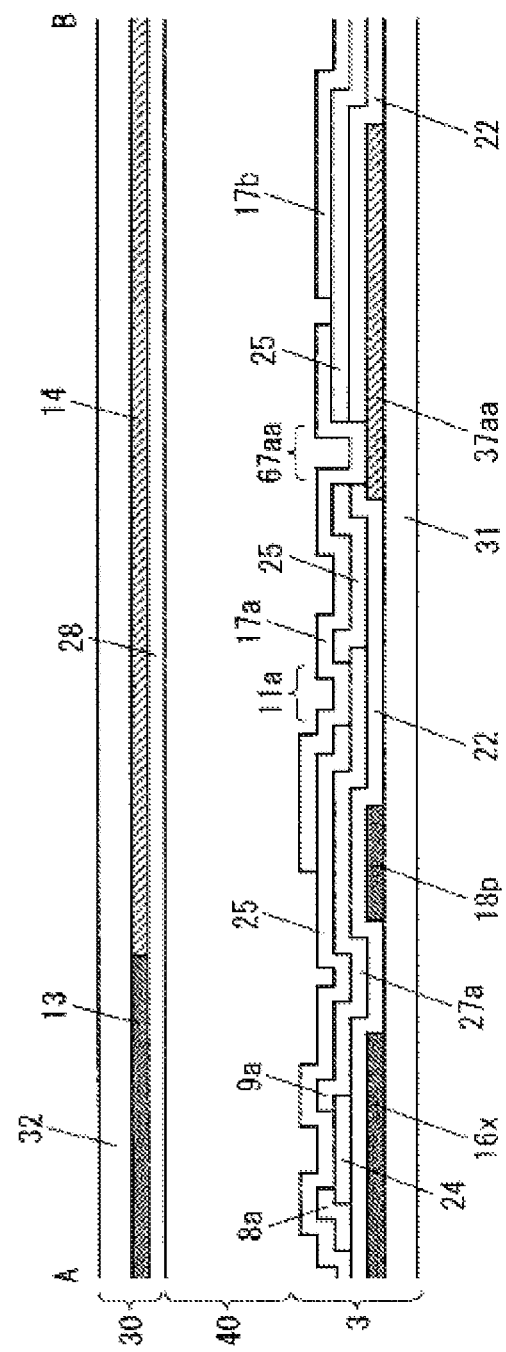
FIG. 42 is a cross-sectional arrow view taken along the line A-B of FIG. 41.

FIG. 42 is a cross-sectional arrow view taken along the line A-B of FIG. 41. As shown in the figure, the present liquid crystal panel includes an active matrix substrate 3, a color filter substrate 30 facing the active matrix substrate, and a liquid crystal layer 40 interposed between the substrates (3 and 30).

In the active matrix substrate 3, over the glass substrate 31, the scan signal line 16x, the storage capacitance wiring 18p, and the capacitance electrode 37aa are formed, and an inorganic gate insulating film 22 is formed so as to cover them. Over the inorganic gate insulating film 22, the semiconductor layer 24 (an i-layer and an n+layer), the source electrode 8a and the drain electrode 9a in contact with the n+ layer, and the drain lead-out wiring 27a are formed, which are covered by the inorganic interlayer insulating film 25. On the inorganic interlayer insulating film 25, pixel electrodes 17a and 17b are formed, and an alignment film (not shown) is further formed to cover the pixel electrodes 17a and 17b.

Here, in the contact hole 11a, the inorganic interlayer insulating film 25 is removed, and therefore, the pixel electrode 17a and the drain lead-out wiring 27a are connected to each other. Also, in the contact hole 67aa, the inorganic interlayer insulating film 25 and the inorganic gate insulating film 22 are removed, and therefore, the pixel electrode 17a and the capacitance electrode 37aa are connected to each other. The capacitance electrode 37aa and the pixel electrode 17b overlap through the inorganic gate insulating film 22 and the inorganic interlayer insulating film 25, and therefore the coupling capacitance Cab (see FIG. 1) is formed.

On the other hand, for the color filter substrate 30, a colored layer 14 is formed on the glass substrate 32. Over the colored layer 14, a common electrode (com) 28 is formed, and further, an alignment film (not shown) is formed, covering the common electrode (com) 28.

In the liquid crystal panel of FIG. 41, because the pixel electrode 17a and the pixel electrode 17b are connected (capacitively-coupled) to each other by the coupling capacitance (Cab), if the capacitance electrode 37aa is short-circuited (in the manufacturing process or the like) to the pixel electrode 17b at "P" in FIG. 41, for example, by removing (trimming) a portion of the pixel electrode 17a inside the contact hole 67aa by a laser or the like to electrically disconnect the pixel electrode 17a from the capacitance electrode 37aa, the capacitance coupling of the pixel electrodes 17a and 17b can be maintained through a coupling capacitance formed in a portion where the pixel electrode 17a and the capacitance electrode 37aa overlap. Thus, according to the present embodiment, a higher production yield of the liquid crystal panel and the active matrix substrate for use in the liquid crystal panel can be achieved.

Moreover, in the present liquid crystal panel, the capacitance electrode 37aa is disposed such that the area it overlaps the pixel electrode 17a and the area it overlaps the pixel electrode 17b are substantially equal to each another, and therefore, the value of the coupling capacitance before and after a short-circuit (that is, a capacitance value formed in a portion where the capacitance electrode 37aa and the pixel electrode 17b overlap (before the short-circuit) and a capacitance value formed in a portion where the capacitance electrode 37aa and the pixel electrode 17a overlap (after the short-circuit)) is unlikely to change. Accordingly, the potential of the pixel electrodes 17a and 17b can be controlled normally.

Further, in the present liquid crystal panel, because the capacitance electrode 37aa and the scan signal line 16x are formed in the same layer, the thickness of an insulating film that lies between the capacitance electrode 37aa and the pixel electrode 17b can be made larger than the liquid crystal panel of FIG. 2. Accordingly, it can be made difficult for a short-circuit to occur between the capacitance electrode 37aa and the pixel electrode 17b.

Figure 43:
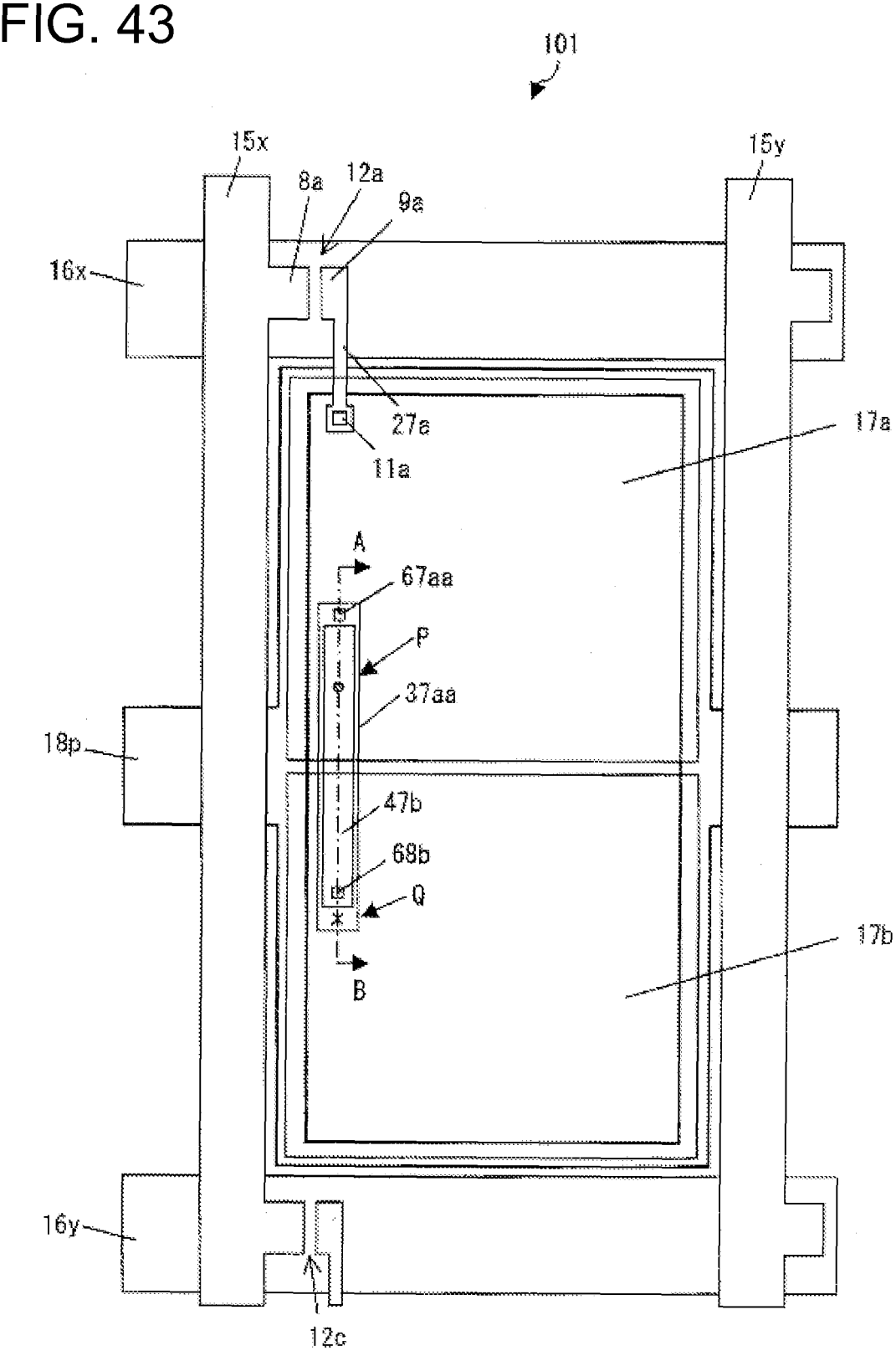
FIG. 43 is a plan view showing another specific example of the liquid crystal panel shown in FIG. 41.
Figure 44:
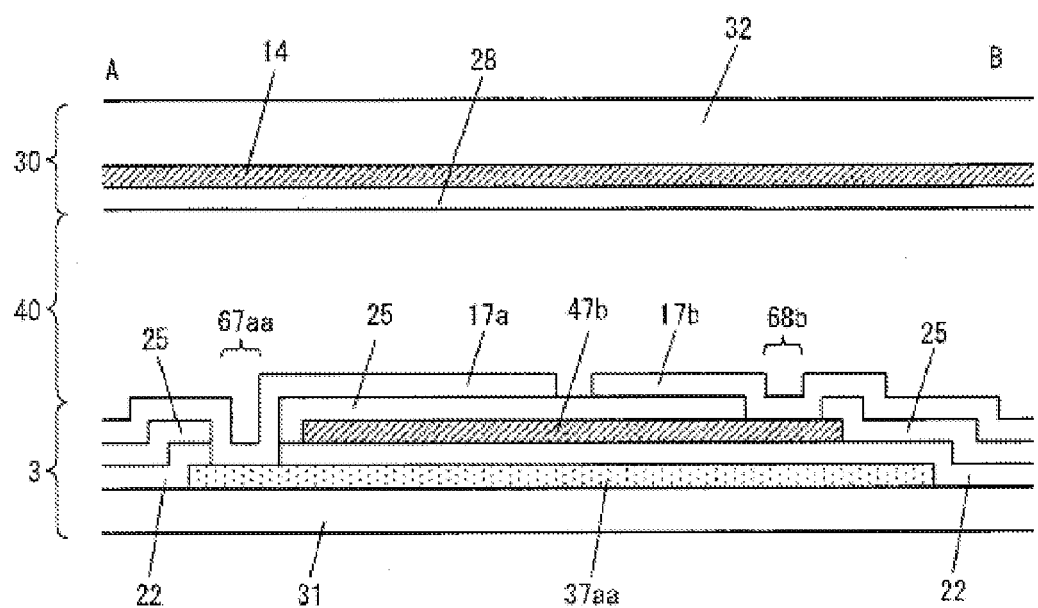
FIG. 44 is a cross-sectional arrow view taken along the line A-B of FIG. 43.

Here, the pixel 101 of FIG. 41 may be modified as shown in FIG. 43. FIG. 44 is a cross-sectional arrow view taken along the line A-B of FIG. 43. In the present liquid crystal panel, a capacitance upper electrode 47b (a third capacitance electrode), which is connected to the pixel electrode 17b, is disposed over the capacitance electrode 37aa of the liquid crystal panel of FIG. 41.

More specifically, over the scan signal line 16x, the source electrode 8a and the drain electrode 9a of the transistor 12a are formed, and the source electrode 8a is connected to the data signal line 15x. The drain electrode 9a is connected to a drain lead-out wiring 27a, and the drain lead-out wiring 27a is connected to the pixel electrode 17a through the contact hole 11a. The capacitance electrode 37aa is connected to the pixel electrode 17a through the contact hole 67aa. The capacitance upper electrode 47b is connected to the pixel electrode 17b through the contact hole 68b, overlaps the pixel electrode 17b through the interlayer insulating film 25, and also overlaps the capacitance electrode 37aa through the gate insulating film 22, and the coupling capacitance Cab (see FIG. 1) between the pixel electrodes 17a and 17b is formed at the location of the overlap. Moreover, the capacitance electrode 37aa is disposed such that the area overlapping the pixel electrode 17a is substantially equal to the area overlapping the pixel electrode 17b, and the capacitance upper electrode 47b is disposed such that the area overlapping the pixel electrode 17a is substantially equal to the area overlapping the pixel electrode 17b.

According to this structure, if the capacitance upper electrode 47b is short-circuited (in the manufacturing process or the like) to the pixel electrode 17a at "P" in FIG. 43, for example, a portion of the pixel electrode 17b inside the contact hole 68b is removed (trimmed) by a laser or the like to electrically disconnect the pixel electrode 17b from the capacitance upper electrode 47b, and also a portion of the pixel electrode 17a inside the contact hole 67aa is removed (trimmed) by a laser or the like to electrically disconnect the pixel electrode 17a from the capacitance electrode 47aa, and the capacitance electrode 37aa and the pixel electrode 17b are melted and connected to each other (electrically connected) ("Q" in FIG. 43). Here, the electrical connection between the capacitance electrode 37aa and the pixel electrode 17b is enabled by irradiating the capacitance electrode 37aa with laser from a back side (substrate side) of the active matrix substrate, for example. In order to facilitate the connection, a protrusive part may be formed in the capacitance electrode 37aa, and this protrusive part may be irradiated with a laser.

This way, the capacitance coupling of the pixel electrodes 17a and 17b can be maintained. Further, in the present liquid crystal panel, the capacitance upper electrode 47b is disposed such that the area overlapping the pixel electrode 17a is substantially equal to the area overlapping the pixel electrode 17b, and therefore, the value of the coupling capacitance before and after a short-circuit (that is, the total of a capacitance value formed in a portion where the capacitance upper electrode 47b and the pixel electrode 17a overlap, and a capacitance value formed in a portion where the capacitance upper electrode 47b and the capacitance electrode 37aa overlap (before the short-circuit), and also the total of a capacitance value formed in a portion where the capacitance upper electrode 47b and the pixel electrode 17b overlap, and a capacitance value formed in a portion where the capacitance upper electrode 47b and the capacitance electrode 37aa overlap (after the short-circuit)) is unlikely to change. Accordingly, the potential of the pixel electrodes 17a and 17b can be controlled normally.

Furthermore, in the present liquid crystal panel, the coupling capacitance is constituted of a capacitance formed in a portion where the capacitance upper electrode 47b and the pixel electrode 17a (17b) overlap, and a capacitance formed in a portion where the capacitance upper electrode 47b and the capacitance electrode 37aa overlap, and therefore, the capacitance value can be larger than that of the liquid crystal panel in FIG. 41.

In the liquid crystal panel of FIG. 43, the capacitance electrode 37aa and the capacitance upper electrode 47b have the same function, and therefore, the above-mentioned capacitance upper electrode is included in "capacitance electrodes" of the present invention.

The capacitance electrode 37aa and the capacitance upper electrode 47b may also be more than one as shown in FIG. 22 and others.

Figure 45:
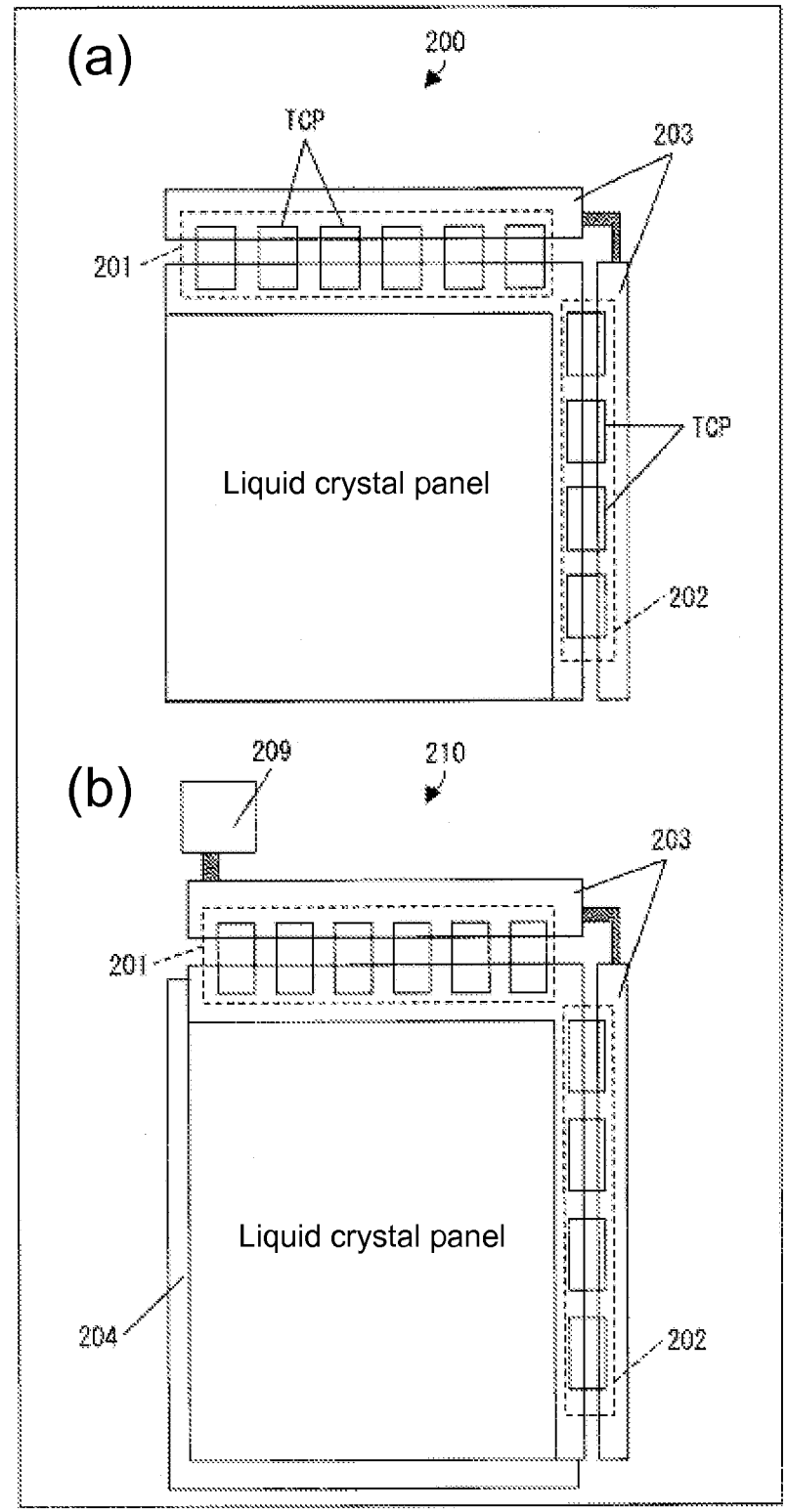
FIG. 45 is a schematic view showing a configuration of a liquid crystal display unit according to the present invention and a liquid crystal display device according to the present invention, and FIG. 45 (*a*) shows a configuration of the present liquid crystal display unit, and FIG. 45 (*b*) shows a configuration of the present liquid crystal display device.

Lastly, configuration examples of a liquid crystal display unit and a liquid crystal display device of the present invention is described. In embodiments discussed above, the present liquid crystal display unit and liquid crystal display device are configured as follows. That is, two polarizing plates A and B are attached on respective sides of the liquid crystal panel so that the polarizing axis of the polarizing plate A and the polarizing axis of the polarizing plate B cross each other at a right angle. For the polarizing plates, an optical compensation sheet or the like may be layered as necessary. Next, as shown in FIG. 45(a), drivers (gate driver 202 and source driver 201) are connected. Here, connection of a driver by TCP (Tape Career Package) system is described as an example. First, ACF (Anisotropic Conductive Film) is temporarily pressure-bonded to the terminal section of the liquid crystal panel. Next, TCP with a driver mounted thereon is punched out from a carrier tape, aligned to the panel terminal electrode, and heated for permanent pressure-bonding. Then, a circuit substrate 203 (PWB: Printed Wiring Board) for coupling the driver TCPs and TCP input terminals are connected together by ACF. The liquid crystal display unit 200 is thus complete. Subsequently, as shown in FIG. 45 (b), a display control circuit 209 is connected to each of the drivers (201 and 202) of the liquid crystal display unit through circuit substrates 203 for unification with an illumination device (backlight unit) 204, to complete a liquid crystal display device 210.

The "polarity of the potential" herein refers to either the reference potential (positive) or higher, or the reference potential (negative) or lower. Here, the reference potential may be Vcom (common potential), which is the potential of the common electrode (opposite electrode), or any other potential.

Figure 46:
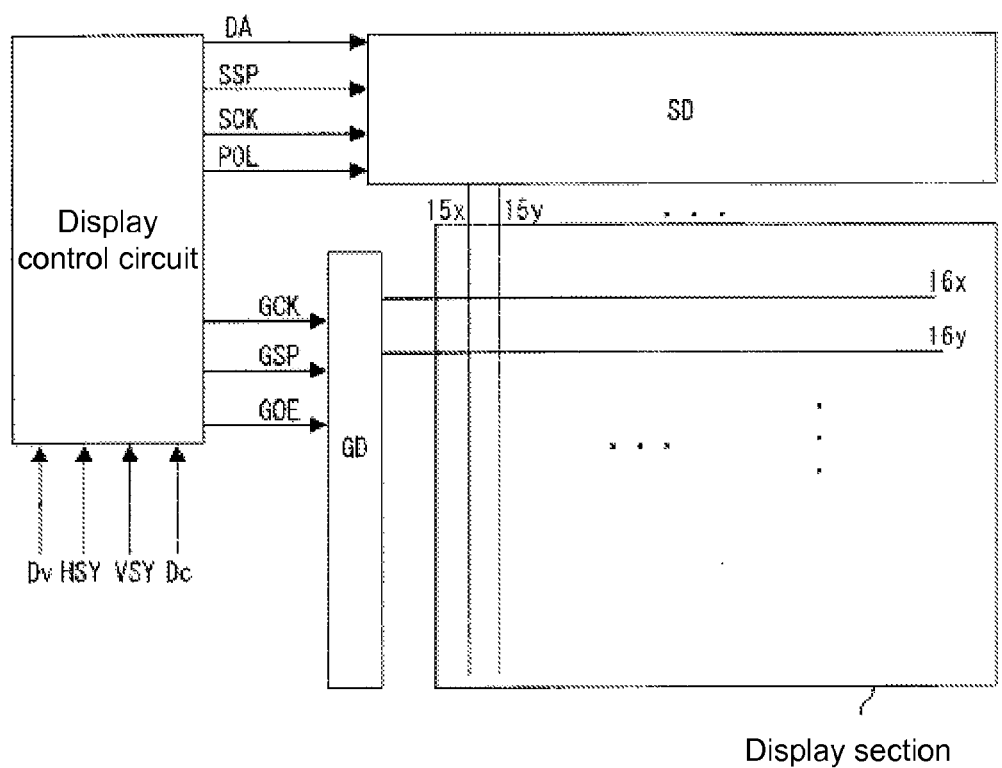
FIG. 46 is a block diagram explaining the entire configuration of a present liquid crystal display device.

FIG. 46 is a block diagram showing the configuration of the present liquid crystal display device. As shown in the figure, the liquid crystal display device includes a display section (liquid crystal panel), a source driver (SD), a gate driver (GD), and a display control circuit. The source driver drives the data signal lines, the gate driver drives the scan signal lines, and the display control circuit controls the source driver and the gate driver.

The display control circuit receives from an external signal source (a tuner, for example) a digital video signal Dv representing images to be displayed, a horizontal synchronization signal HSY and a vertical synchronization signal VSY for the digital video signal Dv, and a control signal Dc for controlling the display action. Based on the received signals Dv, HSY, VSY, and Dc, the display control circuit generates: a data start pulse signal SSP; a data clock signal SCK; a charge share signal sh; a digital image signal DA (the signal corresponding to the video signal Dv) representing the image to be displayed; a gate start pulse signal GSP; a gate clock signal GCK; and a gate driver output control signal (scan signal output control signal) GOE, as signals for displaying images represented by the digital video signal Dv on the display section and outputs them.

In more detail, the video signal Dv is subjected to the timing adjustment and the like in the internal memory as necessary, and then is output from the display control circuit as a digital image signal DA. The display control circuit generates a data clock signal SCK, which is composed of pulses corresponding to the respective pixels of the images represented by the digital image signal DA; generates, based on the horizontal synchronization signal HSY, a data start pulse signal SSP, which shifts to a high level (H level) for a predetermined period of time for every horizontal scan period; generates, based on the vertical synchronization signal VSY, a gate start pulse signal GSP, which shifts to H level for a predetermined period of time for every frame period (one vertical scan period); generates a gate clock signal GCK based on the horizontal synchronization signal HSY; and generates the charge share signal sh and the gate driver output control signal GOE based on the horizontal synchronization signal HSY and the control signal Dc.

Among the signals generated by the display control circuit as described above, the digital image signal DA, the charge share signal sh, the signal POL for controlling the polarity of signal potentials (data signal potentials), the data start pulse signal SSP, and the data clock signal SCK are input to the source driver, and the gate start pulse signal GSP, the gate clock signal GCK, and the gate driver output control signal GOE are input to the gate driver.

The source driver sequentially generates analog potentials (signal potentials) corresponding to the pixel values of images represented by the digital image signal DA at respective scan signal lines for every horizontal scan period, based on the digital image signal DA, data clock signal SCK, charge share signal sh, data start pulse signal SSP, and polarity inversion signal POL, and outputs these data signals to the data signal lines (15x and 15x, for example).

The gate driver generates the gate-on pulse signals based on the gate start pulse signal GSP, the gate clock signal GCK, and the gate driver output control signal GOE, and outputs the signal to the scan signal lines to selectively drive the scan signal lines.

The data signal lines and the scan signal lines in the display section (liquid crystal panel) are driven by the source driver and the gate driver in the manner described above, and signal potentials are written from the data signal lines to the pixel electrodes through transistors (TFT) connected to the selected scan signal lines. Consequently, voltages are applied to the liquid crystal layer for respective sub-pixels, by which the amount of the light from the backlight that is transmitted is controlled, and images represented by the digital video signal Dv are displayed on respective sub-pixels.

Figure 47:
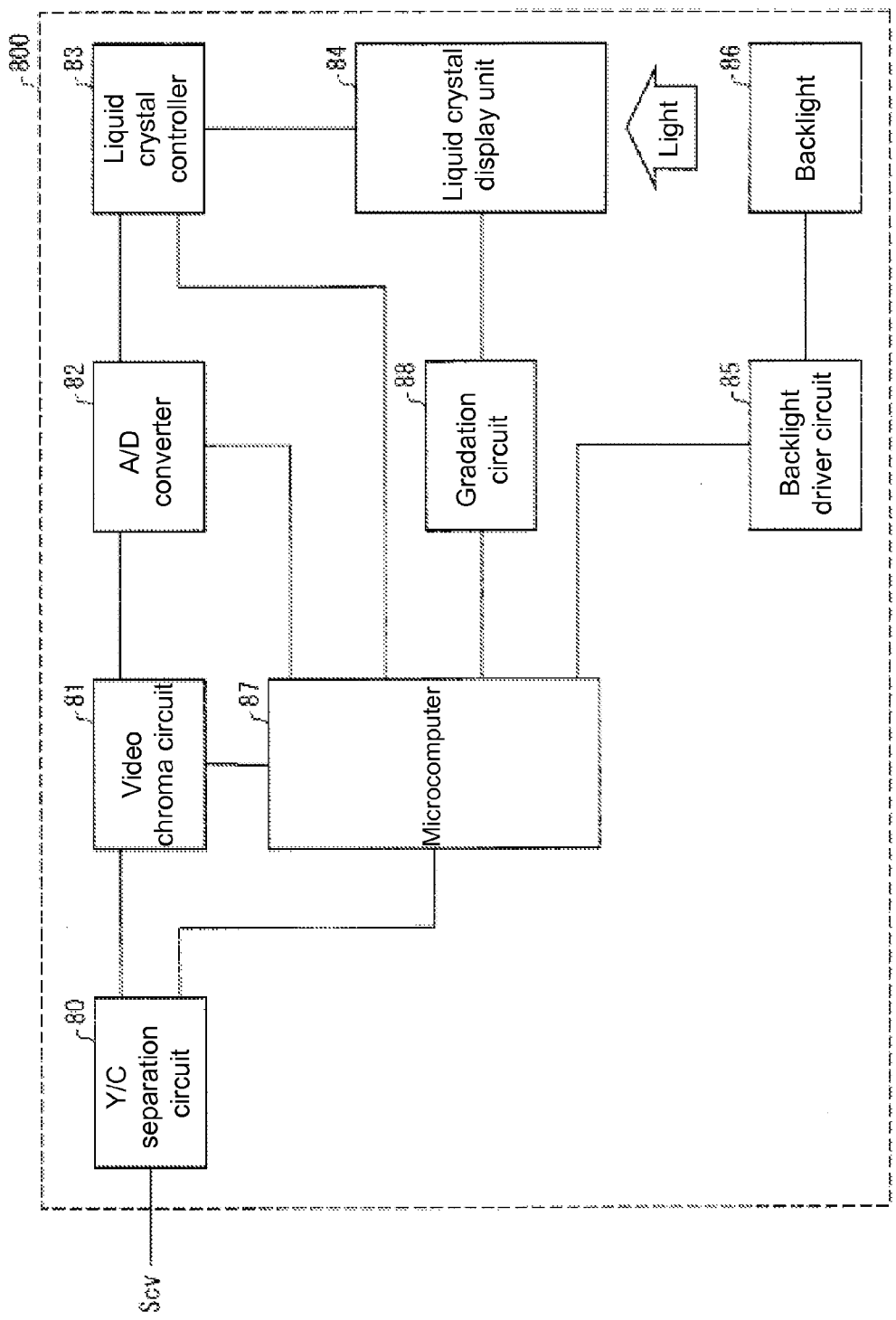
FIG. 47 is a block diagram explaining the functions of a present liquid crystal display device.

Next, a configuration example of the present liquid crystal display device as applied to a television receiver is described. FIG. 47 is a block diagram showing the configuration of a liquid crystal display device 800 for a television receiver. The liquid crystal display device 800 includes a liquid crystal display unit 84, a Y/C separation circuit 80, a video chroma circuit 81, an A/D converter 82, a liquid crystal controller 83, a backlight driver circuit 85, a backlight 86, a microcomputer 87, and a gradation circuit 88. The liquid crystal display unit 84 is composed of a liquid crystal panel and a source driver and a gate driver for driving the liquid crystal panel.

In the liquid crystal display device 800 having a configuration described above, first, a composite color image signal Scv, which is a television signal, is input from outside to the Y/C separation circuit 80. There, the signal is separated into a luminance signal and a color signal. The luminance signal and the color signal are converted to an analog RGB signal corresponding to three primary colors of the light by the video chroma circuit 81. Further, this analog RGB signal is converted to a digital RGB signal by the A/D converter 82. The digital RGB signal is input to the liquid crystal controller 83. In the Y/C separation circuit 80, horizontal and vertical synchronization signals are also obtained from the composite color image signal Scv, which is input from outside. These synchronization signals are also input to the liquid crystal controller 83 through the microcomputer 87.

To the liquid crystal display unit 84, the digital RGB signal is input from the liquid crystal controller 83, together with the timing signal based on the aforementioned synchronization signals at a predetermined timing. Also, in the gradation circuit 88, gradation potentials of respective three primary colors R, G, and B for color display are generated, and the gradation potentials are also supplied to the liquid crystal display unit 84. In the liquid crystal display unit 84, signals for driving (data signals=signal potentials, scan signals, and the like) are generated by the internal source driver, the gate driver, and the like based on the RGB signals, the timing signals, and gradation potentials. Based on the signals for driving, color images are displayed on the internal liquid crystal panel. In order for the images to be displayed by the liquid crystal display unit 84, the light needs to be radiated from behind the liquid crystal panel in the liquid crystal display unit. In the liquid crystal display device 800, the backlight driver circuit 85 drives the backlight 86 under the control of the microcomputer 87, and irradiates the back side of the liquid crystal panel with the light. Overall system control, including the processes described above, is conducted by the microcomputer 87. Not only image signals based on television broadcasting, but signals of images captured by cameras and of other images supplied via internet connection can also be used as image signals input from outside (composite color image signals). Thus, in the liquid crystal display device 800, image display based on various image signals is possible.

Figure 48:
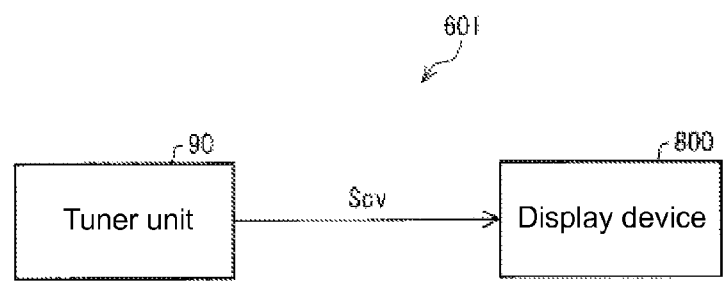
FIG. 48 is a block diagram explaining the functions of a television receiver according to the present invention.

When the liquid crystal display device 800 is used to display images of television broadcasting, as shown in FIG. 48, a tuner unit 90 is connected to the liquid crystal display device 800 to constitute the television receiver 601. The tuner unit 90 extracts signals of the channel to be received from the waves (high frequency signals) received through an antenna (not shown), and converts the extracted signals to an intermediate frequency signal. The tuner unit 90 then detects the intermediate frequency signal to retrieve composite color image signal Scv as a television signal. The composite color image signal Scv is input to the liquid crystal display device 800 as described above. Images based on the composite color image signal Scv are displayed by the liquid crystal display device 800.

Figure 49:
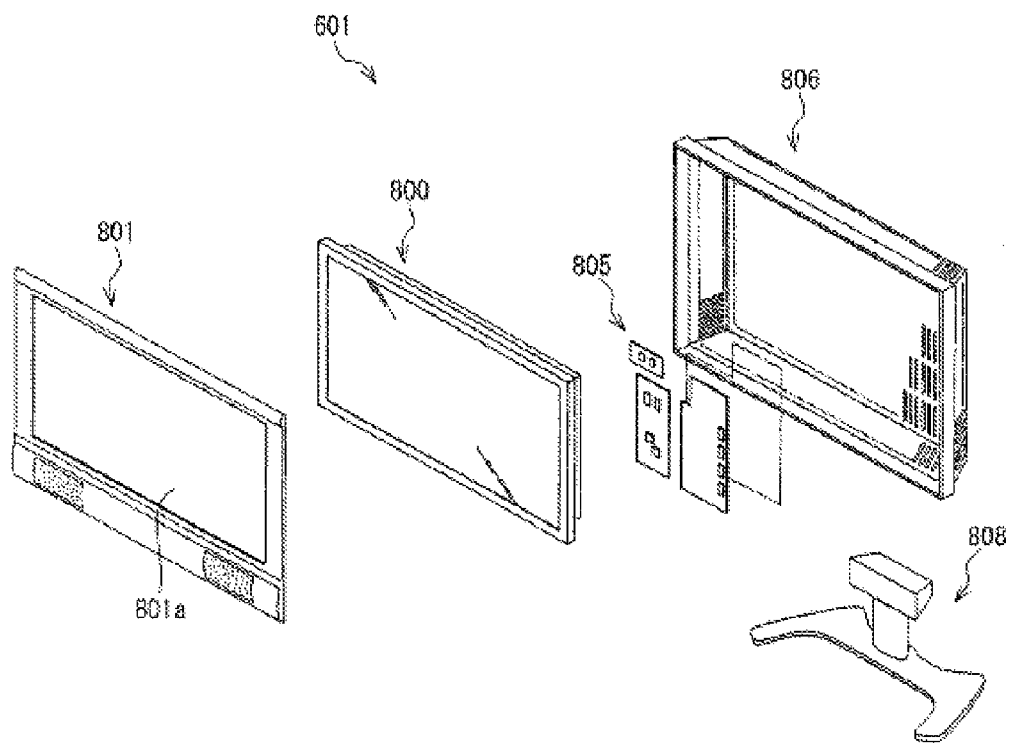
FIG. 49 is an exploded perspective view showing the configuration of a present television receiver.
Figure 50:
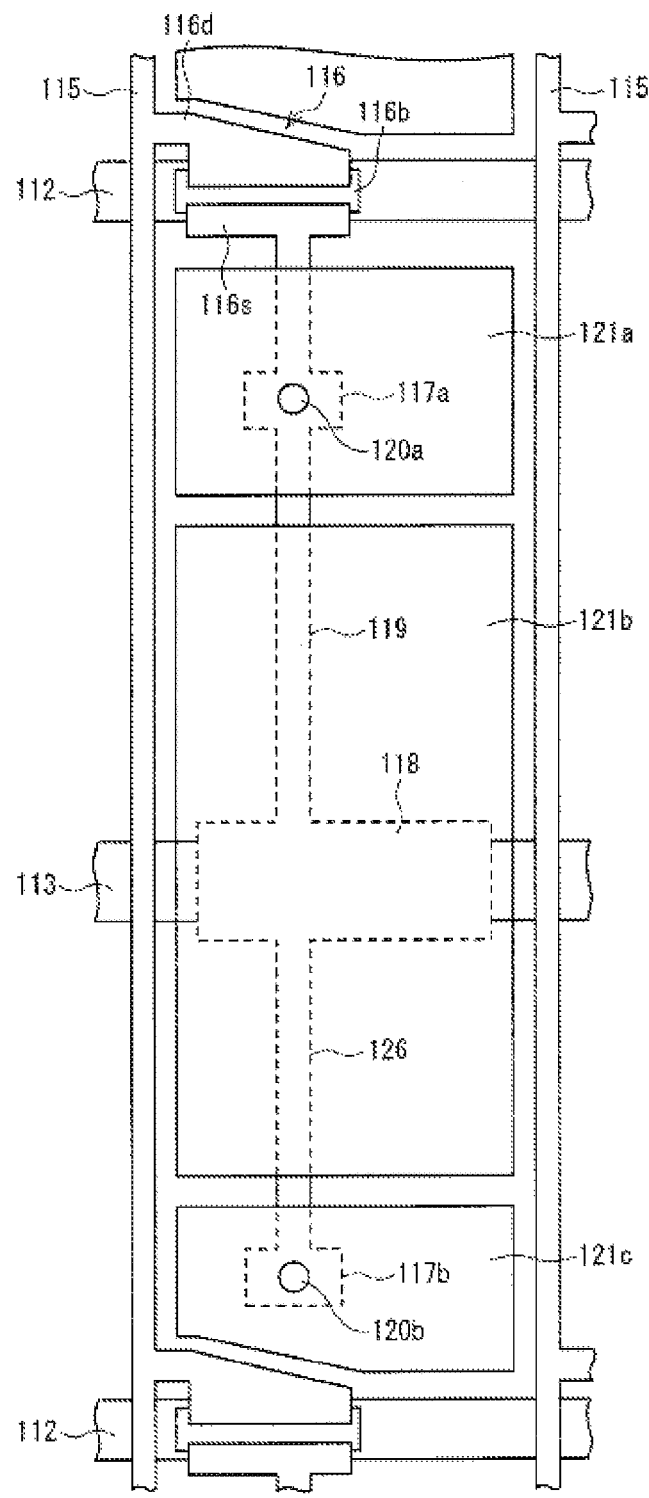
FIG. 50 is a plan view showing the configuration of a conventional liquid crystal panel.

FIG. 49 is an exploded perspective view showing a configuration example of the present television receiver. As shown in the figure, the television receiver 601 includes a first case 801 and a second case 806, in addition to the liquid crystal display device 800, as its constituting elements, and the liquid crystal display device 800 is held in the first case 801 and the second case 806. In the first case 801, there is an opening portion 801a that transmits the image to be displayed on the liquid crystal display device 800. The second case 806 covers the back side of the liquid crystal display device 800. An operation circuit 805 for operating the display device 800 is provided in the second case 806, and a supporting member 808 is attached at the bottom of the second case 806.

The present invention is not limited to the embodiments described above. Any appropriate modifications of the embodiments described above based on the common technical knowledge, and any combinations of them are also included in embodiments of the present invention.

The present active matrix substrate includes a scan signal line, a data signal line, a transistor that is connected to the scan signal line and the data signal line, and the first and second pixel electrodes provided in a single pixel region. The first pixel electrode is connected to the data signal line through the transistor, and the first capacitance electrode that is electrically connected to one of the first and second pixel electrodes is included; the first capacitance electrode and the first pixel electrode overlap with each other through an insulating film; the first capacitance electrode and the second pixel electrode overlap with each other through the insulating film; and the respective overlapped areas are equal to one another.

According to the above-mentioned configuration, in a capacitive coupling type pixel division system active matrix substrate, each of the first and second pixel electrodes, which are provided in one pixel region, overlaps the first capacitance electrode. This way, in a configuration in which the first capacitance electrode is electrically connected to the first pixel electrode, if a short-circuiting occurs between the first capacitance electrode and the second pixel electrode, for example, by electrically disconnecting the first capacitance electrode from the first pixel electrode, the capacitance coupling of the first and second pixel electrodes can be maintained by a capacitance (coupling capacitance) formed in a portion where the first capacitance electrode and the first pixel electrode overlap. Consequently, the manufacturing yield of the active matrix substrate and the liquid crystal panel equipped with the active matrix substrate can be improved.

Moreover, in the above-mentioned configuration, the area where the first capacitance electrode and the first pixel electrode overlap is equal to the area where the first capacitance electrode and the second pixel electrode overlap, and therefore, the value of a coupling capacitance before and after a short-circuit, that is, a capacitance value formed in a portion where the first capacitance electrode and the second pixel electrode overlap (before the short-circuit) and a capacitance value formed in a portion where the first capacitance electrode and the first pixel electrode overlap (after the short-circuit), is unlikely to change. Accordingly, the potential of the first and second pixel electrodes can be controlled normally.

The present active matrix substrate may also have a configuration in which the first capacitance electrode is formed in the same layer with one of the conductive electrodes of the transistor. With this configuration, the layered structure and the manufacturing process of the active matrix substrate can be simplified.

The present active matrix substrate may also have a configuration in which the first capacitance electrode overlaps the first and second pixel electrodes through an interlayer insulating film covering the channels of the transistor.

The present active matrix substrate may also have a configuration in which the perimeters of the first and the second pixel electrodes are composed of a plurality of sides, one side of the first pixel electrode and one side of the second pixel electrode are adjacent to each other, and the first capacitance electrode is disposed to overlap the space between the adjacent sides, the first pixel electrode, and the second pixel electrode.

The present active matrix substrate may also have a configuration in which one of the conductive electrodes of the transistor and the first pixel electrode are connected together through a contact hole, and the first pixel electrode and the first capacitance electrode are connected together through a contact hole which is different from the above-mentioned contact hole.

The present active matrix substrate may also have a configuration in which one of the conductive electrodes of the transistor is connected to the first pixel electrode through a contact hole, and the first capacitance electrode is connected to a lead-out wiring that is led out of the conductive electrode.

The present active matrix substrate may also have a configuration in which one of the conductive electrodes of the transistor and the first pixel electrode are connected to each other through a contact hole, and the second pixel electrode and the first capacitance electrode are connected through a contact hole that is different from the above-mentioned contact hole.

The present active matrix substrate may also have a configuration in which the first and the second pixel electrodes are arranged in a column direction when scan signal lines extend in a row direction.

The present active matrix substrate may also have a configuration in which, within two pixel regions adjacent to each other in a row direction, the first pixel electrode in one of the pixel regions is adjacent to the second pixel electrode in the other pixel region in the row direction.

The present active matrix substrate may also have a configuration in which the first pixel electrode surrounds the second pixel electrode.

The present active matrix substrate may also have a configuration in which the second pixel electrode surrounds the first pixel electrode.

The present active matrix substrate may also have a configuration in which a second capacitance electrode that is electrically connected to one of the first and second pixel electrodes is further included; the second capacitance electrode and the first pixel electrode overlap with each other through an insulating film; the second capacitance electrode and the second pixel electrode overlap with each other through the insulating film; and the respective overlapped areas are equal to each other.

The present active matrix substrate may also have a configuration in which a storage capacitance wiring is further included, the first capacitance electrode overlaps each of the first and second pixel electrodes through an interlayer insulating film, which covers a channel of the transistor, and also overlaps the storage capacitance wiring through a gate insulating film, and the second capacitance electrode overlaps the first and second pixel electrodes through the interlayer insulating film, which covers the channel of the transistor, and also overlaps the storage capacitance wiring through the gate insulating film.

The present active matrix may also have a configuration in which the first capacitance electrode is electrically connected to one of the first and second pixel electrodes, and the second capacitance electrode is electrically connected to the other one of the first and second pixel electrodes.

According to the above-mentioned configuration, the first and second pixel electrodes are connected to each other by a capacitance (coupling capacitance) formed in a portion where the second pixel electrode and the first capacitance electrode overlap, and also by a capacitance (coupling capacitance) formed in a portion where the first pixel electrode and the second capacitance electrode overlap.

Here, if a short-circuiting occurs between the first capacitance electrode and the second pixel electrode, for example, the first capacitance electrode is electrically disconnected from the first pixel electrode; and the second pixel electrode is electrically disconnected from the second capacitance electrode; and the second capacitance electrode is short-circuited to the first pixel electrode. This way, the first and second pixel electrodes are connected to each other by a capacitance (coupling capacitance) formed in a portion where the first pixel electrode and the first capacitance electrode overlap, and also by a capacitance (coupling capacitance) formed in a portion where the second pixel electrode and the second capacitance electrode overlap.

In the above-mentioned configuration, as described above, the area where the first capacitance electrode and the first pixel electrode overlap is equal to the area where the first capacitance electrode and the second pixel electrode overlap, and the area where the second capacitance electrode and the first pixel electrode overlap is equal to the area where the second capacitance electrode and the second pixel electrode overlap. Accordingly, the value of the coupling capacitance is unlikely to change before and after the short-circuit.

Moreover, in the first pixel electrode, a storage capacitance formed in a portion where the first capacitance electrode and a storage capacitance wiring overlap (before a short-circuit) is replaced with a storage capacitance formed in a portion where the second capacitance electrode and the storage capacitance wiring overlap (after the short-circuit). And, in the second pixel electrode, a storage capacitance formed in a portion where the second capacitance electrode and a storage capacitance wiring overlap (before the short-circuit) is replaced with a storage capacitance formed in a portion where the first capacitance electrode and the storage capacitance wiring overlap (after the short-circuit). Thus, as a result of making the first and second capacitance electrodes in the same shape, the area where the first capacitance electrode and the storage capacitance wiring overlap is equal to the area where the second capacitance electrode and the storage capacitance wiring overlap, and the total amounts of the storage capacitances for the first and second pixel electrodes are unlikely to change before and after the short-circuit.

Thus, according to the above-mentioned configuration, even if a short-circuit occurs between the capacitance electrode and the pixel electrode, the total amounts of the coupling capacitance and the storage capacitance are unlikely to change before and after the short-circuit, and therefore, the potential of the first and second pixel electrodes can be controlled normally while securing the storage capacitance.

The present active matrix substrate may also have a configuration that further includes a storage capacitance wiring that forms a capacitance with either the first pixel electrode or a conductive body electrically connected to this first pixel electrode, and also forms a capacitance with either the second pixel electrode or a conductive body electrically connected to this second pixel electrode.

The present active matrix substrate may also have a configuration in which the storage capacitance wiring has a storage capacitance wiring extended portion that is branched off from the storage capacitance wiring, and the storage capacitance wiring extended portion extends along the data signal line and the scan signal line so as to surround the pixel region when observed in a plan view, and overlaps the first and second pixel electrodes.

The present active matrix substrate may also have a configuration in which the storage capacitance wiring extends in a direction that is the same as the direction in which the scan signal line extends, so as to cross the pixel region in the center.

The present active matrix substrate may also have a configuration in which the first capacitance electrode forms a capacitance with the storage capacitance wiring.

In the present active matrix substrate, the interlayer insulating film may be composed of an inorganic insulating film and an organic insulating film that is thicker than the inorganic insulating film, however, the present active matrix substrate may also have a configuration in which a portion of the organic insulating film that overlaps the first capacitance electrode is at least partially removed.

The present active matrix substrate may also have a configuration that includes a scan signal line, a data signal line, a transistor connected to the scan signal line and the data signal line, and includes first, second, and third pixel electrodes provided in a single pixel region, and in which the first pixel electrode is connected to the data signal line through the transistor, the third pixel electrode is electrically connected to the first pixel electrode, the first capacitance electrode that is electrically connected to the first and third pixel electrodes is included, the first capacitance electrode overlaps each of the first, second and third pixel electrodes through an insulating film, the total of the area where the first capacitance electrode and the first pixel electrode overlap and the area where the first capacitance electrode and the third pixel electrode overlap is equal to the area where the first capacitance electrode and the second pixel electrode overlap.

The present active matrix substrate may also have a configuration that includes a scan signal line, a data signal line, a transistor connected to the scan signal line and the data signal line, and includes first, second, third pixel electrodes provided in a single pixel region, in which the first pixel electrode is connected to the data signal line through the transistor, the second pixel electrode and the third pixel electrode are electrically connected to each other, a first capacitance electrode that is electrically connected to the first pixel electrode is included, the first capacitance electrode overlaps each of the first, second, and third pixel electrodes through an insulating film, and the area where the first capacitance electrode and the first pixel electrode overlap is equal to the sum of the area where the first capacitance electrode and the second pixel electrode overlap and the area where the first capacitance electrode and the third pixel electrode overlap.

The present active matrix substrate may also have a configuration in which the first capacitance electrode is formed in the same layer with the scan signal line.

The present active matrix substrate may also have a configuration in which the first capacitance electrode overlaps the first and second pixel electrodes through a gate insulating film that covers the scan signal line and an interlayer insulating film that covers a channel of the transistor.

The present active matrix substrate may also have a configuration that further includes a third capacitance electrode that overlaps the first capacitance electrode, which is electrically connected to one of the first and second pixel electrodes, through the gate insulating film, the third capacitance electrode being electrically connected to the other one of the pixel electrodes, in which the third capacitance electrode and the first pixel electrode overlap with each other through the interlayer insulating film, the third capacitance electrode and the second pixel electrode overlap with each other through the interlayer insulating film, and the respective overlapped areas are equal to each other.

The present active matrix substrate may also have a configuration in which the first capacitance electrode and one of the first and second pixel electrodes are connected together through a contact hole that runs through the gate insulating film and the interlayer insulating film.

A method for manufacturing the present active matrix substrate is a method for manufacturing an active matrix substrate that includes a scan signal line, a data single line, a transistor connected to the scan signal line and the data signal line, in which first and second pixel electrodes are formed in a single pixel region, and the first pixel electrode is connected to the data signal line through the transistor, the method including: a step of forming a first capacitance electrode that is electrically connected to one of the first and second pixel electrodes, and that also forms a capacitance with the other pixel electrode; a step of detecting any short-circuit between the first capacitance electrode and the other pixel electrode; a step of cutting the first capacitance electrode from the one of the pixel electrodes at their connected site if any short-circuit is detected between the first capacitance electrode and the other pixel electrode. Further, in the step of forming the first capacitance electrode, the first capacitance electrode is formed such that the first capacitance electrode and the first pixel electrode overlap with each other through an insulating film, the first capacitance electrode and the second pixel electrode overlap with each other through an insulating film, and the respective overlapped areas are equal to each other.

A method for manufacturing the present liquid crystal panel is a method for manufacturing a liquid crystal panel that includes a scan signal line, a data signal line, and a transistor connected to the scan signal line and the data signal line, in which first and second pixel electrodes are provided in a single pixel, and the first pixel electrode is connected to the data signal line through the transistor, the method including: a step of forming a first capacitance electrode that is electrically connected to one of the first and second pixel electrodes, and that also forms a capacitance with the other pixel electrode; a step of detecting a short-circuit between the first capacitance electrode and the other pixel electrode; and a step of cutting the first capacitance electrode from the one of the pixel electrodes at their connected site if any short-circuit is detected between the first capacitance electrode and the other pixel electrode. Further, in the step of forming the first capacitance electrode, the first capacitance electrode is formed such that the first capacitance electrode and the first pixel electrode overlap with each other through an insulating film, the first capacitance electrode and the second pixel electrode overlap with each other through an insulating film, and the respective overlapped areas are equal to each other.

A liquid crystal panel according to the present invention is characterized in that it is equipped with the above-mentioned active matrix substrate. Also, a liquid crystal display unit according to the present invention is characterized in that it is equipped with the above-mentioned liquid crystal panel and drivers. Additionally, a liquid crystal display device according to the present invention is characterized in that it includes the above-mentioned liquid crystal display unit and a light source device. Also, a television receiver according to the present invention is characterized in that it includes the above-mentioned liquid crystal display device and a tuner unit that receives the television broadcasting.

INDUSTRIAL APPLICABILITY

An active matrix substrate of the present invention and a liquid crystal panel equipped with the active matrix substrate are suitable for a liquid crystal television, for example.

DESCRIPTION OF REFERENCE CHARACTERS 101 to 104 pixel
12a, 12c, 12A, 12C transistor
15x, 15y, 15z data signal line
16x, 16y scan signal line
17a, 17b, 17c, 17d pixel electrode
17A, 17B, 17C, 17D pixel electrode
17a', 17b', 17c', 17d' pixel electrode
17A', 17B', 17C', 17D' pixel electrode
18p, 18q, 18r, 18s storage capacitance wiring
21 organic gate insulating film
22 inorganic gate insulating film
24 semiconductor layer
25 inorganic interlayer insulating film
26 organic interlayer insulating film
27a drain lead-out wiring
37a, 37b capacitance electrode (first capacitance electrode, conductive body)
38a, 38b capacitance electrode (second capacitance electrode, conductive body)
37aa capacitance electrode (first capacitance electrode)
39a, 39b, 39a', 39b' storage capacitance electrode (conductive body)
47b capacitance electrode (third capacitance electrode)
51a opening
84 liquid crystal display unit
601 television receiver
800 liquid crystal display device

The invention claimed is:

1. An active matrix substrate, comprising: a scan signal line; a data signal line; a transistor that is connected to the scan signal line and the data signal line; and first and second pixel electrodes provided in a single pixel region, wherein said first pixel electrode is connected to said data signal line through said transistor, the active matrix substrate further comprising:
a first capacitance electrode electrically connected to one of said first and second pixel electrodes,
wherein said first capacitance electrode and said first pixel electrode overlap with each other through an insulating film, said first capacitance electrode and said second pixel electrode overlap with each other through the insulating film, and respective overlapped areas are equal to each other, and
wherein said first capacitance electrode overlaps said first and second pixel electrodes through an interlayer insulating film that covers a channel of said transistor.

2. The active matrix substrate according to claim 1, wherein said first capacitance electrode is formed in a same layer with one of conductive electrodes of said transistor.

3. The active matrix substrate according to claim 1, wherein a perimeter of said first and second pixel electrodes is composed of a plurality of sides, one side of said first pixel electrode and one side of said second pixel electrode are adjacent to each other, and said first capacitance electrode is disposed so as to overlap a space between said two adjacent sides, said first pixel electrode, and said second pixel electrode.

4. The active matrix substrate according to claim 1, wherein one of conductive electrodes of said transistor and said first pixel electrode are connected through a contact hole, and
wherein said first pixel electrode and said first capacitance electrode are connected through a contact hole that is different from said contact hole.

5. The active matrix substrate according to claim 1, wherein one of conductive electrodes of said transistor is connected to said first pixel electrode through a contact hole, and
wherein said first capacitance electrode is connected to a lead-out wiring that is led out from said one of the conductive electrodes.

6. The active matrix substrate according to claim 1, wherein one of conductive electrodes of said transistor and said first pixel electrode are connected through a contact hole, and wherein said second pixel electrode and said first capacitance electrode are connected through a contact hole that is different from said contact hole.

7. The active matrix substrate according to claim 1, wherein said first and second pixel electrodes are aligned in a column direction when the scan signal line extends in a row direction.

8. The active matrix substrate according to claim 7, wherein among two pixel regions adjacent to each other in the row direction, said first pixel electrode in one of the two pixel regions and said second pixel electrode in the other pixel region are adjacent to each other in the row direction.

9. The active matrix substrate according to claim 1, wherein said first pixel electrode surrounds said second pixel electrode.

10. The active matrix substrate according to claim 1, wherein said second pixel electrode surrounds said first pixel electrode.

11. The active matrix substrate according to claim 1, further comprising a second capacitance electrode electrically connected to one of said first and second pixel electrodes, wherein said second capacitance electrode and said first pixel electrode overlap with each other through the insulating film, said second capacitance electrode and said second pixel electrode overlap with each other through the insulating film, and respective overlapped areas are equal to each other.

12. The active matrix substrate according to claim 11, further comprising a storage capacitance wiring, wherein said first capacitance electrode overlaps each of said first and second pixel electrodes through an interlayer insulating film that covers a channel of said transistor, and also overlaps said storage capacitance wiring through a gate insulating film, and wherein said second capacitance electrode overlaps each of said first and second pixel electrodes through the interlayer insulating film that covers the channel of said transistor, and also overlaps said storage capacitance wiring through the gate insulating film.

13. The active matrix substrate according to claim 12, wherein said first capacitance electrode is electrically connected to one of said first and second pixel electrodes, and wherein said second capacitance electrode is electrically connected to the other one of said first and second pixel electrodes.

14. The active matrix substrate according to claim 1, further comprising a storage capacitance wiring that forms a capacitance with said first pixel electrode or a conductive body electrically connected to said first pixel electrode, and that also forms a capacitance with said second pixel electrode or a conductive body electrically connected to said second pixel electrode.

15. The active matrix substrate according to claim 14, wherein said storage capacitance wiring has a storage capacitance wiring extended portion that that is branched off from said storage capacitance wiring, and wherein said storage capacitance wiring extended portion extends along said data signal line and said scan signal line so as to surround said pixel region when observed in a plan view, and overlaps said first and second pixel electrodes.

16. The active matrix substrate according to claim 14, wherein said storage capacitance wiring extends in a direction that is the same as the direction in which said scan signal line extends so as to cross said pixel region in a center thereof.

17. The active matrix substrate according to claim 14, wherein said first capacitance electrode forms a capacitance with said storage capacitance wiring.

18. The active matrix substrate according to claim 1, wherein said interlayer insulating film is made of an inorganic insulating film and an organic insulating film that is thicker than the inorganic insulating film, and a portion of the organic insulating film that overlaps said first capacitance electrode is at least partially removed.

19. An active matrix substrate, comprising: a scan signal line; a data signal line; a transistor connected to the scan signal line and the data signal line; and first, second, and third pixel electrodes provided in a single pixel region, wherein said first pixel electrode is connected to said data signal line through said transistor, wherein said third pixel electrode is electrically connected to said first pixel electrode, the active matrix substrate further comprising:

a first capacitance electrode electrically connected to said first and third pixel electrodes, wherein said first capacitance electrode overlaps each of the first, second, and third pixel electrodes through an insulating film, and wherein a sum of an area where said first capacitance electrode and said first pixel electrode overlap and an area where said first capacitance electrode and said third pixel electrode overlap is equal to an area where said first capacitance electrode and said second pixel electrode overlap.

20. An active matrix substrate comprising: a scan signal line; a data signal line; a transistor connected to the scan signal line and the data signal line; and first, second and third pixel electrodes provided in a single pixel region, wherein said first pixel electrode is connected to said data signal line through said transistor, wherein said second pixel electrode and said third pixel electrode are electrically connected to each other, the active matrix substrate further comprising:

a first capacitance electrode electrically connected to said first pixel electrode, wherein said first capacitance electrode overlaps each of the first, second, and third pixel electrodes through an insulating film, and wherein an area where said first capacitance electrode and said first pixel electrode overlap is equal to a total of an area where said first capacitance electrode and said second pixel electrode overlap and an area where said first capacitance electrode and said third pixel electrode overlap.

21. The active matrix substrate according to claim 1, wherein said first capacitance electrode is formed in a same layer with said scan signal line.

22. The active matrix substrate according to claim 21, wherein said first capacitance electrode overlaps said first and second pixel electrodes through a gate insulating film that covers said scan signal line and an interlayer insulating film that covers a channel of said transistor.

23. The active matrix substrate according to claim 22, further comprising a third capacitance electrode that overlaps said first capacitance electrode, which is electrically connected to the one of said first and second pixel electrodes, through said gate insulating film, the third capacitance electrode being electrically connected to the other one of said first and second pixel electrodes, wherein said third capacitance electrode and said first pixel electrode overlap with each other through said interlayer insulating film, said third capacitance electrode and said second pixel electrode overlap with each other through said interlayer insulating film, and respective overlapped areas are equal to each other.

24. The active matrix substrate according to claim 22, wherein said first capacitance electrode and said one of said first and second pixel electrodes are connected to each other through a contact hole that runs through said gate insulating film and said interlayer insulating film.

25. A method for manufacturing an active matrix substrate that includes a scan signal line; a data signal line; a transistor connected to the scan signal line and the data signal line; and first and second pixel electrodes provided in a single pixel region, wherein said first pixel electrode is connected to said data signal line through said transistor, the method comprising:

forming a first capacitance electrode electrically connected to one of said first and second pixel electrodes, the first capacitance electrode forming a capacitance with the other one of said first and second pixel electrodes;

detecting any short-circuit between said first capacitance electrode and said other one of said first and second pixel electrodes; and cutting said first capacitance electrode from said one of said first and second pixel electrodes at a connected site if any short-circuit is detected between said first capacitance electrode and said other one of said first and second pixel electrodes, wherein the step of forming said first capacitance electrode includes forming said first capacitance electrode such that said first capacitance electrode and said first pixel electrode overlap with each other through an insulating film, said first capacitance electrode and said second pixel electrode overlap with each other through the insulating film, and that respective overlapped areas are equal to each other.

26. A liquid crystal panel comprising the active matrix substrate set forth in claim 1.

27. A liquid crystal display unit comprising the liquid crystal panel set forth in claim 26 and a driver.

28. A liquid crystal display device comprising the liquid crystal display unit set forth in claim 27 and a light source device.

29. A television receiver comprising the liquid crystal display device set forth in claim 28 and a tuner unit that receives television broadcasting.

* * * * *